United States Patent
Ikegami et al.

(10) Patent No.: US 10,234,152 B2
(45) Date of Patent: Mar. 19, 2019

(54) AIR CONDITIONING DEVICE

(71) Applicant: DAIKIN INDUSTRIES, LTD., Osaka-shi, Osaka (JP)

(72) Inventors: Shuji Ikegami, Osaka (JP); Yukihiro Makino, Osaka (JP); Kouichi Yasuo, Osaka (JP); Hyunyoung Kim, Osaka (JP); Makoto Kojima, Osaka (JP); Mamoru Okumoto, Osaka (JP); Chuncheng Piao, Osaka (JP); Lan Jiang, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 529 days.

(21) Appl. No.: 14/765,309

(22) PCT Filed: Sep. 6, 2013

(86) PCT No.: PCT/JP2013/005313
§ 371 (c)(1),
(2) Date: Jul. 31, 2015

(87) PCT Pub. No.: WO2014/122702
PCT Pub. Date: Aug. 14, 2014

(65) Prior Publication Data
US 2015/0362202 A1   Dec. 17, 2015

(30) Foreign Application Priority Data

Feb. 6, 2013  (JP) ................... 2013-021472
Feb. 6, 2013  (JP) ................... 2013-021482

(51) Int. Cl.
*F25B 23/00* (2006.01)
*F24F 5/00* (2006.01)
(Continued)

(52) U.S. Cl.
CPC .............. *F24F 5/0042* (2013.01); *F24F 3/14* (2013.01); *F24F 3/147* (2013.01); *F24F 7/08* (2013.01);
(Continued)

(58) Field of Classification Search
CPC ................................. F25B 23/00; F03G 7/065
See application file for complete search history.

(56) References Cited

U.S. PATENT DOCUMENTS 348,841 A * 9/1886 Hainley ............... F01B 17/02
   185/40 R
3,036,444 A * 5/1962 Cochran ............... F24F 5/00
   62/467
(Continued)

FOREIGN PATENT DOCUMENTS

JP  57-192761 A  11/1982
JP  10-259965 A   9/1998
(Continued)

OTHER PUBLICATIONS

International Search Report, dated PCT/JP2013/005310, dated Oct. 22, 2013.
(Continued)

*Primary Examiner* — Cassey D Bauer
(74) *Attorney, Agent, or Firm* — Birch, Stewart, Kolasch & Birch, LLP

(57) ABSTRACT

An air conditioner disclosed herein includes a cooling/heating module including a thermoelastic material and an actuator applying tension to the thermoelastic material and a switching control section selectively applying or removing tension to/from the thermoelastic material.

8 Claims, 61 Drawing Sheets

(51) Int. Cl.
    *F24F 3/147*    (2006.01)
    *F24F 12/00*    (2006.01)
    *F24F 3/14*     (2006.01)
    *F24F 7/08*     (2006.01)

(52) U.S. Cl.
    CPC ............ *F24F 12/006* (2013.01); *F25B 23/00* (2013.01); *F24F 2003/1464* (2013.01); *Y02B 30/563* (2013.01)

(56) References Cited

U.S. PATENT DOCUMENTS

| | | | | |
|---|---|---|---|---|
| 3,291,474 | A * | 12/1966 | Clarke | F03G 1/02 185/37 |
| 3,316,415 | A * | 4/1967 | Taylor | H02N 10/00 290/1 R |
| 3,599,443 | A * | 8/1971 | Paine | F24J 3/00 62/467 |
| 3,913,326 | A * | 10/1975 | Banks | F03G 7/065 60/527 |
| 4,150,544 | A * | 4/1979 | Pachter | F03G 7/06 60/527 |
| 5,339,653 | A * | 8/1994 | DeGregoria | A62B 9/003 165/10 |
| 5,465,781 | A | 11/1995 | DeGregoria | |
| 5,727,616 | A * | 3/1998 | Groenke | A62B 9/003 128/201.13 |
| 6,332,323 | B1 * | 12/2001 | Reid | F24J 3/00 62/467 |
| 6,367,281 | B1 * | 4/2002 | Hugenroth | F24J 3/00 62/467 |
| 6,568,196 | B2 * | 5/2003 | Pittman | C09K 5/14 62/132 |
| 8,701,405 | B2 * | 4/2014 | Alexander | F03G 7/065 60/527 |
| 9,121,647 | B2 * | 9/2015 | Cui | F25B 23/00 |
| 9,267,489 | B2 * | 2/2016 | Kim | F03B 17/00 |
| 2007/0039343 | A1 * | 2/2007 | Ikegami | B01D 53/263 62/271 |
| 2007/0183921 | A1 * | 8/2007 | Furuya | B22F 9/008 419/56 |
| 2007/0243810 | A1 | 10/2007 | Browne et al. | |
| 2010/0236236 | A1 * | 9/2010 | Mankame | F03G 7/065 60/527 |
| 2011/0121582 | A1 * | 5/2011 | Alexander | F03G 7/06 290/1 R |
| 2012/0273158 | A1 * | 11/2012 | Cui | C09K 5/14 165/10 |

FOREIGN PATENT DOCUMENTS

| | | |
|---|---|---|
| JP | 3-286975 A | 11/2012 |
| JP | 2012-220184 A | 11/2012 |
| WO | WO 02/084185 A1 | 10/2002 |

OTHER PUBLICATIONS

International Search Report, dated PCT/JP2013/005313, dated Oct. 22, 2013.
Written Opinion of the International Searching Authority, issued in PCT/JP2013/005313, dated Oct. 22, 2013.

* cited by examiner

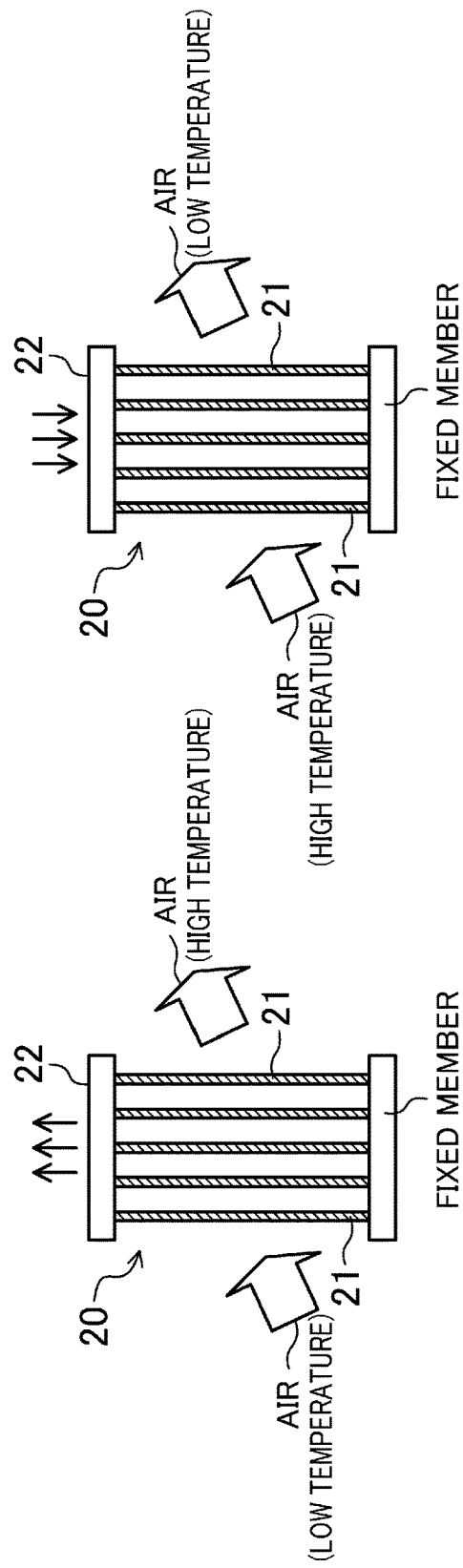

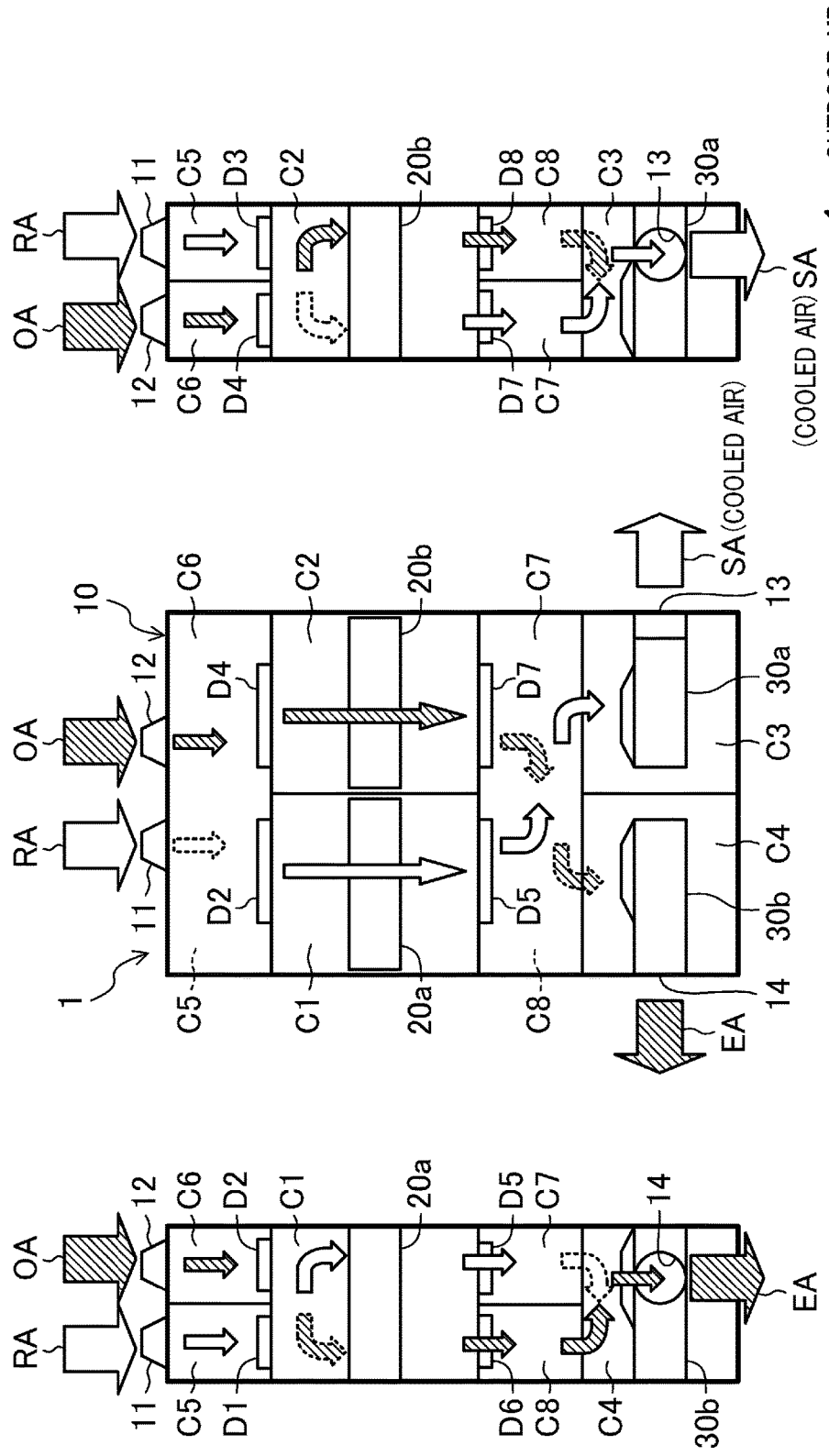

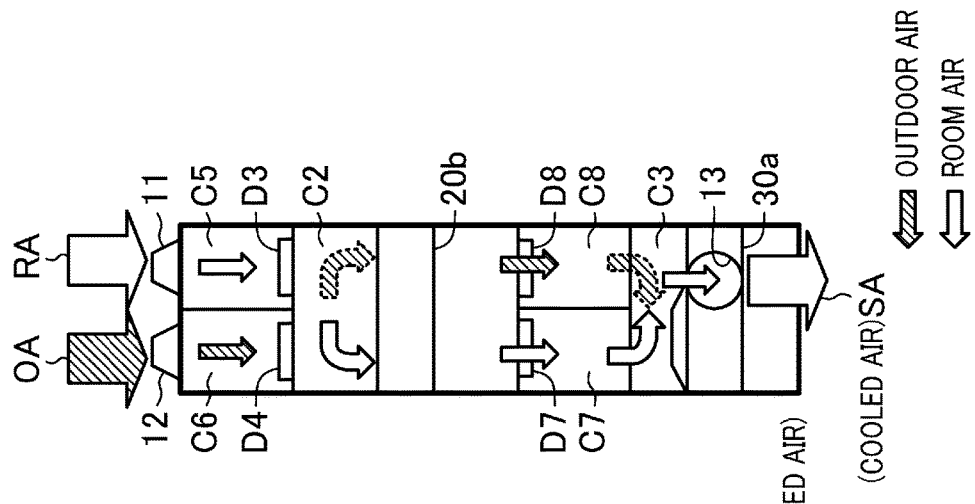
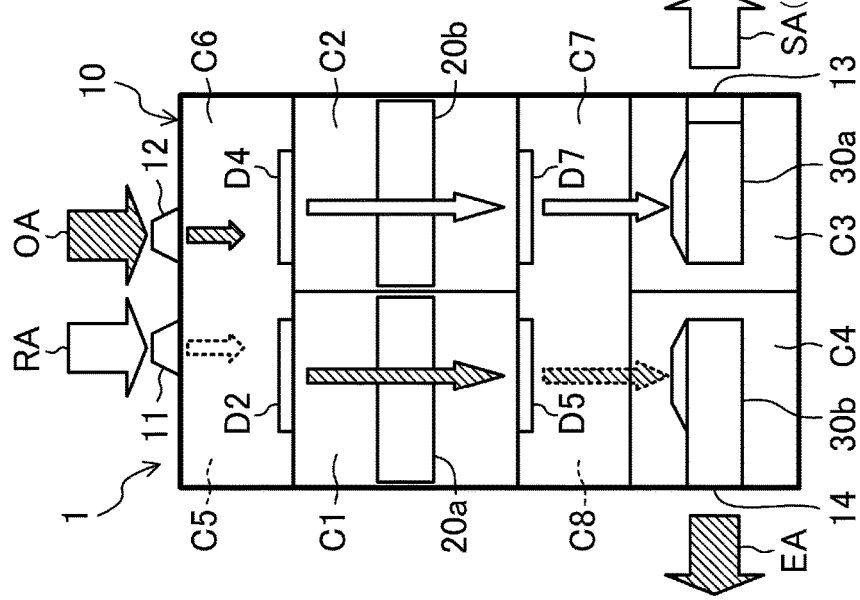
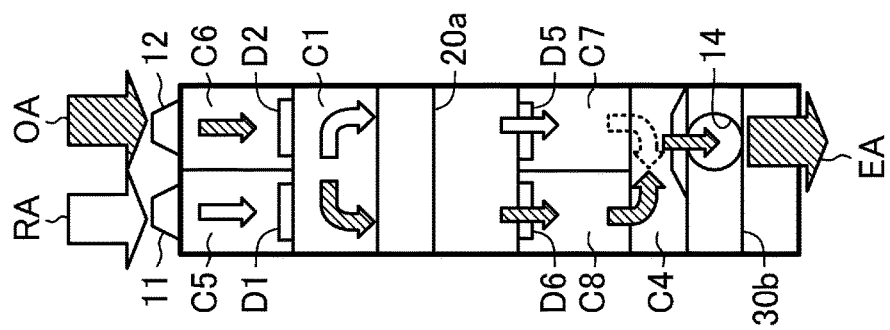

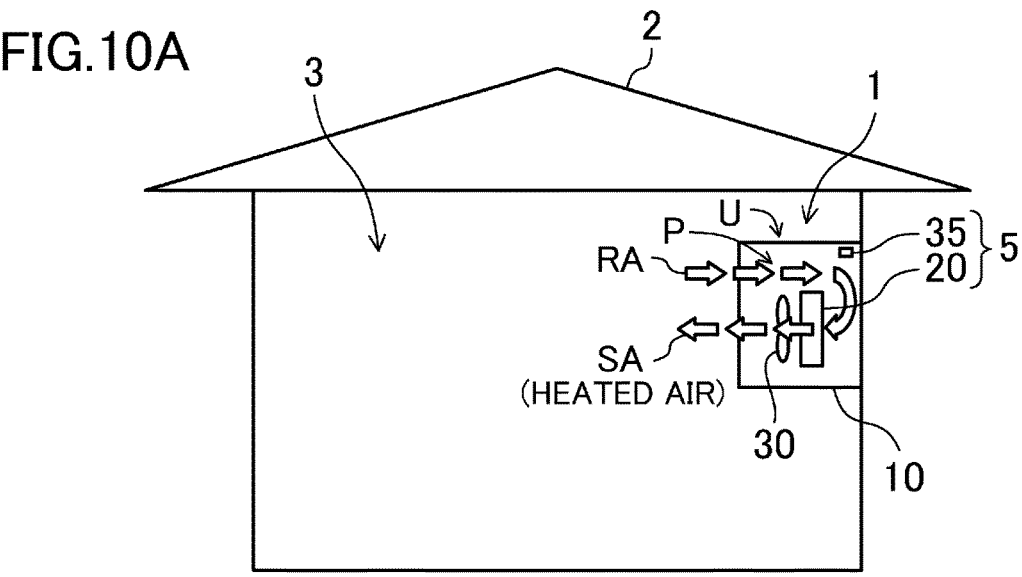
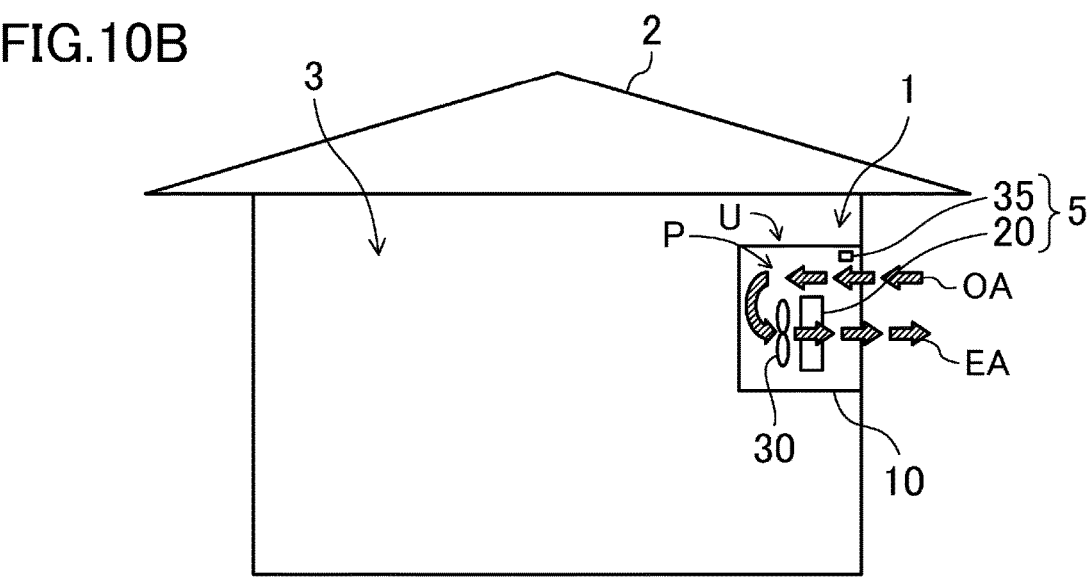

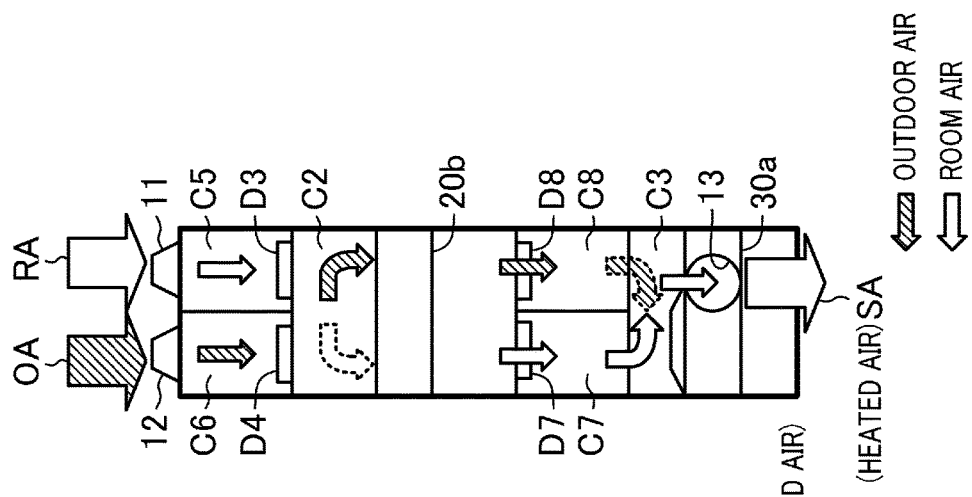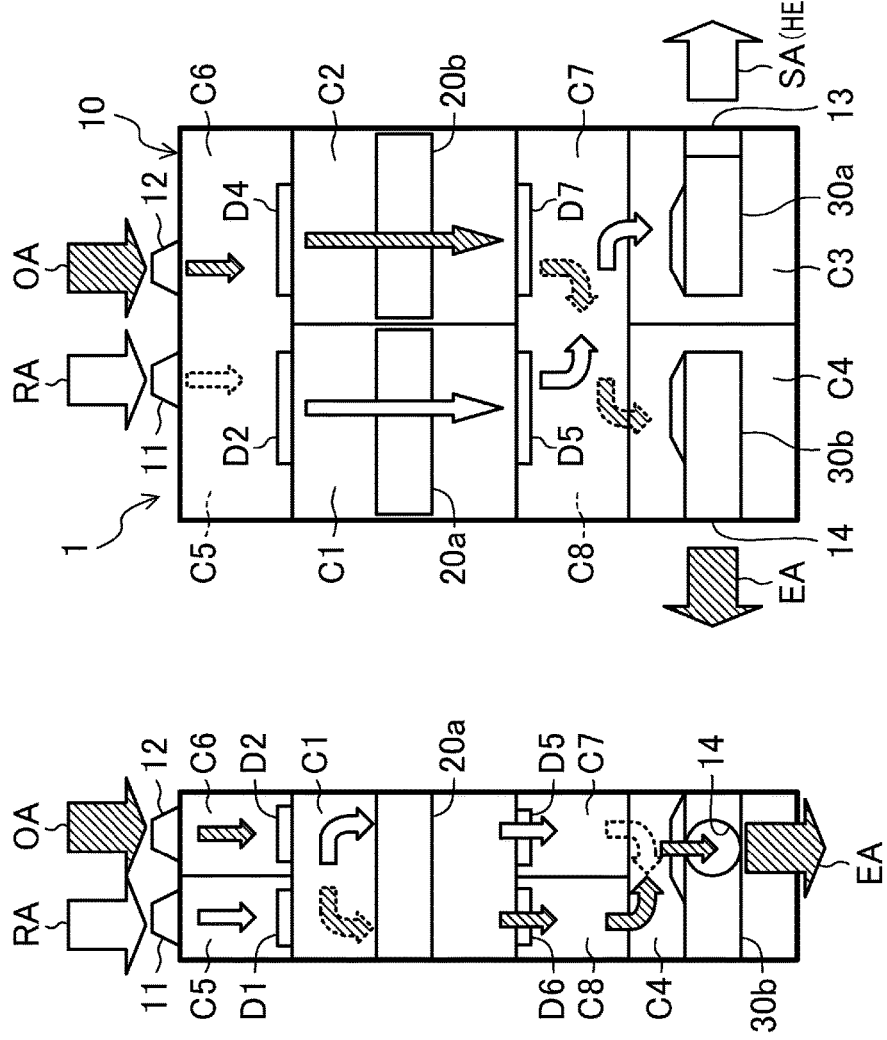

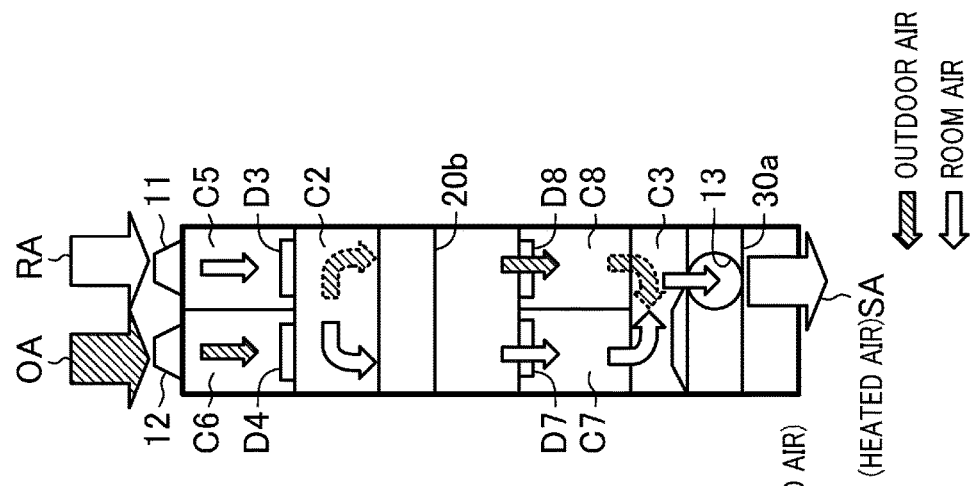
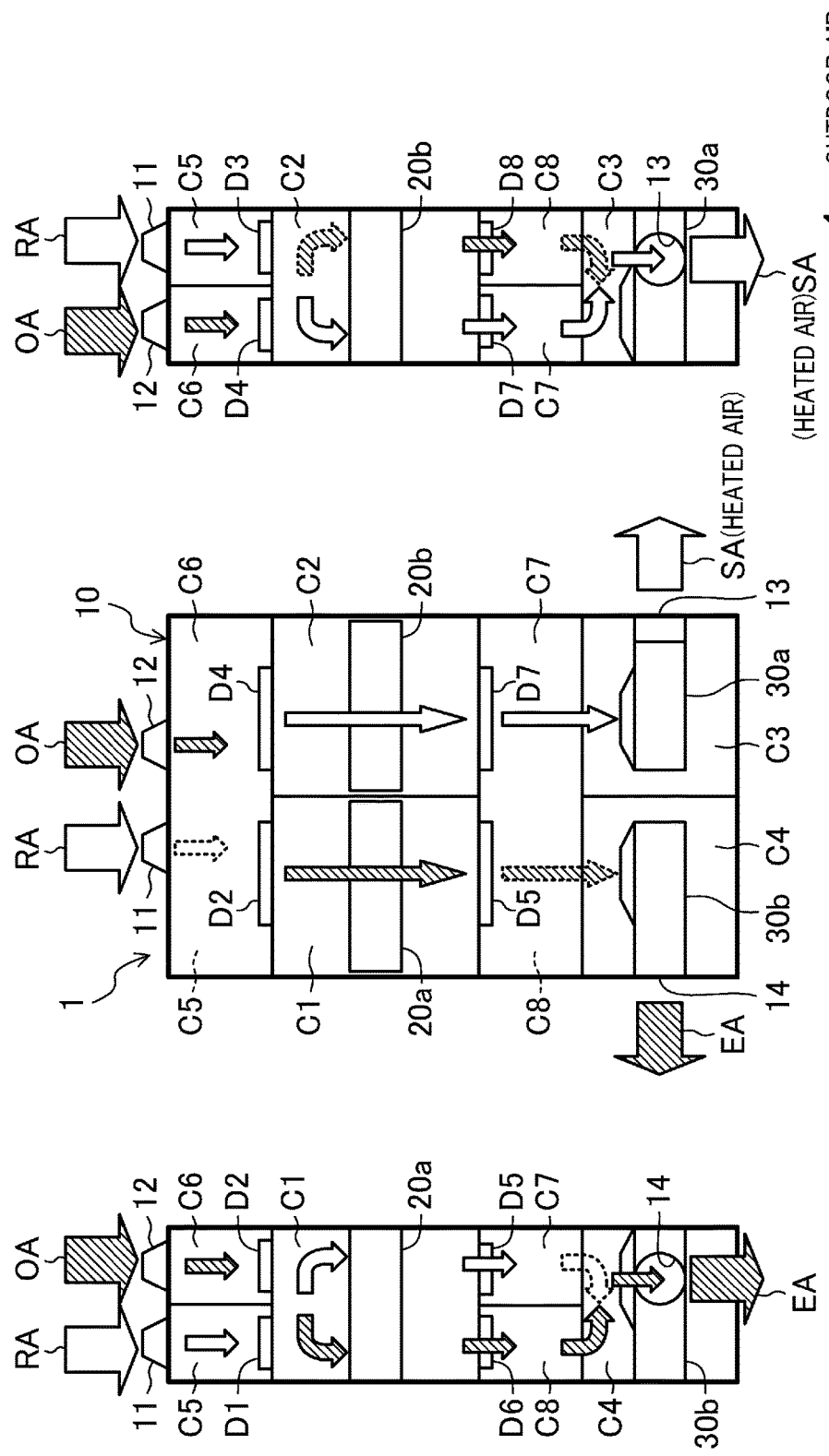

AIR FLOW

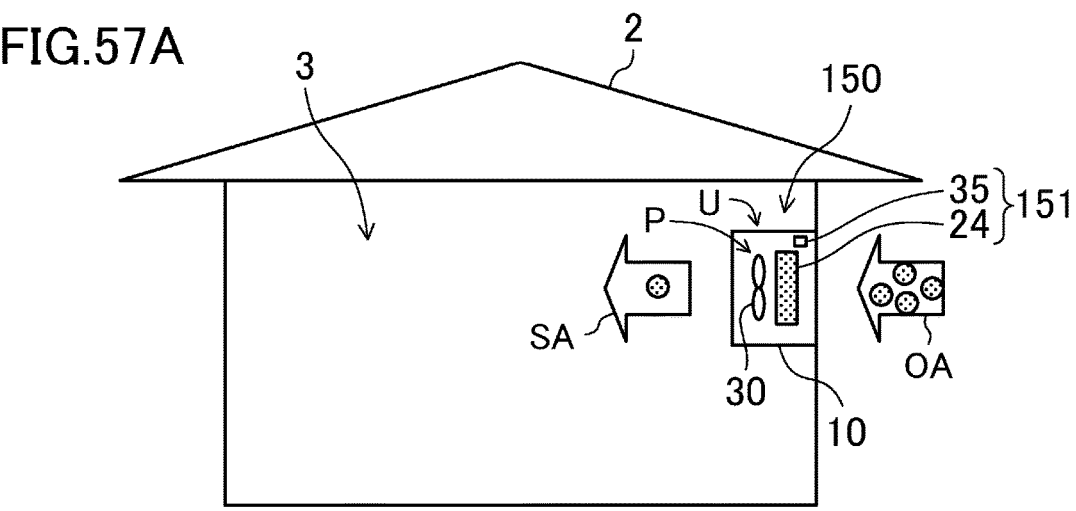
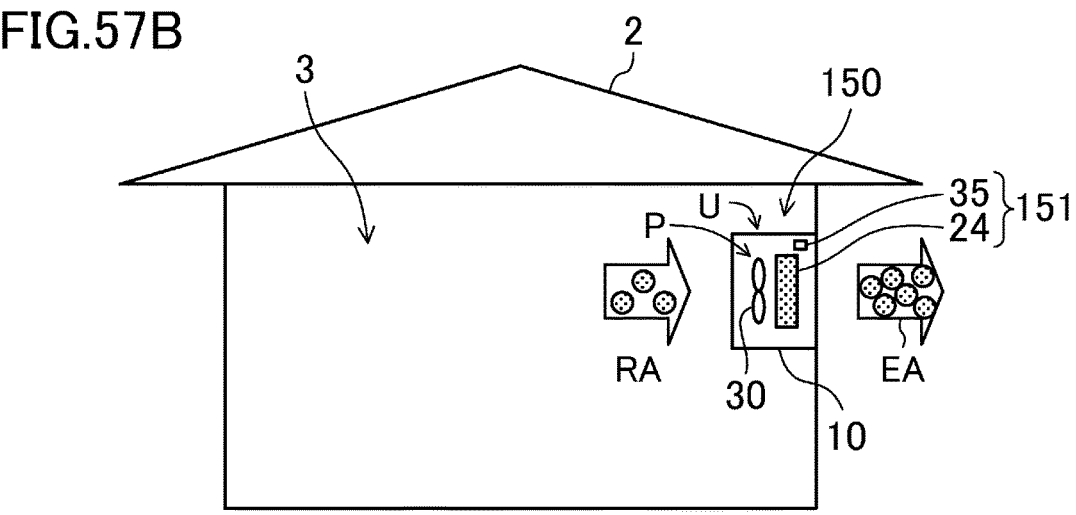

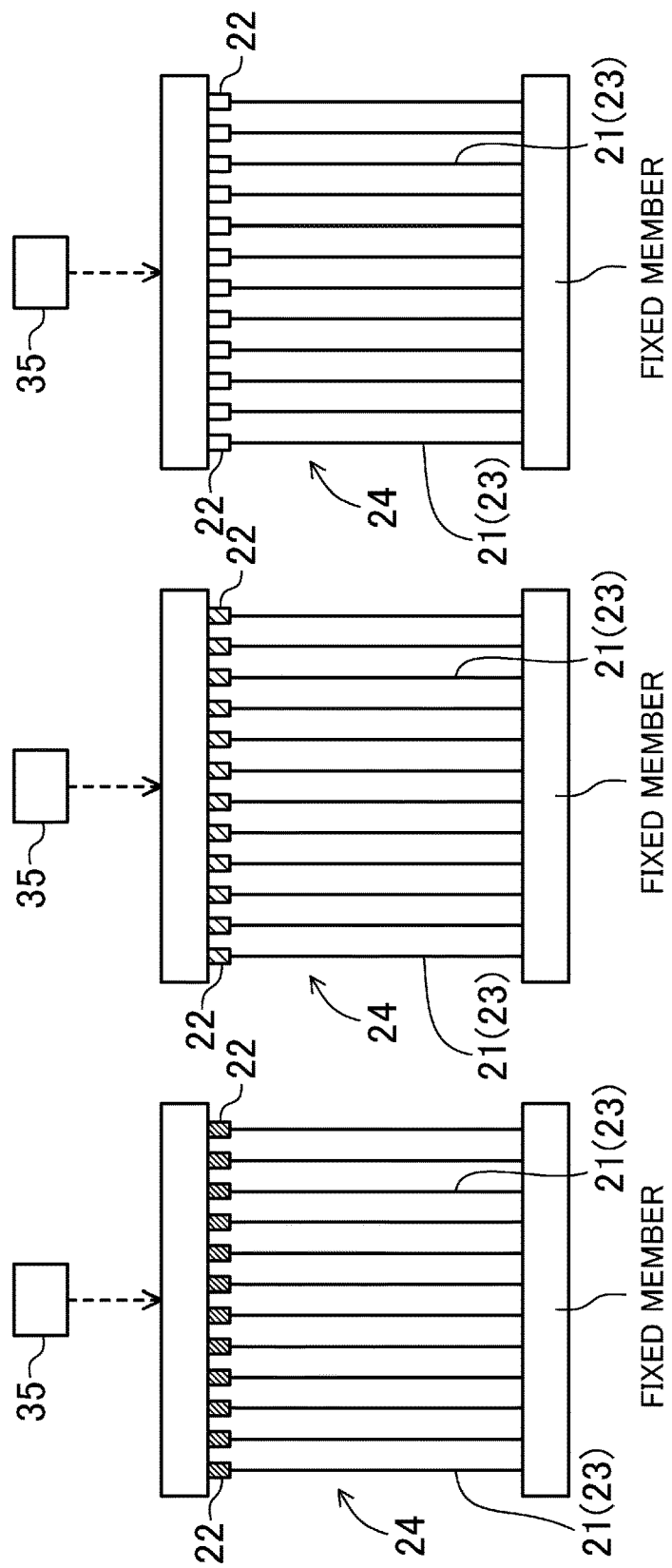

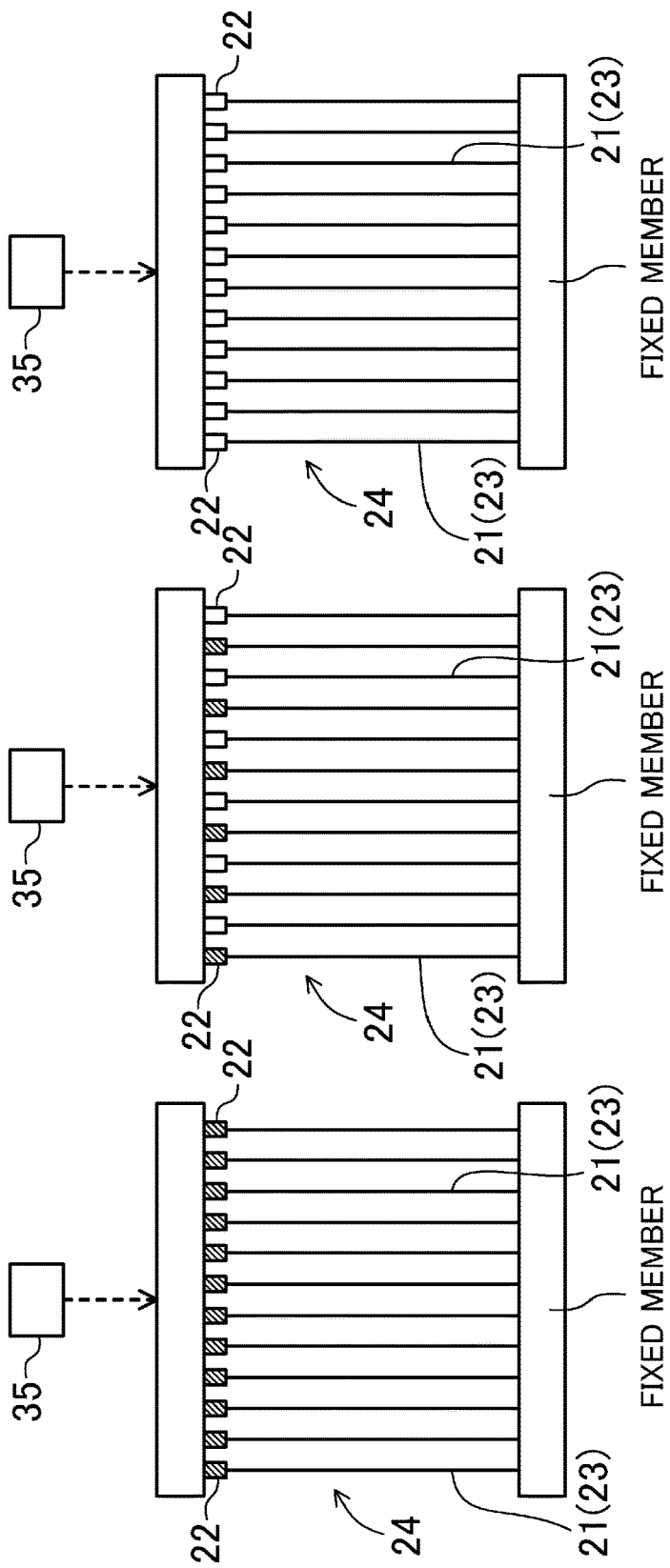

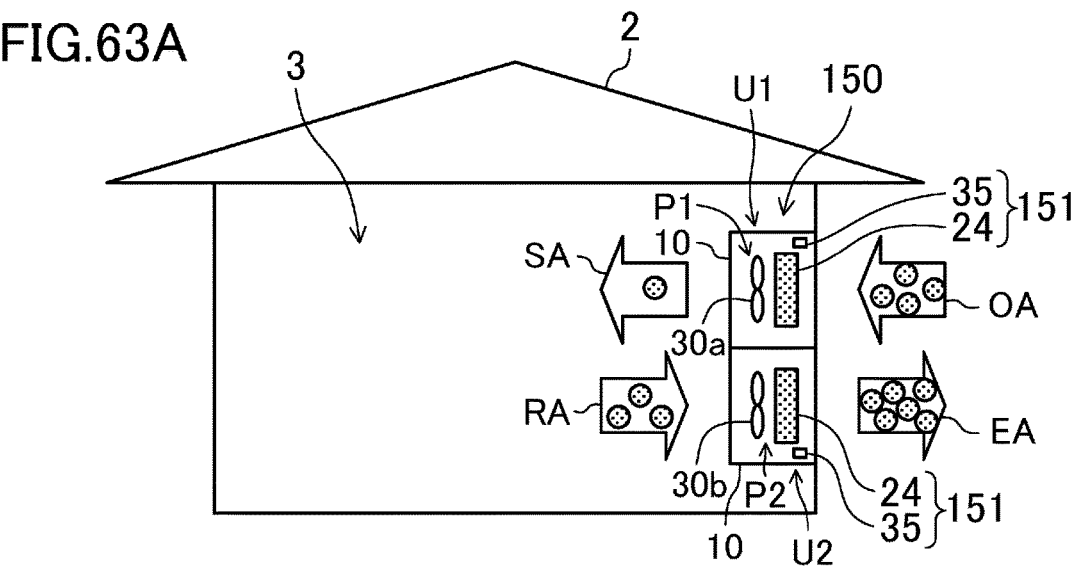
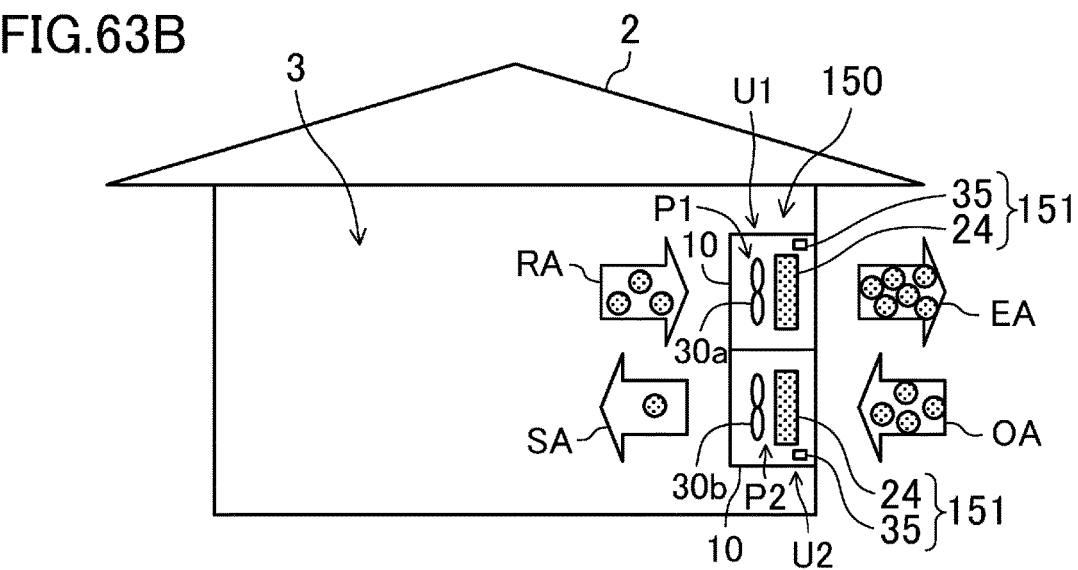

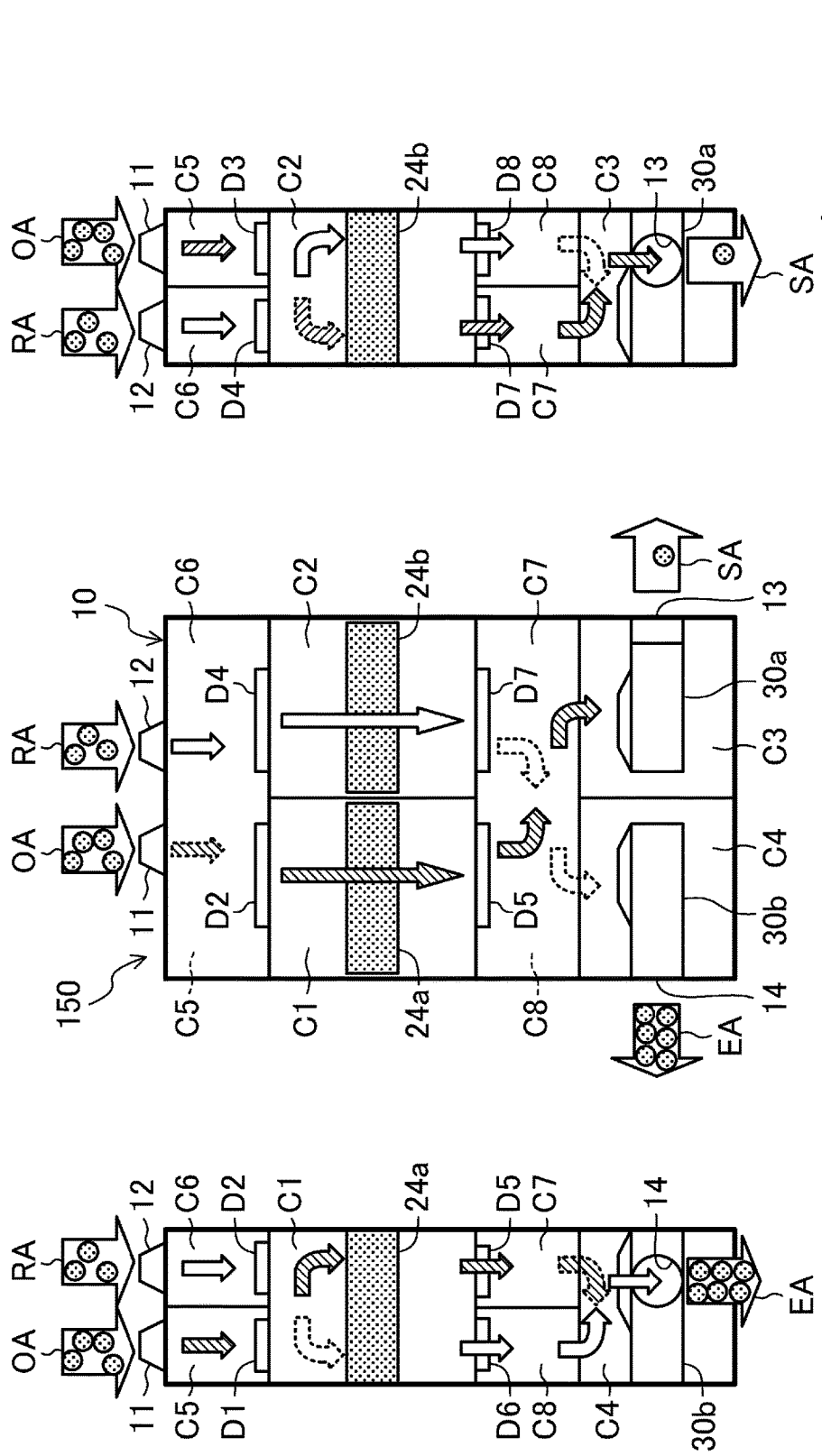

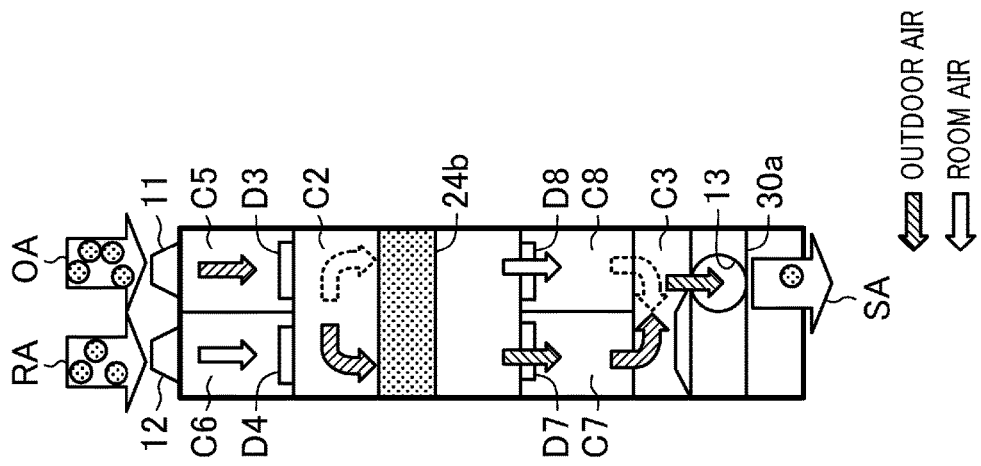
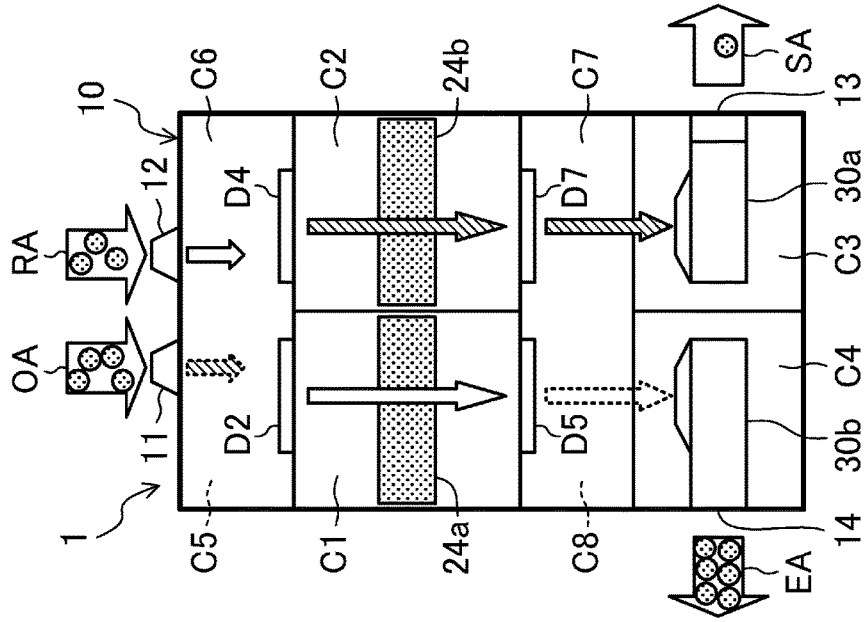
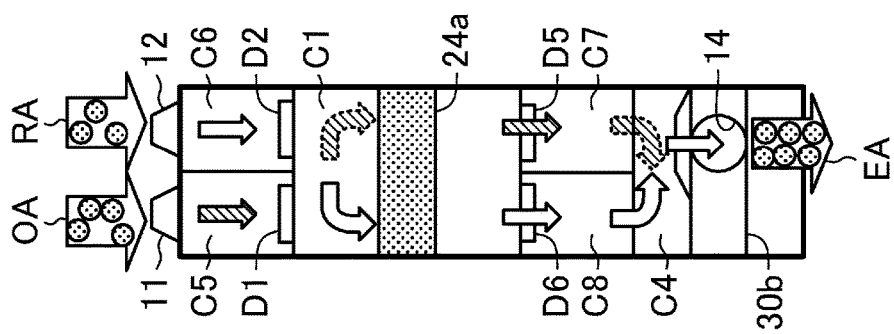

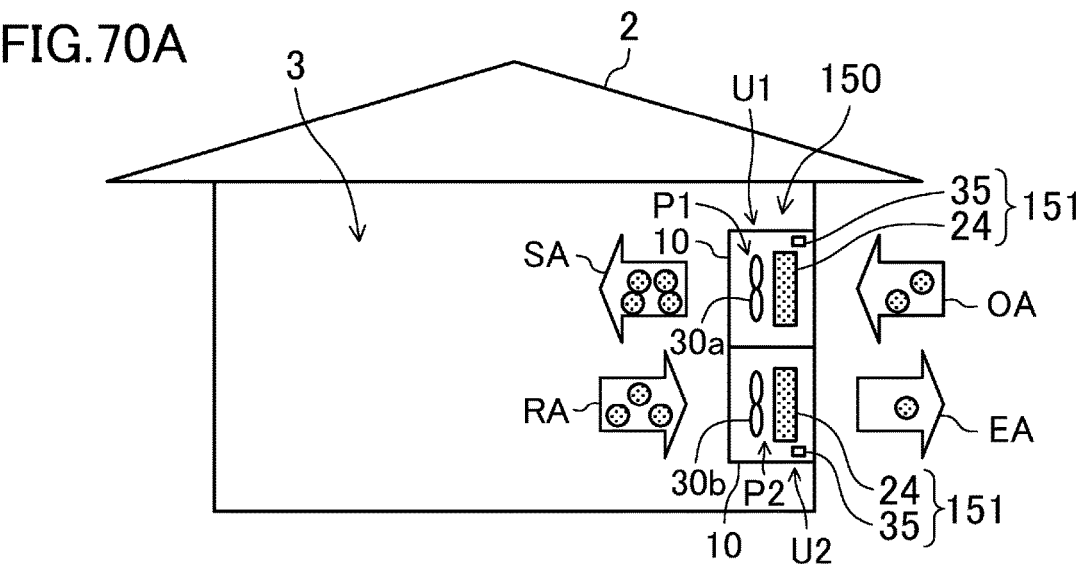
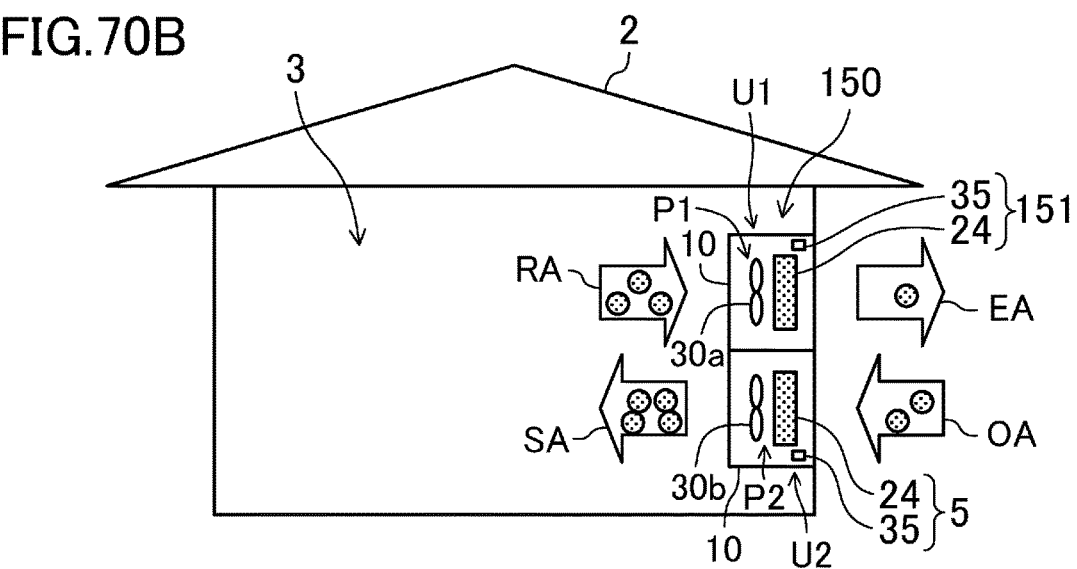

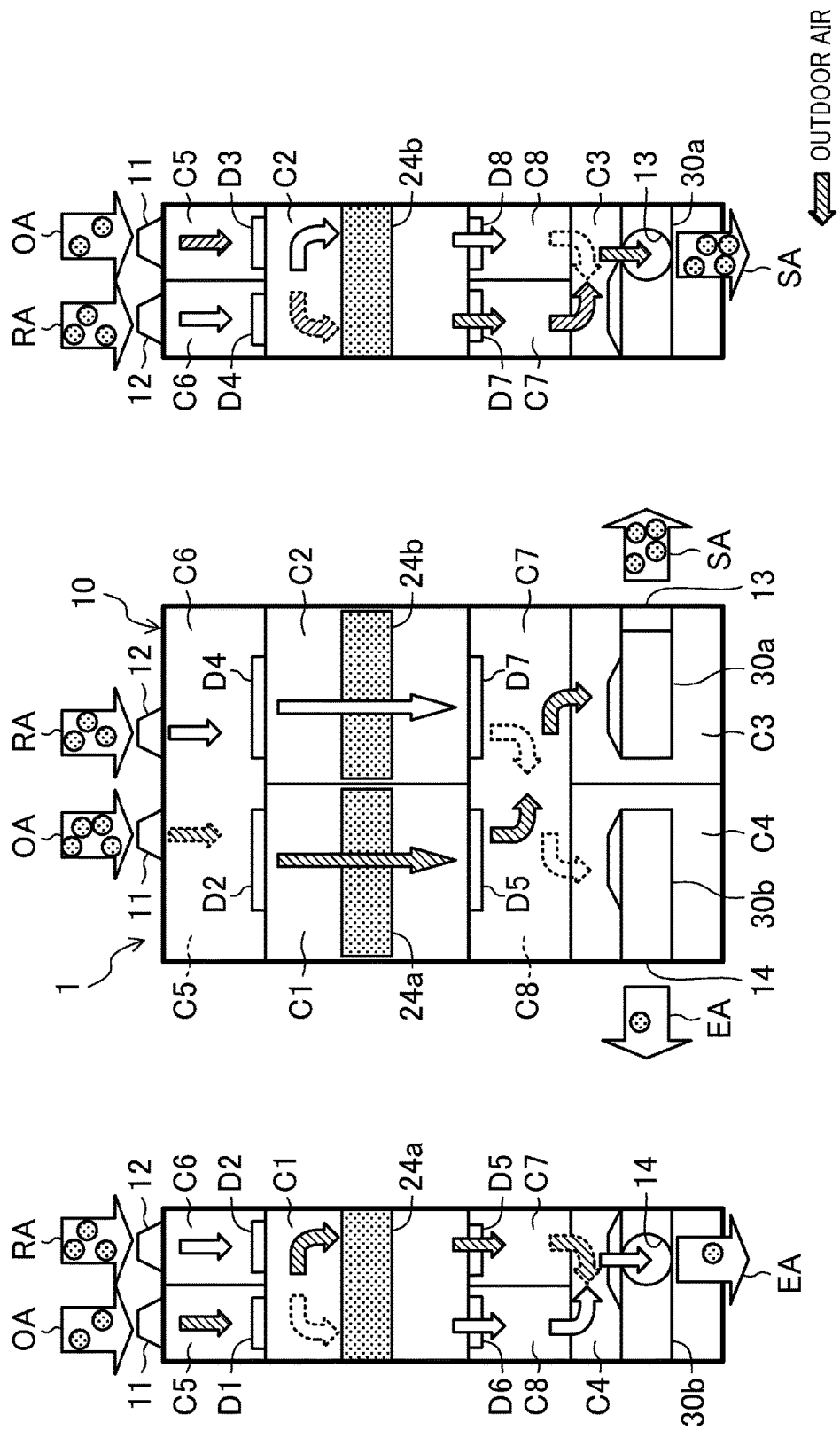

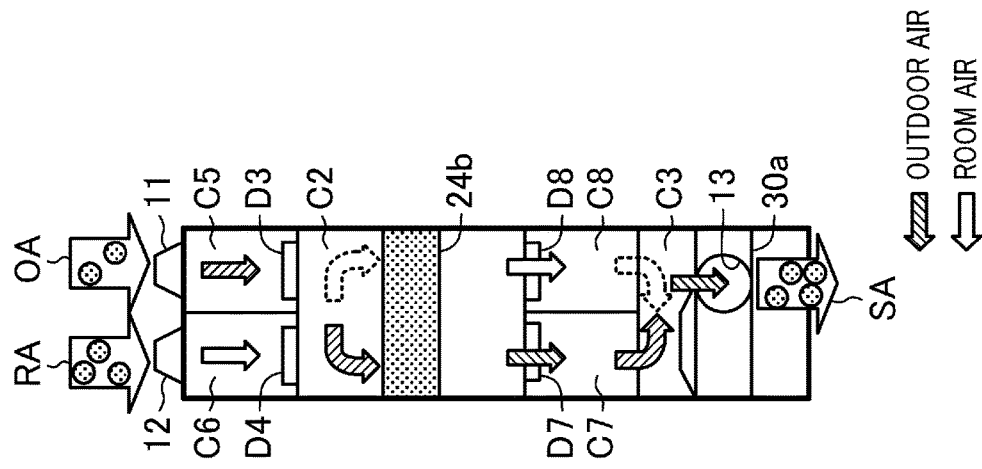
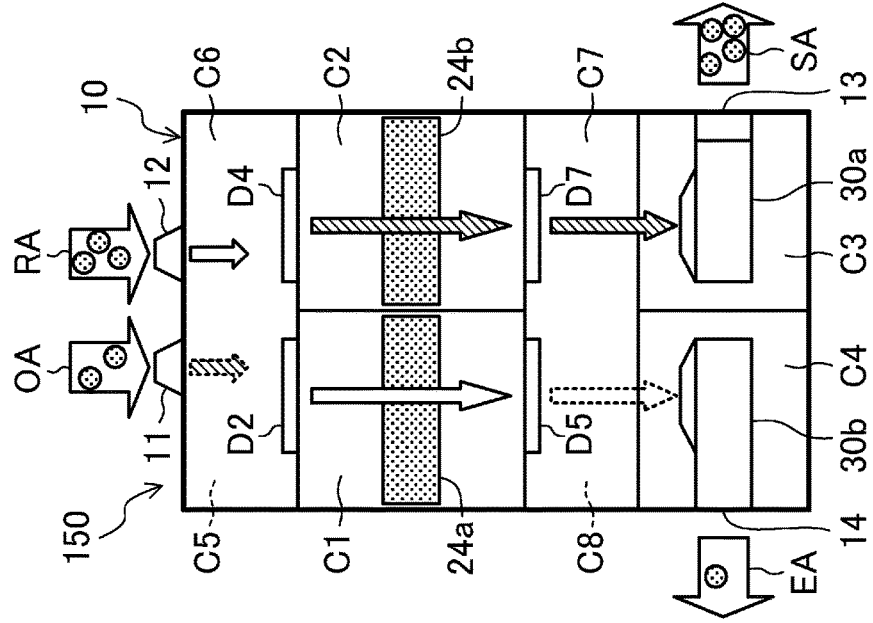
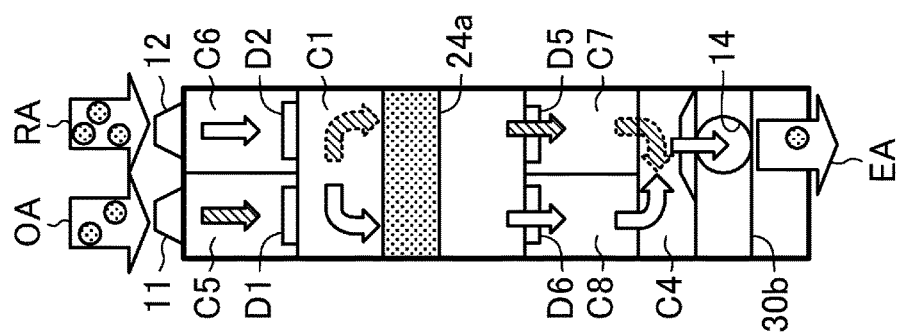

AIR CONDITIONING DEVICE

TECHNICAL FIELD

The present invention relates to a cooling/heating module configured to cool and heat air, a cooling/heating unit comprised of the cooling/heating module and a switching control section, and an air conditioner configured to control the temperature of an indoor air using the cooling/heating module.

BACKGROUND ART

A heat pump device is known in the art which uses the property of an elastic member of rubber or any other material that generates heat when allowed to expand adiabatically and that absorbs heat when allowed to contract adiabatically (see, for example, Patent Documents 1 and 2). If such a heat pump device is applied to an air conditioner, the air conditioner is allowed to perform a heating mode of operation by supplying a room with the air heated during the adiabatic expansion of the elastic member, and a cooling mode of operation by supplying the room with the air cooled during the adiabatic contraction of the elastic member.

CITATION LIST

Patent Document

PATENT DOCUMENT 1: Japanese Unexamined Patent Publication No. H3-286975
PATENT DOCUMENT 2: Japanese Unexamined Patent Publication No. H10-259965

SUMMARY OF INVENTION

Technical Problem

However, such a configuration that heats or cools the air by allowing an elastic member of rubber or any other suitable material to contract needs a mechanism for making the elastic member expand or contract, which will complicate the structure of the device and increase its size too much.

In view of the foregoing background, it is therefore an object of the present invention to provide measures for preventing an air conditioner, including a heat pump device that does not use any elastic member such as rubber, from having an excessively increased size or an overly complicated structure.

Solution to the Problem

A first aspect of the present invention is directed to an air conditioner, which includes: a cooling/heating module (20) including a thermoelastic material (21) and an actuator (22) applying tension to the thermoelastic material (21); a switching control section (35) selectively applying or removing tension to/from the thermoelastic material (21); and an air passage (P) where the cooling/heating module (20) is arranged.

According to the first aspect of the present invention, if tension is applied to a thermoelastic material (21), the thermoelastic material (21) has its entropy decreased to generate heat accordingly. On the other hand, if the tension applied to the thermoelastic material (21) is removed, its phase changes from martensitic phase into parent phase (austenitic phase), and the thermoelastic material (21) comes to have a decreased temperature when the material (21) is thermally insulated.

According to the first aspect of the present invention, air heated or cooled by the thermoelastic material (21) is supplied to an indoor space.

A second aspect of the present invention is an embodiment of the first aspect of the present invention. In the second aspect, the air conditioner is configured to perform a cooling mode of operation in which air cooled by the cooling/heating module (20) is supplied to an indoor space.

According to the second aspect of the present invention, tension applied to the thermoelastic material (21) is removed by the switching control section (35) and air cooled through a cooling operation is supplied to the indoor space.

A third aspect of the present invention is an embodiment of the first aspect of the present invention. In the third aspect, the air conditioner is configured to perform a heating mode of operation in which air heated by the cooling/heating module (20) is supplied to an indoor space.

A fourth aspect of the present invention is an embodiment of the first aspect of the present invention. In the fourth aspect, the air conditioner is configured to switch modes of operation from a cooling mode of operation in which air cooled by the cooling/heating module (20) is supplied to an indoor space into a heating mode of operation in which air heated by the cooling/heating module (20) is supplied to the indoor space, and vice versa.

A fifth aspect of the present invention is an embodiment of any one of the first to fourth aspects of the present invention. In the fifth aspect, the air conditioner is configured to supply room air that has passed through the cooling/heating module (20) to an indoor space.

According to the fifth aspect of the present invention, room air heated or cooled by the cooling/heating module (20) is supplied to the indoor space.

A sixth aspect of the present invention is an embodiment of any one of the first to fourth aspects of the present invention. In the sixth aspect, the air conditioner is configured to supply outdoor air that has passed through the cooling/heating module (20) to an indoor space.

According to the sixth aspect of the present invention, outdoor air heated or cooled by the cooling/heating module (20) is supplied to the indoor space.

A seventh aspect of the present invention is an embodiment of any one of the second, fourth, fifth and sixth aspects of the present invention. In the seventh aspect, during the cooling mode of operation, a first operation of supplying air to the indoor space and a second operation of exhausting air to the outdoor space are performed alternately in the air passage (P), and the switching control section (35) is configured to remove tension from the thermoelastic material (21) while performing the first operation, and apply tension to the thermoelastic material (21) while performing the second operation, during the cooling mode of operation.

According to the seventh aspect of the present invention, during the cooling mode of operation, a first operation of supplying air to the indoor space and a second operation of exhausting air to the outdoor space are performed alternately, thereby cooling the indoor space intermittently.

An eighth aspect of the present invention is an embodiment of any one of the second, fourth, fifth and sixth aspects of the present invention. In the eighth aspect, the cooling/heating module (20) includes first and second cooling/heating sections (20a, 20b), each comprising the thermoelastic material (21). During the cooling mode of operation, performed alternately in the air passage (P) are: a first operation of supplying air that has passed through the first cooling/heating section (20a) to the indoor space while exhausting air that has passed through the second cooling/heating section (20b) to the outdoor space; and a second operation of supplying air that has passed through the second cooling/heating section (20b) to the indoor space while exhausting air that has passed through the first cooling/heating section (20a) to the outdoor space. The switching control section (35) is configured to remove tension from the thermoelastic material (21) of the first cooling/heating section (20a), and apply tension to the thermoelastic material (21) of the second cooling/heating section (20b), while performing the first operation during the cooling mode of operation, and to remove tension from the thermoelastic material (21) of the second cooling/heating section (20b), and apply tension to the thermoelastic material (21) of the first cooling/heating section (20a), while performing the second operation during the cooling mode of operation.

According to the eighth aspect of the present invention, during the cooling mode of operation, first and second operations are performed alternately, and the indoor space is cooled continuously by the two cooling/heating sections (20a, 20b).

In a ninth aspect of the present invention, an air supply passage (P1) to supply air to the indoor space and an air exhaust passage (P2) to exhaust air to the outdoor space are provided. The cooling/heating module (20) is configured as a rotor rotating in a region that covers both the air supply passage (P1) and the air exhaust passage (P2). The switching control section (35) is configured to remove tension from the thermoelastic material (21) in a portion of the cooling/heating module (20), which is located in the air supply passage (P1), and apply tension to the thermoelastic material (21) in a portion of the cooling/heating module (20), which is located in the air exhaust passage (P2), during the cooling mode of operation.

According to the ninth aspect of the present invention, the cooling/heating module (20) is configured as a rotor, and is arranged in a region covering both an air supply passage (P1) and an air exhaust passage (P2). During the cooling mode of operation, tension is removed from a portion of the thermoelastic material (21) located in the air supply passage (P1), thus making the thermoelastic material (21) cool the air continuously. Also, during the cooling mode of operation, tension is applied to a portion of the thermoelastic material (21) located in the air exhaust passage (P2), thus releasing the heat of the thermoelastic material (21) into the air.

A tenth aspect of the present invention is an embodiment of any one of the third to sixth aspects of the present invention. In the tenth aspect, during the heating mode of operation, a first operation of supplying air to the indoor space and a second operation of exhausting air to the outdoor space are performed alternately in the air passage (P). The switching control section (35) is configured to apply tension to the thermoelastic material (21) while performing the first operation, and remove tension from the thermoelastic material (21) while performing the second operation, during the heating mode of operation.

According to the tenth aspect of the present invention, during the heating mode of operation, a first operation of supplying air to the indoor space and a second operation of exhausting air to the outdoor space are performed alternately, thus heating the indoor space intermittently.

An eleventh aspect of the present invention is an embodiment of any one of the third to sixth aspects of the present invention. In the eleventh aspect, the cooling/heating module (20) includes first and second cooling/heating sections (20a, 20b), each comprising the thermoelastic material (21). During the heating mode of operation, performed alternately in the air passage (P) are: a first operation of supplying air that has passed through the first cooling/heating section (20a) to the indoor space while exhausting air that has passed through the second cooling/heating section (20b) to the outdoor space; and a second operation of supplying air that has passed through the second cooling/heating section (20b) to the indoor space while exhausting air that has passed through the first cooling/heating section (20a) to the outdoor space. The switching control section (35) is configured to apply tension to the thermoelastic material (21) of the first cooling/heating section (20a), and remove tension from the thermoelastic material (21) of the second cooling/heating section (20b), while performing the first operation during the heating mode of operation, and to remove tension from the thermoelastic material (21) of the second cooling/heating section (20b), and apply tension to the thermoelastic material (21) of the first cooling/heating section (20a), while performing the second operation during the heating mode of operation.

According to the eleventh aspect of the present invention, during the heating mode of operation, first and second operations are performed alternately, and the indoor space is heated continuously by the two cooling/heating sections (20a, 20b).

A twelfth aspect of the present invention is an embodiment of any one of the third to sixth aspects of the present invention. In the twelfth aspect, an air supply passage (P1) to supply air to the indoor space and an air exhaust passage (P2) to exhaust air to the outdoor space are provided. The cooling/heating module (20) is configured as a rotor rotating in a region that covers both the air supply passage (P1) and the air exhaust passage (P2). The switching control section (35) is configured to apply tension to the thermoelastic material (21) in a portion of the cooling/heating module (20), which is located in the air supply passage (P1), and remove tension from the thermoelastic material (21) in a portion of the cooling/heating module (20), which is located in the air exhaust passage (P2), during the heating mode of operation.

According to the twelfth aspect of the present invention, the cooling/heating module (20) is configured as a rotor, and is arranged in a region covering both an air supply passage (P1) and an air exhaust passage (P2). During the heating mode of operation, tension is applied to a portion of the thermoelastic material (21) located in the air supply passage (P1), thus causing the thermoelastic material (21) to heat the air continuously. Also, during the heating mode of operation, tension is removed from a portion of the thermoelastic material (21) located in the air exhaust passage (P2), thus applying the heat in the air to the thermoelastic material (21).

A thirteenth aspect of the present invention is an embodiment of any one of the first to twelfth aspects of the present invention. In the thirteenth aspect, the switching control section (35) is configured to adjust the quantity of heat generated by the thermoelastic material (21) by changing the magnitude of tension applied to the thermoelastic material (21).

According to the thirteenth aspect of the present invention, by making the switching control section (35) change the magnitude of tension applied to the thermoelastic material (21), the quantity of heat generated by the thermoelastic material (21) changes and the cooling/heating capacity is controlled.

A fourteenth aspect of the present invention is an embodiment of any one of the first to twelfth aspects of the present invention. In the fourteenth aspect, the cooling/heating module (20) includes a plurality of cooling/heating modules (20), and the switching control section (35) is configured to adjust the quantity of heat generated by a plurality of the thermoelastic materials (21) by changing a ratio at which tension is applied to the thermoelastic materials (21).

According to the fourteenth aspect of the present invention, by changing a ratio at which tension is applied to all of a plurality of the thermoelastic materials (21), the quantity of heat generated by the thermoelastic material (21) is adjusted and the cooling/heating capacity is controlled.

A fifteenth aspect of the present invention is an embodiment of any one of the seventh, eighth, ninth and eleventh aspects of the present invention. In the fifteenth aspect, the switching control section (35) is configured to adjust the quantity of heat generated by the thermoelastic material (21) and control cooling/heating capacity by changing time intervals at which the first and second operations are performed repeatedly.

According to the fifteenth aspect of the present invention, by changing time intervals at which the first and second operations are performed repeatedly, the quantity of heat generated by the thermoelastic material (21) is adjusted and cooling/heating capacity is controlled.

Advantages of the Invention

According to the first aspect of the present invention, if tension is applied to the thermoelastic material (21), the thermoelastic material (21) has its entropy decreased to generate heat accordingly. This thus allows for performing a heating mode of operation by heating the air and supplying the room with the heated air. On the other hand, if the tension applied to the thermoelastic material (21) is removed, its phase changes from martensitic phase into parent phase (austenitic phase), and the thermoelastic material (21) comes to have a decreased temperature when the material (21) is thermally insulated. Thus, the surrounding air is also cooled. This thus allows for performing a cooling mode of operation by cooling the air and supplying the room with the cooled air.

In addition, according to the present invention, no elastic member of rubber, for example, is adopted, and therefore, there is no need to provide any mechanism for making the elastic member expand or contract, which thus prevents the device from having an excessively complicated structure or an overly increased size.

According to the first aspect of the present invention described above, the switching control section (35) is made to selectively apply or remove tension to/from the thermoelastic material (21), thus allowing for performing a cooling operation of cooling air and a heating operation of heating air. In addition, the cooling/heating unit comes to have a reduced overall size. Thus, by using such a cooling/heating unit in an air conditioner, an air conditioner having neither an excessively complicated structure nor an overly increased size is provided easily, and settings for the cooling and heating modes of operations are done easily, too.

The second to fourth aspects of the present invention described above achieve easily a configuration for performing only a cooling mode operation (second aspect), a configuration for performing only a heating mode of operation (third aspect) and a configuration for switching modes of operation from cooling to heating, and vice versa (fourth aspect).

The fifth aspect of the present invention allows for cooling or heating the indoor space while circulating the room air.

The seventh aspect of the present invention allows for cooling the indoor space intermittently. The eighth and ninth aspects of the present invention allow for cooling the indoor space continuously. The tenth aspect of the present invention allows for heating the indoor space intermittently. The eleventh and twelfth aspects of the present invention allow for heating the indoor space continuously.

The thirteenth aspect of the present invention allows for adjusting the quantity of heat generated by the thermoelastic material (21) depending on the magnitude of tension applied and controlling the cooling/heating capacity easily, thus enabling the device to select an appropriate mode of operation based on the given air-conditioning load.

The fourteenth aspect of the present invention allows for adjusting the quantity of heat generated by the thermoelastic material (21) depending on the tension application ratio and controlling the cooling/heating capacity easily, thus enabling the device to select an appropriate mode of operation based on the given air-conditioning load.

The fifteenth aspect of the present invention allows for adjusting the quantity of heat generated by the thermoelastic material (21) depending on the time intervals at which the tension is applied and controlling the cooling/heating capacity easily, thus enabling the device to select an appropriate mode of operation based on the given air-conditioning load.

BRIEF DESCRIPTION OF THE DRAWINGS

FIG. 1 illustrates generally a state where an air conditioner according to first and fourth embodiments of the present invention is installed indoors, wherein

FIG. 3A illustrates a general configuration for a cooling/heating module to show a heating operation state thereof, and FIG. 3B illustrates a general configuration for a cooling/heating module to show a cooling operation state thereof.

FIG. 4 illustrates generally a state where an air conditioner according to a first variation of the first embodiment and a first variation of the fourth embodiment is installed indoors, wherein

FIG. 5 illustrates generally a state where an air conditioner according to a second variation of the first embodiment and a second variation of the fourth embodiment is installed indoors, wherein

FIG. 7 illustrates how the air conditioner shown in FIG. 6 performs a first operation, wherein FIGS. 7A, 7B and 7C respectively illustrate a planar structure, a left side face structure and a right side face structure thereof.

FIG. 8 illustrates how the air conditioner shown in FIG. 6 performs a second operation, wherein FIGS. 8A, 8B and 8C respectively illustrate a planar structure, a left side face structure and a right side face structure thereof.

FIG. 10 illustrates generally a state where an air conditioner according to second and fourth embodiments is installed indoors, wherein FIG. 10A illustrates an operating state of a heating operation and FIG. 10B illustrates an operating state of a cooling operation.

FIG. 11 illustrates generally a state where an air conditioner according to a first variation of the second embodiment and a first variation of the fourth embodiment is installed indoors, wherein

FIG. 12 illustrates generally a state where an air conditioner according to a second variation of the second embodiment and a second variation of the fourth embodiment is installed indoors, wherein

FIG. 14 illustrates how the air conditioner shown in FIG. 13 performs a first operation, wherein FIGS. 14A, 14B and 14C respectively illustrate a planar structure, a left side face structure and a right side face structure thereof.

FIG. 15 illustrates how the air conditioner shown in FIG. 13 performs a second operation, wherein FIGS. 15A, 15B and 15C respectively illustrate a planar structure, a left side face structure and a right side face structure thereof.

FIG. 17 illustrates generally a state where an air conditioner according to a third embodiment and a fifth variation of the fourth embodiment is installed indoors, wherein

FIG. 19 illustrates generally a state where an air conditioner according to a second variation of the third embodiment and a fifth variation of the fourth embodiment is installed indoors, wherein

FIG. 38 illustrates, on a larger scale, a portion of a cooling/heating module according to the sixth embodiment, wherein

FIG. 57 illustrates generally a state where a humidity control device according to an eighth embodiment of the present invention is installed indoors, wherein FIG. 57A illustrates an operating state of a moisture absorbing operation and FIG. 57B illustrates an operating state of a moisture desorbing operation.

FIG. 60 illustrates some tensioning means.

FIG. 61 illustrates some tensioning means.

FIG. 62 illustrates generally a state where a humidity control device according to a first variation of the eighth embodiment and a first variation of an eleventh embodiment is installed indoors, wherein

FIG. 63 illustrates generally a state where a humidity control device according to a second variation of the eighth embodiment and a second variation of the eleventh embodiment is installed indoors, wherein FIG. 63A illustrates a first operating state and FIG. 63B illustrates a second operating state.

FIG. 65 illustrates how the humidity control device shown in FIG. 64 performs a first operation, wherein FIGS. 65A, 65B and 65C respectively illustrate a planar structure, a left side face structure and a right side face structure thereof.

FIG. 66 illustrates how the humidity control device shown in FIG. 64 performs a second operation, wherein FIGS. 66A, 66B and 66C respectively illustrate a planar structure, a left side face structure and a right side face structure thereof.

FIG. 68 illustrates generally a state where a humidity control device according to ninth and eleventh embodiments is installed indoors, wherein

FIG. 69 illustrates generally a state where a humidity control device according to a first variation of the ninth embodiment and a first variation of the eleventh embodiment is installed indoors, wherein

FIG. 70 illustrates generally a state where a humidity control device according to a second variation of the ninth embodiment and a second variation of the eleventh embodiment is installed indoors, wherein FIG. 70A illustrates a first operating state and FIG. 70B illustrates a second operating state.

FIG. 72 illustrates how the humidity control device shown in FIG. 71 performs a first operation, wherein FIGS. 72A, 72B and 72C respectively illustrate a planar structure, a left side face structure and a right side face structure thereof.

FIG. 73 illustrates how the humidity control device shown in FIG. 71 performs a second operation, wherein FIGS. 73A, 73B and 73C respectively illustrate a planar structure, a left side face structure and a right side face structure thereof.

FIG. 75 illustrates generally a state where a humidity control device according to a tenth embodiment and a fifth variation of the eleventh embodiment is installed indoors, wherein

FIG. 77 illustrates generally a state where a humidity control device according to a second variation of the tenth embodiment and a fifth variation of the eleventh embodiment is installed indoors, wherein

DESCRIPTION OF EMBODIMENTS

Embodiments of the present invention will now be described with reference to the accompanying drawings.

«First Embodiment of This Invention»

A first embodiment of the present invention will be described.

——Overall Configuration for Air Conditioner——

Figure 1A:
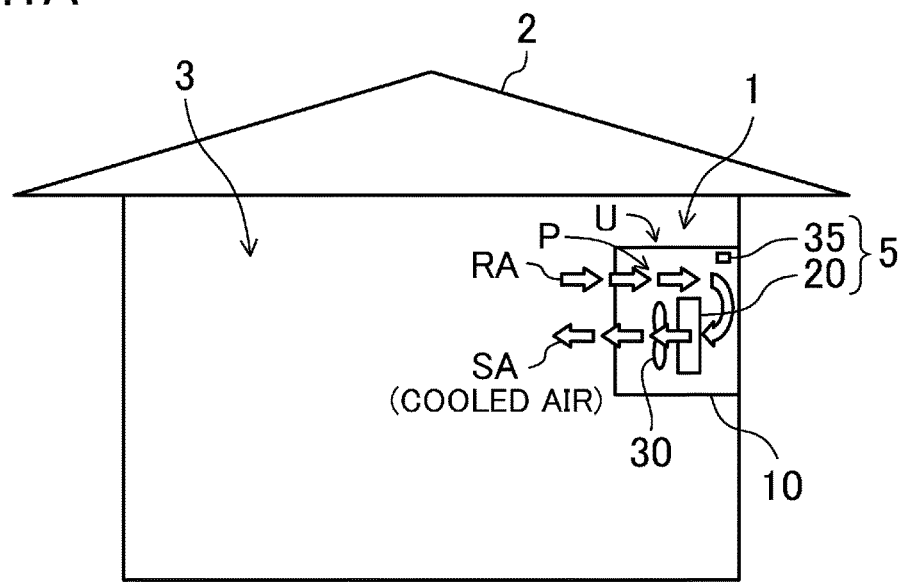
FIG. 1A illustrates an operating state of a cooling operation and FIG. 1B illustrates an operating state of a heating operation.
Figure 1B:
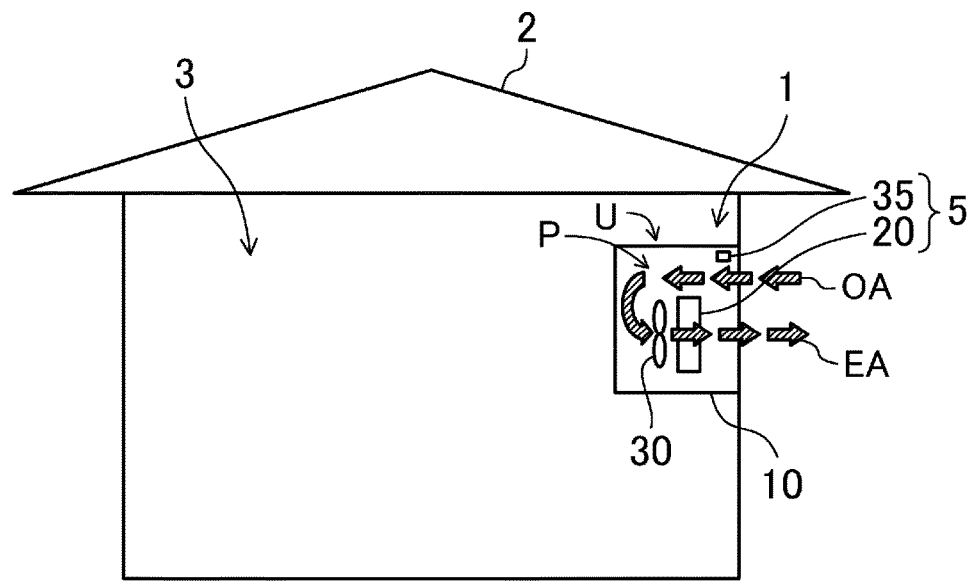

FIG. 1 illustrates generally a state where an air conditioner (1) according to a first embodiment is installed inside a building (2) (i.e., in an indoor space (3) to be air-conditioned). FIG. 1A illustrates an operating state of its cooling operation (i.e., heat absorbing operation) and FIG. 1B illustrates an operating state of its heating operation (i.e., heat dissipating operation). The air conditioner (1) of this first embodiment is configured to operate as a cooling-only machine.

This air conditioner (1) includes a casing (10), a cooling/heating module (20) housed inside the casing (10), a fan (30) which makes air flow through the cooling/heating module (20), and a switching control section (35) which adjusts the tensile force to be applied to the cooling/heating module (20). The cooling/heating module (20) and the switching control section (35) constitute a cooling/heating unit (5). Also, the casing (10) and various functional parts housed inside the casing (10) constitute an indoor unit (U).

Inside the casing (10), an air passage (P) has been formed to make the air introduced into the casing (10) pass through the cooling/heating module (20). More particularly, the air sucked from the indoor space (3) into the casing (10) is processed by the cooling/heating module (20) while passing through the air passage (P) to go back into the indoor space (3). Also, as will be described later, this air conditioner (1) is configured to cool the indoor space (3) intermittently. Thus, while the air conditioner (1) temporarily stops cooling the indoor space (3), the air sucked from an outdoor space into the casing (10) removes heat from the cooling/heating module (20) while passing through the air passage (P) to be exhausted into the outdoor space again.

To make the air flow along this passage, the inside of the casing (10) of this air conditioner (1) is partitioned with a partition plate, a damper and other members (not shown) so that the air sucked from the indoor space, the air being blown into the indoor space, the air sucked from the outdoor space and the air being exhausted into the outdoor space do not mix with each other.

——Cooling/Heating Module——

Figure 2A:
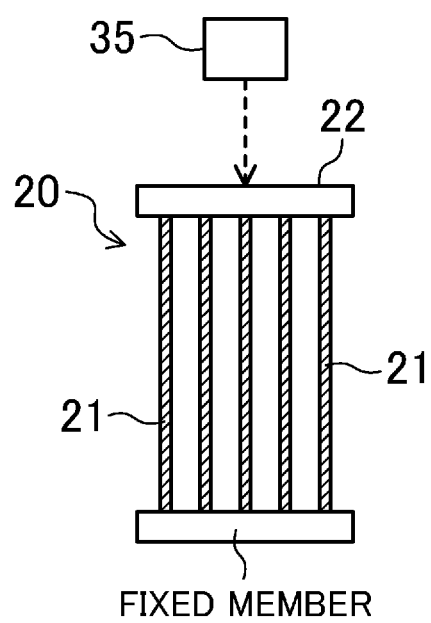
FIG. 2A illustrates a general configuration for a cooling/heating module for use in the air conditioner shown in FIG. 1.

As can be seen from its general configuration illustrated in FIG. 2A, the cooling/heating module (20) includes a thermoelastic material (21) and an actuator (22) which applies tensile force to the thermoelastic material (21). Note that the tensile force applied to the thermoelastic material (21) constitutes tension according to the present invention.

Figure 21:
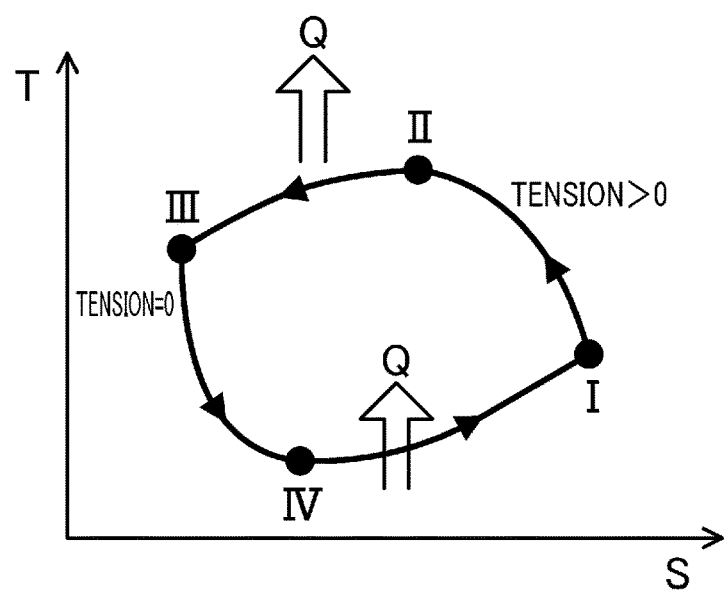
FIG. 21 is a T-S diagram of a thermoelastic material.

The thermoelastic material (21) may be made of a shape memory alloy, for example, and heats the object when tension is applied to the material and cools the object when tension is removed from the material. More particularly, as shown in FIG. 21, when tension is applied to the thermoelastic material (21), the thermoelastic material (21) changes from the parent phase (i.e., austenitic phase) to the martensitic phase. Thus, the thermoelastic material (21) comes to have decreased entropy and generates some heat correspondingly. As a result, the thermoelastic material (21) heats itself (i.e., the phase changes from I to II). When the thermoelastic material (21) is brought into contact with the object to be heated with tension continuously applied to the thermoelastic material (21), the heat propagates from the thermoelastic material (21) to the object to be heated (i.e., the phase changes from II to III). Consequently, the temperature of the thermoelastic material (21) falls. Thereafter, when the tension applied to the thermoelastic material (21) is removed (taken away), the thermoelastic material (21) changes from the martensitic phase to the parent phase (austenitic phase) (i.e., the phase changes from III to IV). If the thermoelastic material (21) is thermally insulated at this time, the temperature of the thermoelastic material (21) falls. When the object to be cooled is brought into contact with the thermoelastic material, of which the temperature has fallen, the heat propagates from the object to be cooled to the thermoelastic material (21) (i.e., the phase changes from IV to I).

Therefore, when tensile force is applied to the thermoelastic material (21), the thermoelastic material (21) generates heat as shown in FIG. 3A. The air that has passed through the cooling/heating module (20) has an increased temperature. Conversely, when the tension applied to the thermoelastic material (21) is removed, the thermoelastic material (21) absorbs heat in turn as shown in FIG. 3B. In that case, the air that has passed through the cooling/heating module (20) has a decreased temperature. In this air conditioner (1), the thermoelastic material (21) is subjected to the heating operation and the cooling operation alternately, and a cooling mode of operation is performed intermittently through the cooling operation.

Note that once a peak of the thermoelastic material's (21) ability is exceeded during a cooling or heating operation since it has been started, the capacity declines. For that reason, a switch is made from the cooling operation to the heating operation, and vice versa, alternately.

Specifically, a Ti/Ni/Cu alloy may be used as a specific exemplary thermoelastic material (21). More particularly, such an alloy may have a composition including 40-80% of Ti, 20-60% of Ni, and 0-30% of Cu.

The actuator (22) is provided to apply tensile force to the thermoelastic material (21). The actuator (22) is connected to the switching control section (35) so that application and removal of the tensile force to/from the thermoelastic material (21) is controlled by the switching control section (35).

——Tensile Force Applying Operation——

Figure 22:
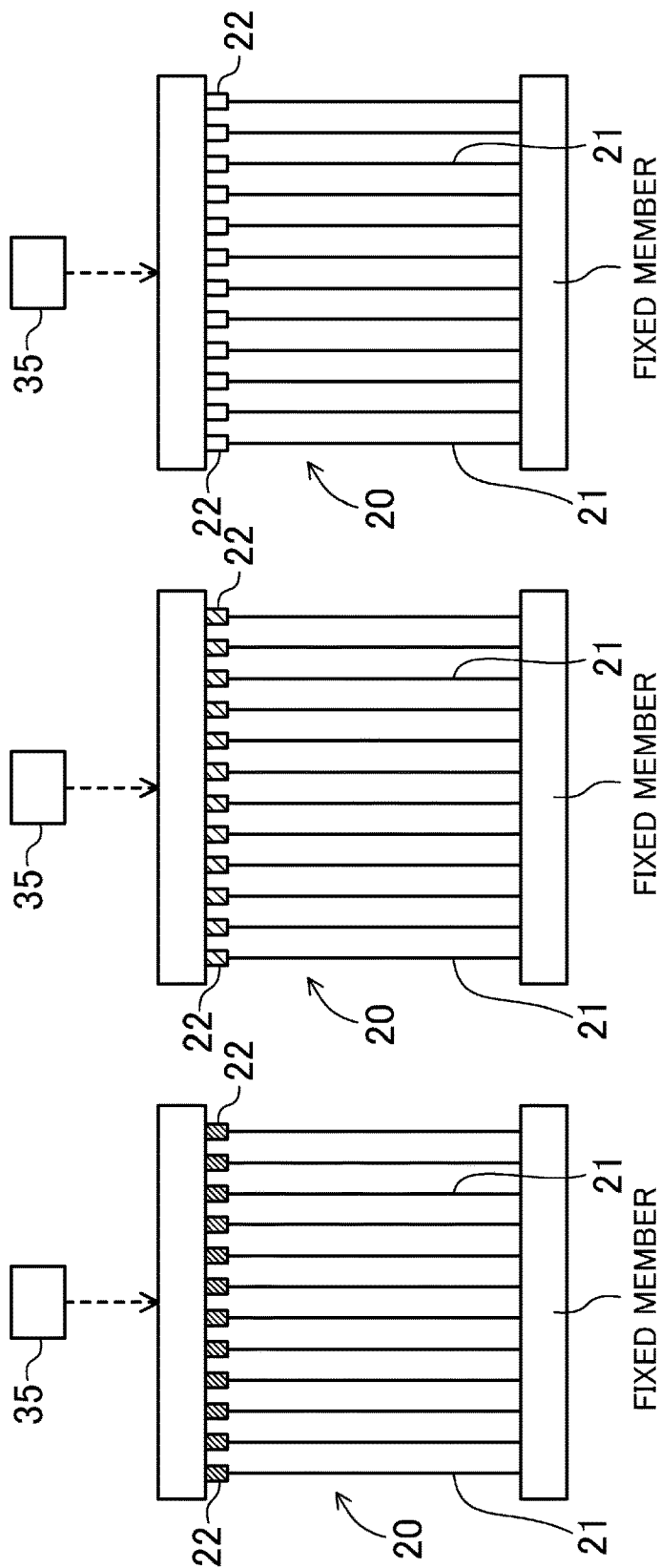
FIG. 22 illustrates some tensioning means.

The switching control section (35) controls the actuator (22) so that tensile force is selectively applied to, or removed from, the thermoelastic material (21). The switching control section (35) is configured to adjust the quantity of heat generated by the thermoelastic material (21) and thereby control the cooling/heating capacity by changing the magnitude of the tensile force applied by the actuator (22) to the thermoelastic material (21) in FIGS. 22A to 22C.

Figure 23:
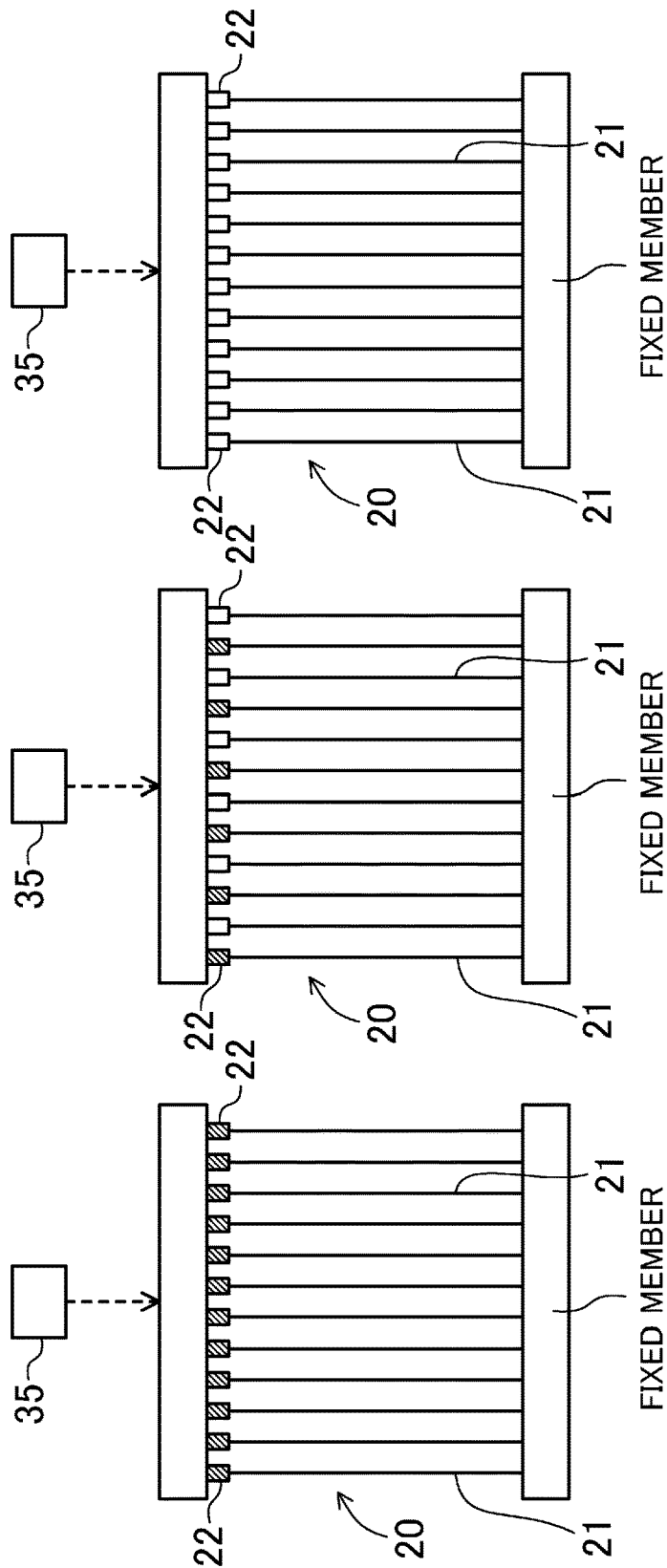
FIG. 23 illustrates some tensioning means.

Alternatively, the switching control section (35) may also be configured to adjust the quantity of heat generated by the thermoelastic material (21) and thereby control the cooling/heating capacity by changing the proportion of a portion of the thermoelastic material (21), to which tensile force is applied, to the entire thermoelastic material (21) in FIGS. 23A to 23C.

Still alternatively, the switching control section (35) may also be configured to adjust the quantity of heat generated by the thermoelastic material (21) and thereby control the cooling/heating capacity by changing the time intervals at which the cooling and heating operations are repeatedly performed a number of times.

——Operation——

This air conditioner (1) performs only a cooling mode of operation.

More particularly, when the cooling operation is performed as shown in FIG. 1A, tensile force is removed from the cooling/heating module (20) that has been heated. Then, the thermoelastic material (21) shown in FIGS. 2 and 3 is cooled, and the cooling/heating module (20) absorbs heat from the air (i.e., the room air (RA)). Consequently, as shown in FIG. 1A, the room air (RA) introduced into the casing (10) is cooled and that cooled air is allowed to go back as supply air (SA) into the indoor space, thereby cooling the indoor space.

When the heating operation is performed as shown in FIG. 1B, the direction of revolution of the fan (30) is switched to suck the outdoor air (OA) into the casing (10), process the air through the cooling/heating module (20), and then release the processed air as exhaust air (EA) into the outdoor space. In the meantime, tensile force is applied to the thermoelastic material (21) of the cooling/heating module (20). Then, the thermoelastic material (21) is heated and the cooling/heating module (20) dissipates heat. Consequently, during this heating operation, the air heated by passing through the cooling/heating module (20) is exhausted to the outdoor space.

According to this embodiment, by performing the cooling operation shown in FIG. 1A and the heating operation shown in FIG. 1B repeatedly a number of times, a cooling mode of operation is performed intermittently.

——Advantages of First Embodiment——

According to this embodiment, no elastic member of rubber, for example, is adopted in the cooling/heating module (20). In this case, if an elastic member such as a rubber member were adopted in the cooling/heating module, then a mechanism for making the elastic member expand or contract should be used, which would complicate the structure of the air conditioner (1) excessively and increase the overall size of the air conditioner (1) overly. In contrast, since no such elastic member is used in this embodiment for the cooling/heating module (20), the air conditioner (1) is prevented from having its size increased or its structure complicated too much.

In addition, this embodiment allows for adjusting the quantity of heat generated by the thermoelastic material (21) and eventually controlling the cooling/heating capacity, thus enabling the air conditioner (1) to operate adaptively to the given air-conditioning load.

——Variations of First Embodiment——

(First Variation)

The first variation shown in FIG. 4 has a configuration in which two indoor units (U1, U2) are installed in the indoor space (3) to be air-conditioned. In the example illustrated in FIG. 4, a first indoor unit (U1) is arranged at one of two opposing wall surfaces of the room (i.e., on the wall on the right hand side on the paper), and a second indoor unit (U2) is arranged at the other wall surface of the room (i.e., on the wall on the left hand side on the paper). Each of these indoor units (U1, U2) has the same configuration as the indoor unit (U) of the air conditioner (1) shown in FIG. 1. Thus, the configuration of those indoor units (U1, U2) will not be described all over again to avoid redundancies. Note that the indoor units (U1, U2) have their own air passage (P1, P2).

Figure 4A:
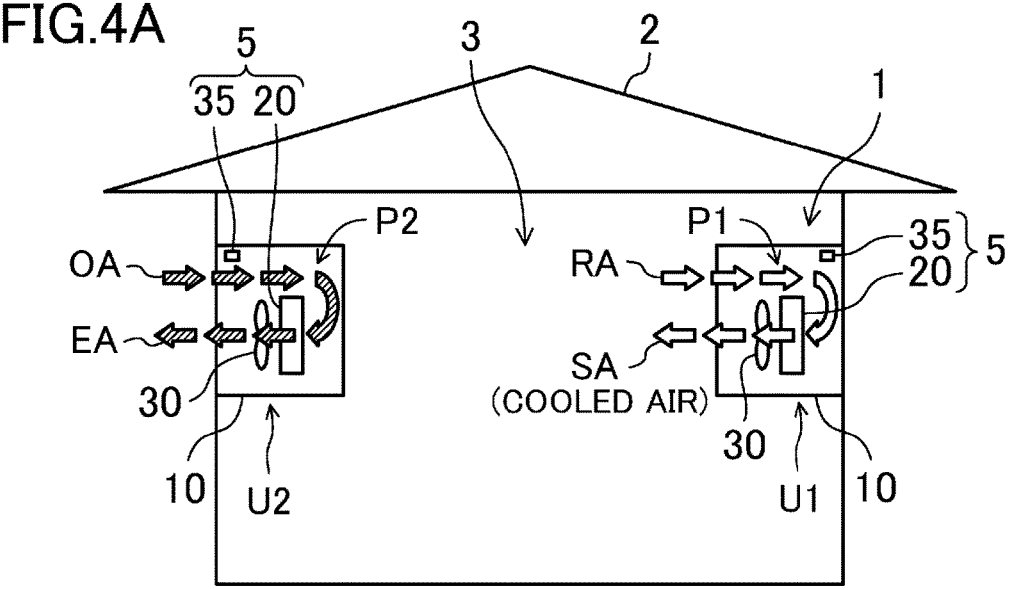
FIG. 4A illustrates a first operating state and FIG. 4B illustrates a second operating state.

FIG. 4A illustrates a state where the first indoor unit (U1) is performing a cooling operation and the second indoor unit (U2) is performing a heating operation. In the first indoor unit (U1), the tensile force applied to the thermoelastic material (21) of the cooling/heating module (20) is removed. Thus, the cooling/heating module (20) of the first indoor unit (U1) absorbs heat and the room air (RA) sucked into the casing (10) is cooled. As a result, the cooled air is supplied as supply air (SA) into the indoor space (3).

On the other hand, in the second indoor unit (U2), the fan (30) revolves in a direction in which the outdoor air (OA) is sucked into the casing (10), processed, and then exhausted, while tensile force is applied at the same time to the thermoelastic material (21) of the cooling/heating module (20). As a result, the outdoor air (OA) removes heat from the cooling/heating module (20) and then is released as exhaust air (EA) into the outdoor space.

Figure 4B:
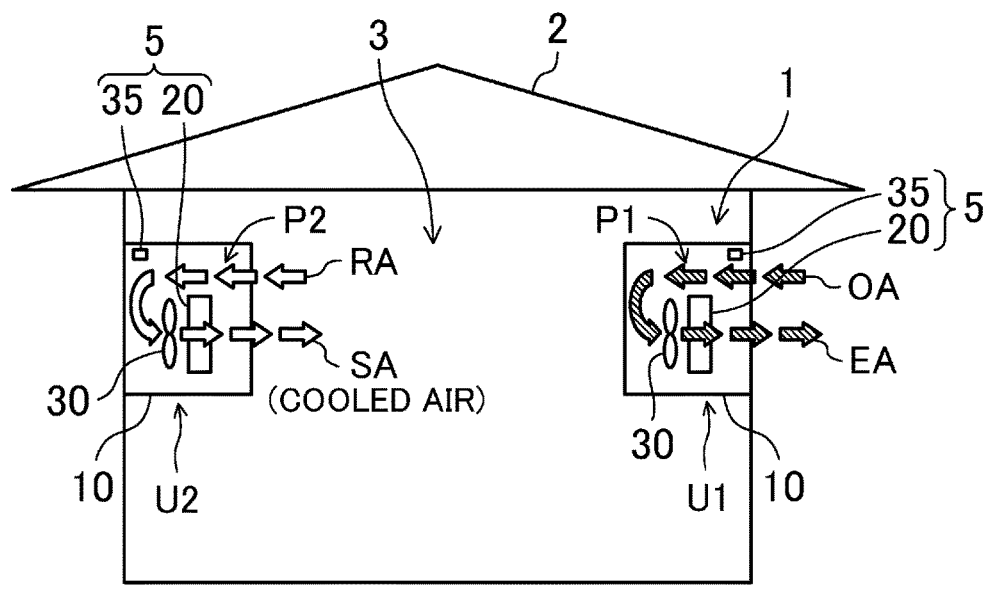

FIG. 4B illustrates a state where the second indoor unit (U2) is performing a cooling operation and the first indoor unit (U1) is performing a heating operation. In the second indoor unit (U2), the tensile force applied to the thermoelastic material (21) of the cooling/heating module (20) is removed. Thus, the cooling/heating module (20) of the second indoor unit (U2) absorbs heat and the room air (RA) sucked into the casing (10) is cooled. As a result, the cooled air is supplied as supply air (SA) into the indoor space (3).

On the other hand, in the first indoor unit (U1), the fan (30) revolves in a direction in which the outdoor air (OA) is sucked into the casing (10), processed, and then exhausted, while tensile force is applied at the same time to the thermoelastic material (21) of the cooling/heating module (20). As a result, the outdoor air (OA) removes heat from the cooling/heating module (20) and then is released as exhaust air (EA) into the outdoor space.

As can be seen, according to the first variation of the first embodiment, while either one of the two indoor units (U1, U2) is cooling air and supplying that cooled air to the indoor space (3), the other indoor unit (U2, U1) switches from the mode of operation of dissipating the heat to the outdoor space as shown in FIG. 4A to the mode of operation shown in FIG. 4B, and vice versa, thus performing a cooling mode of operation continuously.

(Second Variation)

In the second variation shown in FIG. 5, two indoor units (U1, U2) are also installed in the indoor space (3) to be air-conditioned as in the air conditioner (1) shown in FIG. 4. In this variation, however, both of the first and second indoor units (U1, U2) are arranged on the same wall surface on the right hand side of the paper, unlike the first variation shown in FIG. 4. Each of the indoor units (U1, U2) has the same configuration as its counterpart of the air conditioner (1) shown in FIGS. 1 and 4.

Figure 5A:
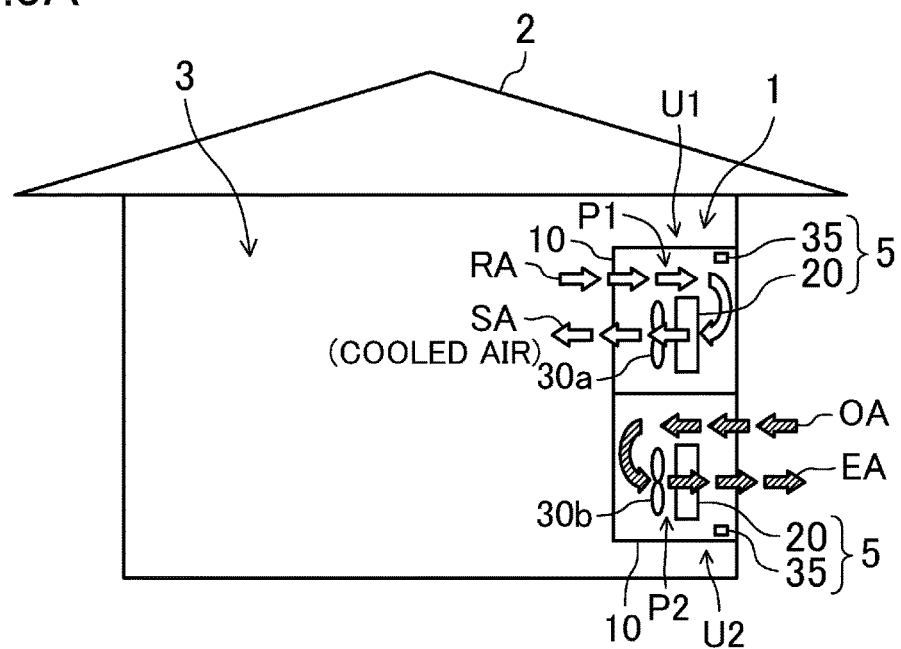
FIG. 5A illustrates a first operating state and FIG. 5B illustrates a second operating state.

FIG. 5A illustrates a state where the first indoor unit (U1) is performing a cooling operation and the second indoor unit (U2) is performing a heating operation. In the first indoor unit (U1), the tensile force applied to the thermoelastic material (21) of the cooling/heating module (20) is removed. Thus, the cooling/heating module (20) of the first indoor unit (U1) absorbs heat and the room air (RA) sucked into the casing (10) is cooled. As a result, the cooled air is supplied as supply air (SA) into the indoor space (3).

On the other hand, in the second indoor unit (U2), the fan (30) revolves in a direction in which the outdoor air (OA) is sucked into the casing (10), processed, and then exhausted, while tensile force is applied at the same time to the thermoelastic material (21) of the cooling/heating module (20). As a result, the outdoor air (OA) removes heat from the cooling/heating module (20) and then is released as exhaust air (EA) into the outdoor space.

Figure 5B:
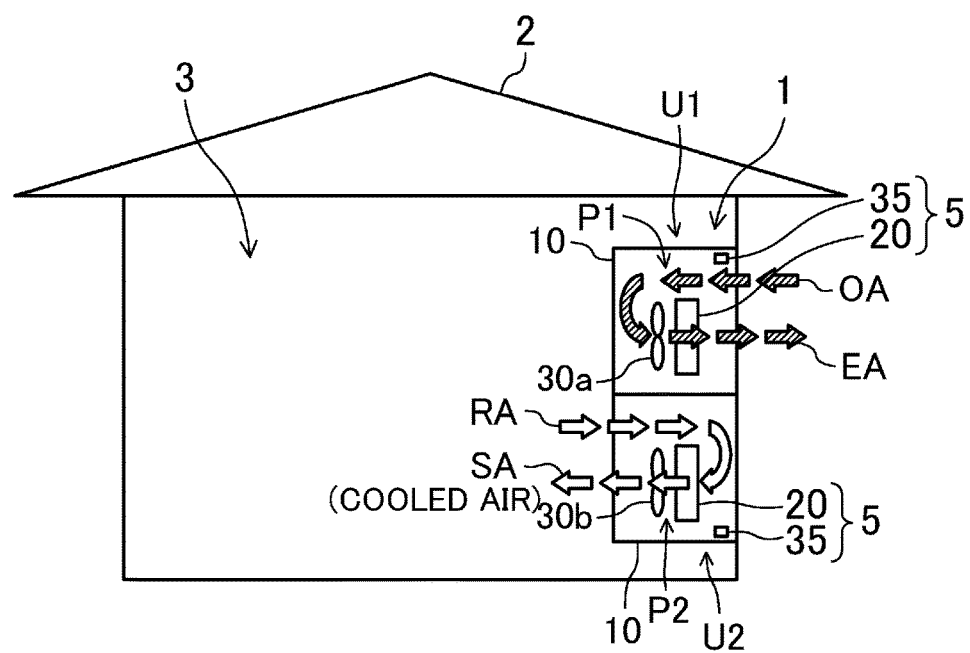

FIG. 5B illustrates a state where the second indoor unit (U2) is performing a cooling operation and the first indoor unit (U1) is performing a heating operation. In the second indoor unit (U2), the tensile force applied to the thermoelastic material (21) of the cooling/heating module (20) is removed. Thus, the cooling/heating module (20) of the second indoor unit (U2) absorbs heat and the room air (RA) sucked into the casing (10) is cooled. As a result, the cooled air is supplied as supply air (SA) into the indoor space (3).

On the other hand, in the first indoor unit (U1), the fan (30) revolves in a direction in which the outdoor air (OA) is sucked into the casing (10), processed, and then exhausted, while tensile force is applied at the same time to the thermoelastic material (21) of the cooling/heating module (20). As a result, the outdoor air (OA) removes heat from the cooling/heating module (20) and then is released as exhaust air (EA) into the outdoor space.

As can be seen, according to the second variation of the first embodiment, while either one of the two indoor units (U1, U2) is cooling air and supplying that cooled air to the indoor space (3), the other indoor unit (U2, U1) switches from the mode of operation of dissipating the heat to the outdoor space as shown in FIG. 5A to the mode of operation shown in FIG. 5B, and vice versa, thus performing a cooling mode of operation continuously.

(Third Variation)

Figure 6:
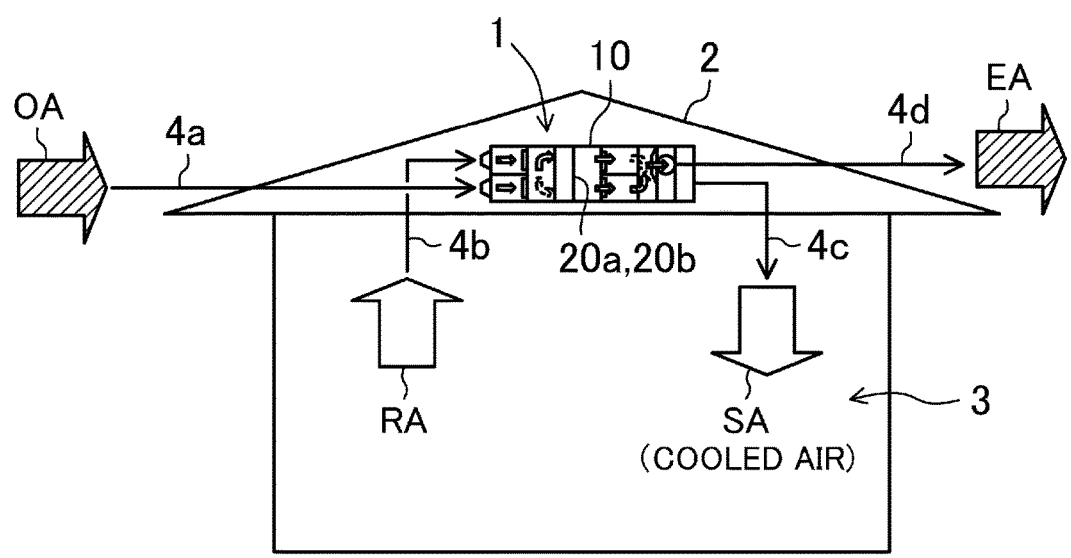
FIG. 6 illustrates generally a state where an air conditioner according to a third variation of the first embodiment and a third variation of the fourth embodiment is installed.

In the third variation illustrated in FIG. 6, two cooling/heating modules (20) are provided inside the casing (10) of the air conditioner (1). This air conditioner (1) is configured to switch modes of operation from a first mode of operation in which the air that has passed through one cooling/heating module (20) (e.g., the first cooling/heating module (20a)) is supplied to the indoor space (3) and the air that has passed through the other cooling/heating module (20) (e.g., the second cooling/heating module (20b)) is released to the outdoor space to a second mode of operation in which the air that has passed through the second cooling/heating module (20b) is supplied to the indoor space (3) and the air that has passed through the first cooling/heating module (20a) is released to the outdoor space, and vice versa.

More particularly, this air conditioner (1) has the configuration shown in FIGS. 0.7 and 8. This air conditioner (1) has an integrated configuration in which two cooling/heating modules (20a, 20b) and two fans (30a, 30b) are housed in the same casing (10) and is installed in a roof space. Specifically, FIG. 7 illustrates the first mode of operation in which the first cooling/heating module (20a) functions as a cooler and the second cooling/heating module (20b) functions as a heater. On the other hand, FIG. 8 illustrates the second mode of operation in which the second cooling/ heating module (20b) functions as a cooler and the first cooling/heating module (20a) functions as a heater. In FIGS. 7 and 8, A, B and C respectively illustrate a planar structure, a left side face structure and a right side face structure thereof. That is to say, A is a plan view illustrating an internal structure of the device.

The casing (10) of this air conditioner (1) is configured as a rectangular box. One side wall surface of this casing (10) is provided with a first inlet (11), through which the room air (RA) is sucked into the casing (10), and a second inlet (12), through which the outdoor air (OA) is sucked into the casing (10). Meanwhile, two side wall surfaces on the right and left sides of the side wall surface with the inlets (11, 12) are respectively provided with a first outlet (13), through which the supply air (SA) is supplied to the indoor space (3), and a second outlet (14), through which the exhaust air (EA) is released to the outdoor space. As schematically indicated by the arrows in FIG. 6, ducts (4a, 4b, 4c, 4d) are respectively connected to the first and second inlets (11, 12) and first and second outlets (13, 14).

The inner space of the casing (10) includes cooling/ heating chambers (C1, C2) where the cooling/heating modules (20) are arranged and fan chambers (C3, C4) where the fans (30a, 30b) are arranged. The cooling/heating chambers (C1, C2) are comprised of first and second cooling/heating chambers (C1, C2) which are located laterally adjacent to each other inside the casing (10) in FIGS. 7 and 8. Likewise, the fan chambers (C3, C4) are comprised of first and second fan chambers (C3, C4) which are located laterally adjacent to each other inside the casing (10). An air supply fan (30a) is arranged in the first fan chamber (C3), and an air exhaust fan (30b) is arranged in the second fan chamber (C4).

Also, inlet ventilation chambers (C5, C6) are arranged between those inlets (11, 12) and the cooling/heating chambers (C1, C2). The inlet ventilation chambers (C5, C6) are comprised of first and second inlet ventilation chambers (C5, C6) which are vertically stacked one upon the other in two levels inside the casing (10). The first inlet ventilation chamber (C5) is provided with the first inlet (11) and the second inlet ventilation chamber (C6) is provided with the second inlet (12). An openable and closable damper (D1, D2, D3, D4) is provided between each inlet ventilation chamber (C5, C6) and its associated cooling/heating chamber (C1, C2). That is to say, four dampers (D1, D2, D3, D4) are provided in total between the inlet ventilation chambers (C5, C6) and the cooling/heating chambers (C1, C2).

In addition, outlet ventilation chambers (C7, C8) are arranged between the cooling/heating chambers (C1, C2) and the fan chambers (C3, C4). The outlet ventilation chambers (C7, C8) are comprised of first and second outlet ventilation chambers (C7, C8) which are vertically stacked one upon the other in two levels inside the casing (10). An openable and closable damper (D5, D6, D7, D8) is provided between each cooling/heating chamber (C1, C2) and its associated outlet ventilation chamber (C7, C8). That is to say, four dampers (D5, D6, D7, D8) are provided in total between the cooling/heating chambers (C1, C2) and the outlet ventilation chambers (C7, C8).

Each outlet ventilation chamber (C7, C8) communicates with its associated fan chamber (C3, C4). The first outlet (13) is provided for one side of the casing (10) with the first fan chamber (C3), and the second outlet (14) is provided for the other side of the casing (10) with the second fan chamber (C4).

According to this configuration, while the device is performing the first mode of operation, the first, fourth, fifth, and eighth dampers (D1, D4, D5 and D8) are opened, and the second, third, sixth and seventh dampers (D2, D3, D6 and D7) are closed. On the other hand, while the device is performing the second mode of operation, the second, third, sixth and seventh dampers (D2, D3, D6 and D7) are opened, and the first, fourth, fifth, and eighth dampers (D1, D4, D5 and D8) are closed.

By controlling the opened/closed states of the dampers (D1-D8) in this manner, in the first mode of operation, the room air (RA) introduced into the casing (10) through the first inlet (11) passes as shown in FIG. 7 through the first damper (D1), the first cooling/heating module (20a) and the fifth damper (D5) to be supplied to the indoor space (3) through the first outlet (13). Meanwhile, the room air introduced into the casing (10) through the second inlet (12) passes through the fourth damper (D4), the second cooling/ heating module (20b) and the eighth damper (D8) to be exhausted to the outdoor space through the second outlet (14). On the other hand, in the second mode of operation, the room air (RA) introduced into the casing (10) through the first inlet (11) passes as shown in FIG. 8 through the third damper (D3), the second cooling/heating module (20b) and the seventh damper (D7) to be supplied to the indoor space (3) through the first outlet (13). Meanwhile, the outdoor air (OA) introduced into the casing (10) through the second inlet (14) passes through the second damper (D2), the first cooling/heating module (20a) and the sixth damper (D6) to be exhausted to the outdoor space through the second outlet (14).

Thus, according to this third variation of the first embodiment, the first and second modes of operation shown in FIGS. 7 and 8 are alternately performed a number of times by changing the opened and closed states of the dampers.

This air conditioner (1) is configured to operate as a cooling-only machine. That is why no matter whether the path of the air to be supplied to the indoor space (3) has switched to the first cooling/heating module (20a) or the second cooling/heating module (20b), that cooling/heating module (20) is going to perform a cooling operation. As a result, cooled air is supplied continuously to the indoor space (3). Likewise, no matter whether the path of the air to be exhausted to the outdoor space has switched to the second cooling/heating module (20b) or the first cooling/heating module (20a), that cooling/heating module (20) is going to perform a heating operation. As a result, the air that is going to be released to the outdoor space is the air that has removed heat from the cooling/heating module (20).

As can be seen, according to the third variation of the first embodiment, the modes of operation shown in FIGS. 7 and 8 are switched alternately so that while one cooling/heating module (20a, 20b) is cooling air and supplying the cooled air to the indoor space (3), the exhaust air (EA) removes heat from the other cooling/heating module (20b, 20a), thus allowing for performing the cooling mode of operation continuously.

(Fourth Variation)

Figure 9:
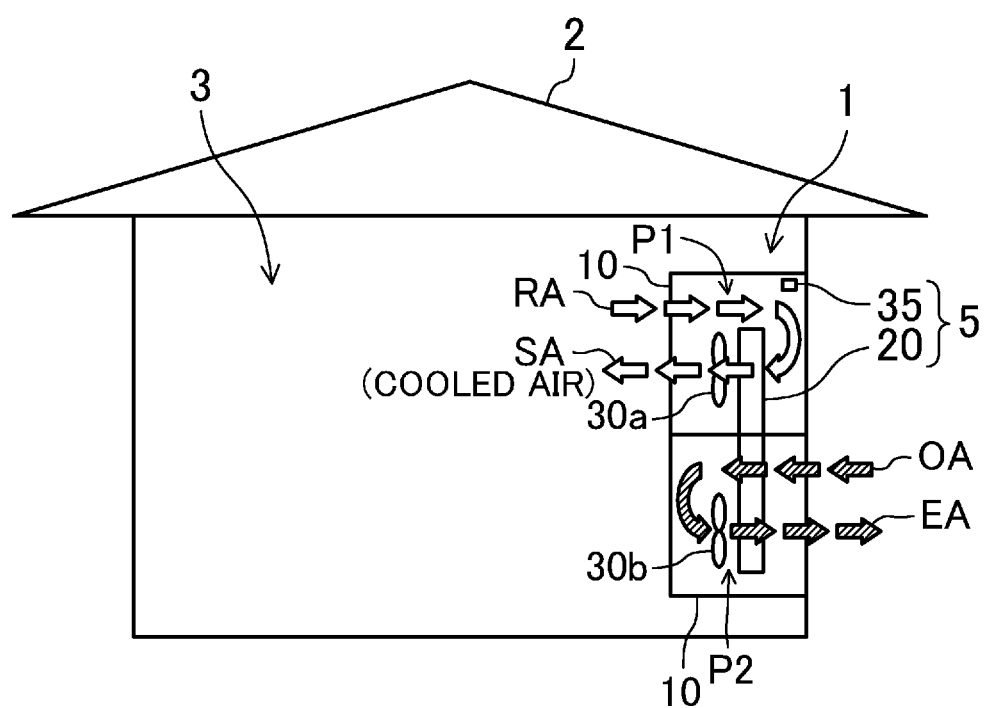
FIG. 9 illustrates generally a state where an air conditioner according to a fourth variation of the first embodiment and a fourth variation of the fourth embodiment is installed indoors.

The fourth variation illustrated in FIG. 9 is directed to an exemplary air conditioner (1) which uses a cooling/heating module (20) implemented as a rotor. This air conditioner (1) is also configured to operate as a cooling-only machine as in the examples illustrated in FIGS. 1-8.

The casing (10) of this air conditioner (1) has an air supply passage (P1) and an air exhaust passage (P2). The air supply passage (P1) is provided with an air supply fan (30a), while the air exhaust passage (P2) is provided with an air exhaust fan (30b). The cooling/heating module (20) is configured as a disk, which is arranged to partially cover both of the air supply passage (P1) and air exhaust passage (P2) inside the casing (10). This cooling/heating module (20) is configured to rotate on an axis so as to allow a portion located in the air supply passage (P1) to move into the air exhaust passage (P2) and also allow a portion located in the air exhaust passage (P2) to move into the air supply passage (P1).

In the air conditioner (1) of this fourth variation, a cooling operation is performed in the air supply passage (P1) and a heating operation is performed in the air exhaust passage (P2). More particularly, no tensile force is applied to a portion of the cooling/heating module (20) which is located in the air supply passage (P1), and the thermoelastic material (21) absorbs heat, thereby cooling the air. On the other hand, tensile force is applied to a portion of the cooling/heating module (20) which is located in the air exhaust passage (P2), and the thermoelastic material (21) dissipates heat into the air.

According to this embodiment, the cooling and heating operations are performed with the cooling/heating module (20) rotated either continuously or intermittently. This thus allows the cooling/heating module (20) to cool the air in the air supply passage (P1) while dissipating heat from the cooling/heating module (20) into the air in the air exhaust passage (P2), thus enabling a continuous cooling mode of operation so that the cooled air is supplied continuously to the indoor space (3).

«Second Embodiment of this Invention»

A second embodiment of the present invention will now be described.

The second embodiment illustrated in FIG. 10 is an example in which the air conditioner (1) of the first embodiment shown in FIG. 1 is configured to operate as a heating-only machine.

Just like the air conditioner (1) shown in FIG. 1, this air conditioner (1) also includes a casing (10), a cooling/heating module (20) housed inside the casing (10), a fan (30) which makes air flow through the cooling/heating module (20), and a switching control section (35) which applies tensile force to the cooling/heating module (20). The casing (10) and various functional parts housed inside the casing (10) constitute an indoor unit (U). Also, inside the casing (10), defined is an air passage (P) to make the air introduced into the casing (10) pass through the cooling/heating module (20).

The air conditioner (1) of this second embodiment is configured to perform a heating mode of operation by introducing the air heated by the cooling/heating module (20) into the indoor space (3) through the air passage (P), which is a major difference from the air conditioner (1) shown in FIG. 1.

In this air conditioner (1), tensile force is applied in FIG. 10A to the thermoelastic material (21) of the cooling/heating module (20) that has been cooled. Then, the thermoelastic material (21) is heated and the cooling/heating module (20) dissipates heat. As a result, the air heated by passing through the cooling/heating module (20) is supplied as supply air (SA) to the indoor space (3).

In FIG. 10B, on the other hand, the fan (30) revolves in a direction in which the outdoor air (OA) is sucked into the casing (10), processed and then exhausted, while tensile force applied to the thermoelastic material (21) of the cooling/heating module (20) is removed at the same time. Consequently, the outdoor air (OA) gives heat to the cooling/heating module (20), and is released as exhaust air (EA) to the outdoor space.

Thus, this second embodiment allows for performing an intermittent heating mode of operation by alternately performing the heating operation shown in FIG. 10A and the cooling operation shown in FIG. 10B a number of times.

——Variations of Second Embodiment——

(First Variation)

The first variation of the second embodiment shown in FIG. 11 is an example in which the air conditioner (I) shown in FIG. 4 is configured to operate as a heating-only machine. As in the air conditioner (1) shown in FIG. 4, a first indoor unit (U1) is arranged at one of two opposing wall surfaces of the room (i.e., on the wall on the right hand side on the paper), and a second indoor unit (U2) is arranged at the other wall surface of the room (i.e., on the wall on the left hand side on the paper). Each of these indoor units (U1, U2) has the same configuration as its counterpart of the second embodiment shown in FIG. 10.

Figure 11A:
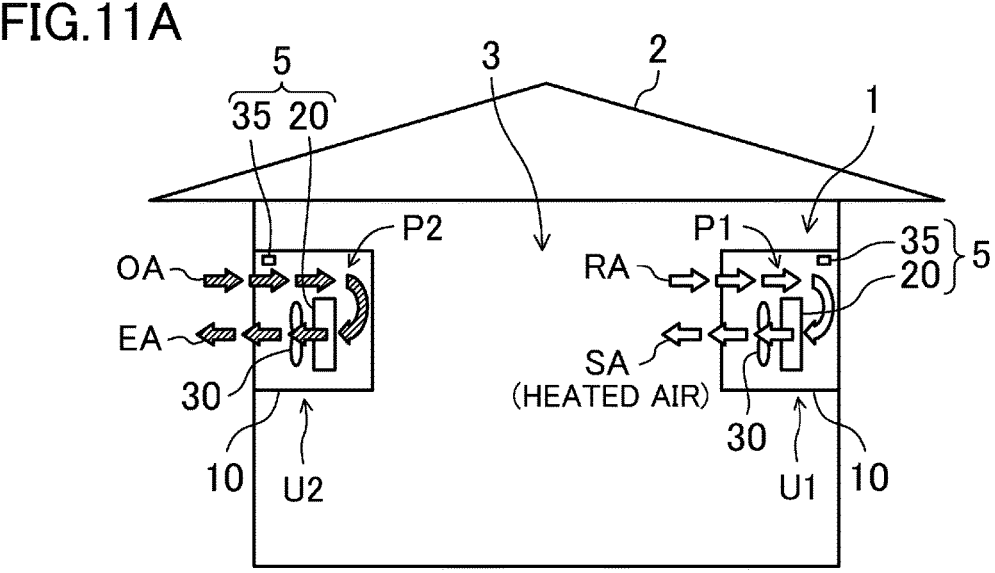
FIG. 11A illustrates a first operating state and FIG. 11B illustrates a second operating state.

FIG. 11A illustrates a state where the first indoor unit (U1) is performing a heating operation and the second indoor unit (U2) is performing a cooling operation. In the first indoor unit (U1), tensile force is applied to the thermoelastic material (21) of the cooling/heating module (20). Thus, the cooling/heating module (20) of the first indoor unit (U1) dissipates heat and the room air (RA) sucked into the casing (10) is heated. As a result, the heated air is supplied as supply air (SA) into the indoor space (3).

On the other hand, in the second indoor unit (U2), the fan (30) revolves in a direction in which the outdoor air (OA) is sucked into the casing (10), processed, and then exhausted, while the tensile force applied to the thermoelastic material (21) of the cooling/heating module (20) is removed at the same time. As a result, the outdoor air (OA) has its heat removed by the cooling/heating module (20) and then is released as exhaust air (EA) into the outdoor space.

Figure 11B:
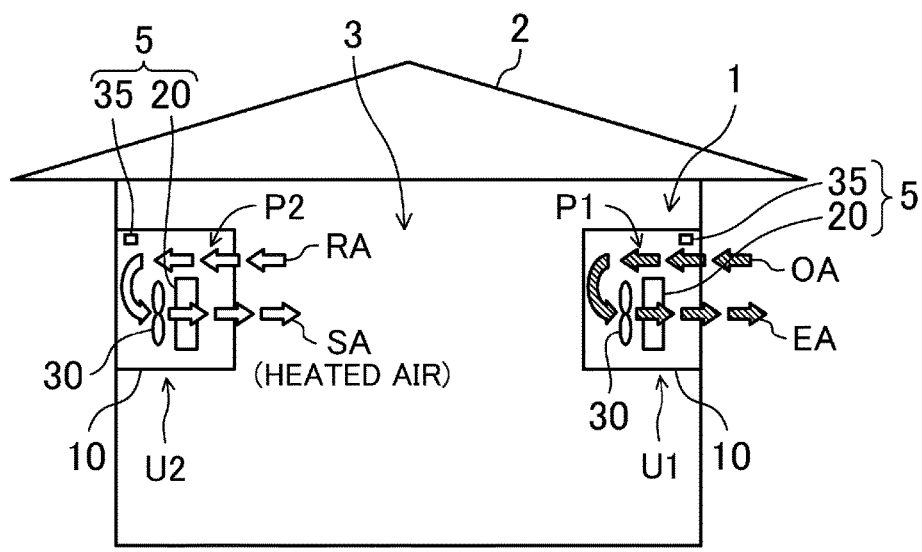

FIG. 11B illustrates a state where the second indoor unit (U2) is performing a heating operation and the first indoor unit (U1) is performing a cooling operation. In the second indoor unit (U2), tensile force is applied to the thermoelastic material (21) of the cooling/heating module (20). Thus, the cooling/heating module (20) of the second indoor unit (U2) dissipates heat and the room air (RA) sucked into the casing (10) is heated. As a result, the heated air is supplied as supply air (SA) into the indoor space (3).

On the other hand, in the first indoor unit (U1), the fan (30) revolves in a direction in which the outdoor air (OA) is sucked into the casing (10), processed, and then exhausted, while the tensile force applied to the thermoelastic material (21) of the cooling/heating module (20) is removed at the same time. As a result, the outdoor air (OA) has its heat removed by the cooling/heating module (20) and then is released as exhaust air (EA) into the outdoor space.

As can be seen, according to the first variation of the second embodiment, while either one of the two indoor units (U1, U2) is heating air and supplying that heated air to the indoor space (3), the other indoor unit (U2, U1) switches from the mode of operation involving the cooling operation as shown in FIG. 11A to the mode of operation shown in FIG. 11B, and vice versa, thus performing a heating mode of operation continuously.

(Second Variation)

In the second variation of the second embodiment shown in FIG. 12, two indoor units (U1, U2) are installed in the indoor space (3) to be air-conditioned, and the air conditioner (1) of the second variation of the first embodiment shown in FIG. 5 is configured to operate as a heating-only machine. In this variation, however, both of the first and second indoor units (U1, U2) are arranged on the same wall surface on the right hand side of the paper.

Figure 12A:
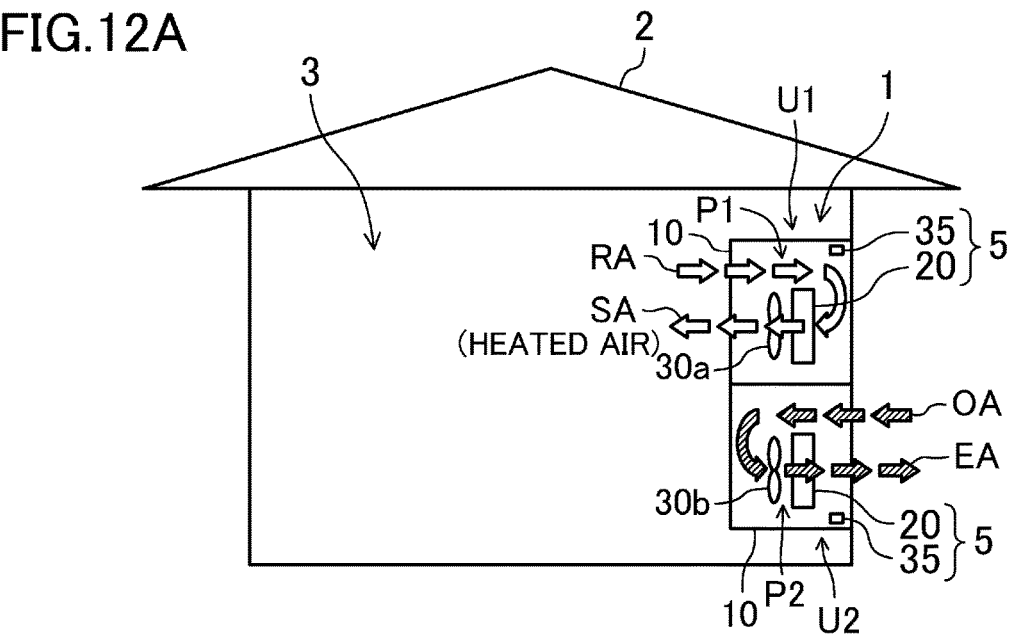
FIG. 12A illustrates a first operating state and FIG. 12B illustrates a second operating state.

FIG. 12A illustrates a state where the first indoor unit (U1) is performing a heating operation and the second indoor unit (U2) is performing a cooling operation. In the first indoor unit (U1), tensile force is applied to the thermoelastic material (21) of the cooling/heating module (20). Thus, the cooling/heating module (20) of the first indoor unit (U1) dissipates heat and the room air (RA) sucked into the casing (10) is heated. As a result, the heated air is supplied as supply air (SA) into the indoor space (3).

On the other hand, in the second indoor unit (U2), the fan (30) revolves in a direction in which the outdoor air (OA) is sucked into the casing (10), processed, and then exhausted, while the tensile force applied to the thermoelastic material (21) of the cooling/heating module (20) is removed at the same time. As a result, the outdoor air (OA) has its heat removed by the cooling/heating module (20) and then is released as exhaust air (EA) into the outdoor space.

Figure 12B:
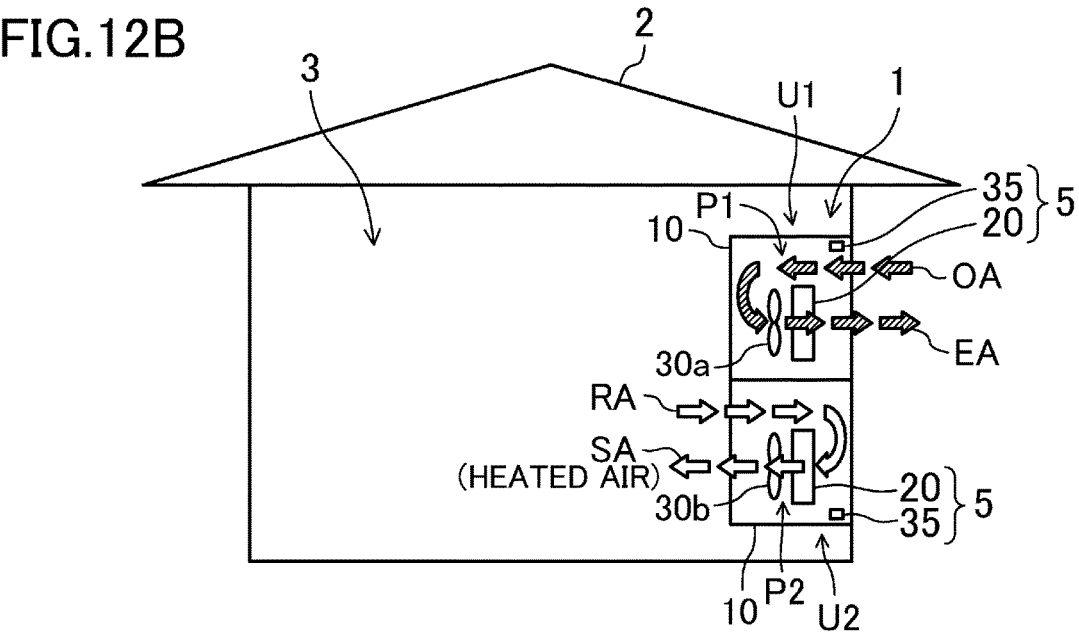

FIG. 12B illustrates a state where the second indoor unit (U2) is performing a heating operation and the first indoor unit (U1) is performing a cooling operation. In the second indoor unit (U2), tensile force is applied to the thermoelastic material (21) of the cooling/heating module (20). Thus, the cooling/heating module (20) of the second indoor unit (U2) dissipates heat and the room air (RA) sucked into the casing (10) is heated. As a result, the heated air is supplied as supply air (SA) into the indoor space (3).

On the other hand, in the first indoor unit (U1), the fan (30) revolves in a direction in which the outdoor air (OA) is sucked into the casing (10), processed, and then exhausted, while the tensile force applied to the thermoelastic material (21) of the cooling/heating module (20) is removed at the same time. As a result, the outdoor air (OA) has its heat removed by the cooling/heating module (20) and then is released as exhaust air (EA) into the outdoor space.

As can be seen, according to the second variation of the second embodiment, while either one of the two indoor units (U1, U2) is heating air and supplying that heated air to the indoor space (3), the other indoor unit (U2, U1) switches from the mode of operation involving the cooling operation as shown in FIG. 12A to the mode of operation shown in FIG. 12B, and vice versa, thus performing a heating mode of operation continuously.

(Third Variation)

Figure 13:
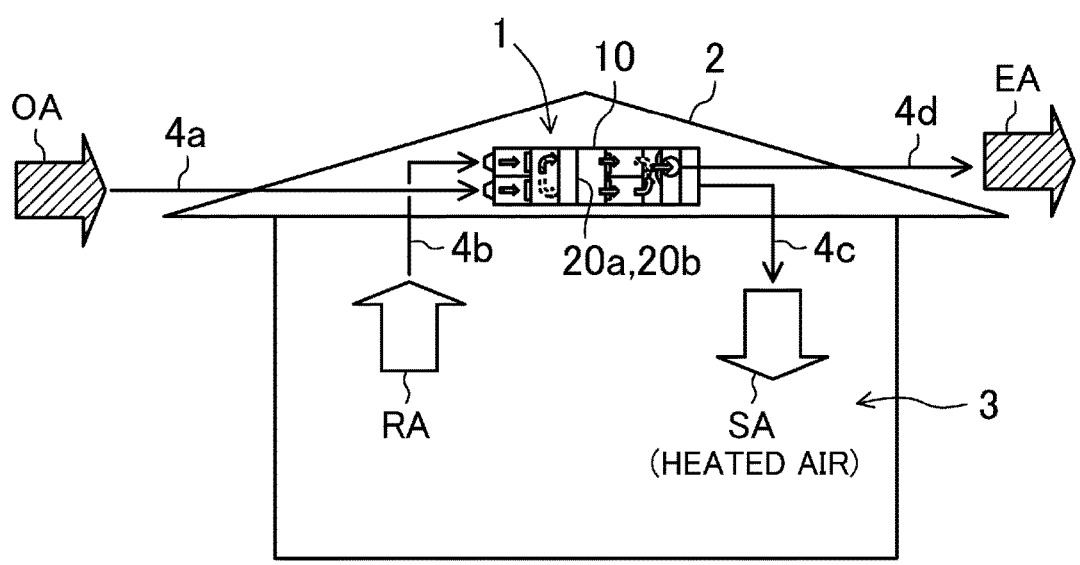
FIG. 13 illustrates generally a state where an air conditioner according to a third variation of the second embodiment and a third variation of the fourth embodiment is installed.

In the third variation of the second embodiment illustrated in FIG. 13, the air conditioner (1) of the third variation of the first embodiment shown in FIGS. 6 to 8 is configured to operate as a heating-only machine. More particularly, in this air conditioner (1), two cooling/heating modules (20a, 20b) are provided inside the casing (10) as in FIGS. 6 to 8. This air conditioner (1) is configured to switch modes of operation from a first mode of operation in which the air that has passed through one cooling/heating module (20) (e.g., the first cooling/heating module (20a)) is supplied to the indoor space (3) and the air that has passed through the other cooling/heating module (20) (e.g., the second cooling/heating module (20b)) is released to the outdoor space to a second mode of operation in which the air that has passed through the second cooling/heating module (20b) is supplied to the indoor space (3) and the air that has passed through the first cooling/heating module (20a) is released to the outdoor space, and vice versa.

More particularly, this air conditioner (1) has the configuration shown in FIGS. 14 and 15. This air conditioner (1) has an integrated configuration in which two cooling/heating modules (20a, 20b) and two fans (30a, 30b) are housed in the same casing (10) and is installed in a roof space. Specifically, FIG. 14 illustrates the first mode of operation in which the first cooling/heating module (20a) functions as a heater and the second cooling/heating module (20b) functions as a cooler. On the other hand, FIG. 15 illustrates the second mode of operation in which the second cooling/heating module (20b) functions as a heater and the first cooling/heating module (20a) functions as a cooler. In FIGS. 14 and 15, A, B and C respectively illustrate a planar structure, a left side face structure and a right side face structure thereof. That is to say, A is a plan view illustrating an internal structure of the device.

The casing (10) of this air conditioner (1) is configured as a rectangular box. One side wall surface of this casing (10) is provided with a first inlet (11), through which the room air (RA) is sucked into the casing (10), and a second inlet (12), through which the outdoor air (OA) is sucked into the casing (10). Meanwhile, two side wall surfaces on the right and left sides of the side wall surface with the inlets (11, 12) are respectively provided with a first outlet (13), through which the supply air (SA) is supplied to the indoor space (3), and a second outlet (14), through which the exhaust air (EA) is released to the outdoor space. As schematically indicated by the arrows in FIG. 13, ducts (4a, 4b, 4c, 4d) are respectively connected to the first and second inlets (11, 12) and first and second outlets (13, 14).

The inner space of the casing (10) includes cooling/heating chambers (C1, C2) where the cooling/heating modules (20) are arranged and fan chambers (C3, C4) where the fans (30a, 30b) are arranged. The cooling/heating chambers (C1, C2) are comprised of first and second cooling/heating chambers (C1, C2) which are located laterally adjacent to each other inside the casing (10) in FIGS. 14 and 15. Likewise, the fan chambers (C3, C4) are comprised of first and second fan chambers (C3, C4) which are located laterally adjacent to each other inside the casing (10). An air supply fan (30a) is arranged in the first fan chamber (C3), and an air exhaust fan (30b) is arranged in the second fan chamber (C4).

Also, inlet ventilation chambers (C5, C6) are arranged between those inlets (11, 12) and the cooling/heating chambers (C1, C2). The inlet ventilation chambers (C5, C6) are comprised of first and second inlet ventilation chambers (C5, C6) which are vertically stacked one upon the other in two levels inside the casing (10). The first inlet ventilation chamber (C5) is provided with the first inlet (11) and the second inlet ventilation chamber (C6) is provided with the second inlet (12). An openable and closable damper (D1, D2, D3, D4) is provided between each inlet ventilation chamber (C5, C6) and its associated cooling/heating chamber (C1, C2). That is to say, four dampers (D1, D2, D3, D4) are provided in total between the inlet ventilation chambers (C5, C6) and the cooling/heating chambers (C1, C2).

In addition, outlet ventilation chambers (C7, C8) are arranged between the cooling/heating chambers (C1, C2) and the fan chambers (C3, C4). The outlet ventilation chambers (C7, C8) are comprised of first and second outlet ventilation chambers (C7, C8) which are vertically stacked one upon the other in two levels inside the casing (10). An openable and closable damper (D5, D6, D7, D8) is provided between each cooling/heating chamber (C1, C2) and its associated outlet ventilation chamber (C7, C8). That is to say, four dampers (D5, D6, D7, D8) are provided in total between the cooling/heating chambers (C1, C2) and the outlet ventilation chambers (C7, C8).

Each outlet ventilation chamber (C7, C8) communicates with its associated fan chamber (C3, C4). The first outlet (13) is provided for the first fan chamber (C3) of the casing (10), and the second outlet (14) is provided for the second fan chamber (C4) of the casing (10).

According to this configuration, while the air conditioner is performing the first mode of operation, the first, fourth, fifth, and eighth dampers (D1, D4, D5 and D8) are opened, and the second, third, sixth and seventh dampers (D2, D3, D6 and D7) are closed.

On the other hand, while the air conditioner is performing the second mode of operation, the second, third, sixth and seventh dampers (D2, D3, D6 and D7) are opened, and the first, fourth, fifth, and eighth dampers (D1, D4, D5 and D8) are closed.

By controlling the opened/closed states of the dampers (D1-D8) in this manner, in the first mode of operation, the room air (RA) introduced into the casing (10) through the first inlet (11) passes as shown in FIG. 14 through the first damper (D1), the first cooling/heating module (20a) and the fifth damper (D5) to be supplied to the indoor space (3) through the first outlet (13). Meanwhile, the outdoor air (OA) introduced into the casing (10) through the second inlet (12) passes through the fourth damper (D4), the second cooling/heating module (20b) and the eighth damper (D8) to be exhausted to the outdoor space through the second outlet (14). On the other hand, in the second mode of operation, the room air (RA) introduced into the casing (10) through the first inlet (11) passes as shown in FIG. 15 through the third damper (D3), the second cooling/heating module (20b) and the seventh damper (D7) to be supplied to the indoor space (3) through the first outlet (13). Meanwhile, the outdoor air (OA) introduced into the casing (10) through the second inlet (12) passes through the second damper (D2), the first cooling/heating module (20a) and the sixth damper (D6) to be exhausted to the outdoor space through the second outlet (14).

Thus, according to this third variation of the second embodiment, the first and second modes of operation shown in FIGS. 14 and 15 are alternately performed a number of times by changing the opened and closed states of the dampers.

This air conditioner (1) is configured to operate as a heating-only machine. That is why no matter whether the path of the air to be supplied to the indoor space (3) has switched to the first cooling/heating module (20a) or the second cooling/heating module (20b), that cooling/heating module (20) is going to perform a heating operation. As a result, heated air is supplied continuously to the indoor space (3). Likewise, no matter whether the path of the air to be exhausted to the outdoor space has switched to the second cooling/heating module (20b) or the first cooling/heating module (20a), that cooling/heating module (20) is going to perform a cooling operation. As a result, the air that is going to be released to the outdoor space is the air that has had its heat removed by the cooling/heating module (20).

As can be seen, according to the third variation of the second embodiment, the modes of operation shown in FIGS. 14 and 15 are switched alternately so that while one cooling/heating module (20a, 20b) is heating air and supplying the heated air to the indoor space (3), heat is given to the other cooling/heating module (20b, 20a), thus allowing for performing a heating mode of operation continuously.

(Fourth Variation)

Figure 16:
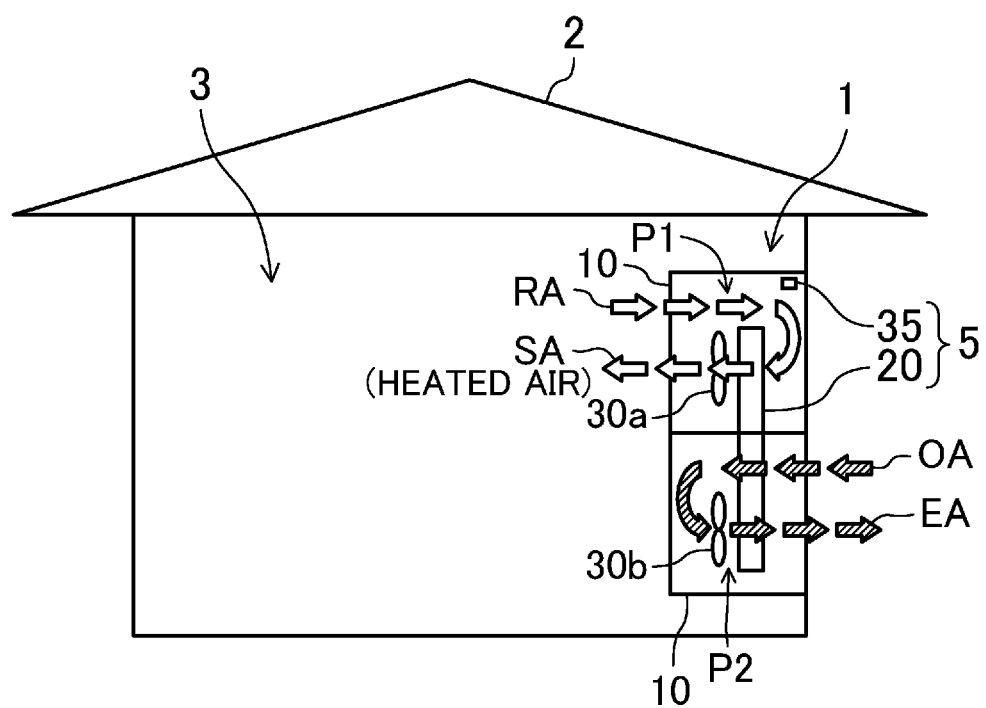
FIG. 16 illustrates generally a state where an air conditioner according to a fourth variation of the second embodiment and a fourth variation of the fourth embodiment is installed indoors.

The fourth variation of the second embodiment illustrated in FIG. 16 is directed to an exemplary air conditioner (1) which uses a cooling/heating module (20) implemented as a rotor. This air conditioner (1) is also configured to operate as a heating-only machine as in the second embodiment and the first to third variations thereof.

The casing (10) of this air conditioner (1) has an air supply passage (P1) and an air exhaust passage (P2). The air supply passage (P1) is provided with an air supply fan (30a), while the air exhaust passage (P2) is provided with an air exhaust fan (30b). The cooling/heating module (20) is configured as a disk, which is arranged to partially cover both of the air supply passage (P1) and air exhaust passage (P2) inside the casing (10). This cooling/heating module (20) is configured to rotate on an axis so as to allow a portion located in the air supply passage (P1) to move into the air exhaust passage (P2) and also allow a portion located in the air exhaust passage (P2) to move into the air supply passage (P1).

In the air conditioner (1) of this fourth variation, a heating operation is performed in the air supply passage (P1) and a cooling operation is performed in the air exhaust passage (P2). More particularly, tensile force is applied to a portion of the cooling/heating module (20) which is located in the air supply passage (P1), and the thermoelastic material (21) dissipates heat, thereby heating the air. On the other hand, no tensile force is applied to a portion of the cooling/heating module (20) which is located in the air exhaust passage (P2), and the thermoelastic material (21) absorbs heat and removes heat from the air.

According to this embodiment, the cooling and heating operations are performed with the cooling/heating module (20) rotated either continuously or intermittently. This thus allows the cooling/heating module (20) to heat the air in the air supply passage (P1) while giving heat from the air to the cooling/heating module (20) in the air exhaust passage (P2), thus enabling a continuous heating mode of operation so that the heated air is supplied continuously to the indoor space (3).

«Third Embodiment of this Invention»

A third embodiment of the present invention will now be described.

Although the air conditioner (1) according to the second variation of the first embodiment shown in FIG. 5 is a heating-only machine, the third embodiment shown in FIG. 17 is configured to humidify the air, too. As in the example illustrated in FIG. 5, this air conditioner (1) also includes two indoor units (U1, U2), both of which are arranged on the same wall surface on the paper (i.e., on the wall surface on the right hand side).

Figure 2B:
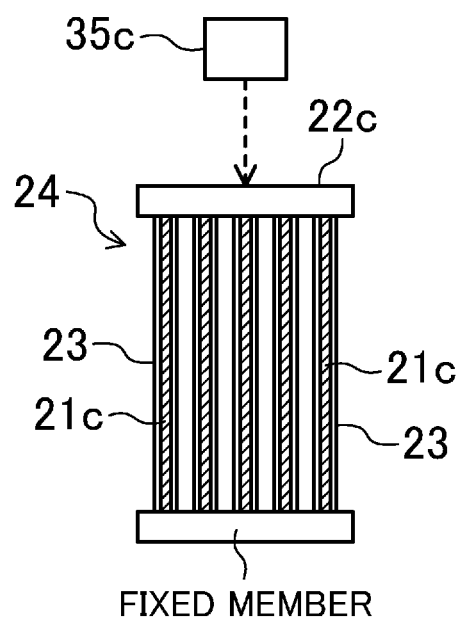
FIG. 2B illustrates a general configuration for a humidity control module.

In this air conditioner (1), each of the first and second indoor units (U1, U2) includes not only the cooling/heating module (20) described above but also a humidity control module (24) configured to desorb and absorb moisture to/from the air as well. As described above, this humidity control module (24) includes a thermoelastic material (21), an actuator (22) which applies tensile force to the thermoelastic material (21), and an adsorption layer (23) provided on the surface of the actuator (22) as shown in FIG. 2B. Application of tensile force thereto allows the humidity control module (24) to humidify the air. On the other hand, removal of tensile force therefrom allows the humidity control module (24) to dehumidify the air. That is to say, the humidity control module (24) is obtained by providing the adsorption layer (23) on the surface of the thermoelastic material (21) of the cooling/heating module (20).

According to this third embodiment, in each of the first and second indoor units (U1, U2), the air passes through the cooling/heating module (20) and the humidity control module (24), thus allowing this air conditioner (1) to perform not only the processing of desorbing and absorbing moisture to/from the air but also the processing of cooling and heating the air as well.

Figure 17A:
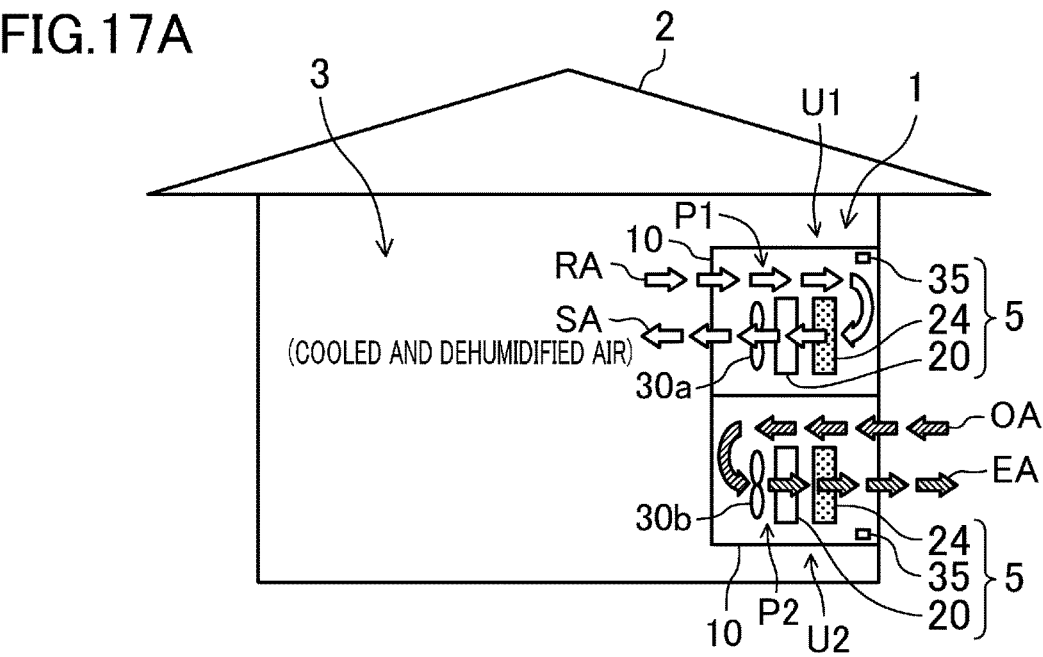
FIG. 17A illustrates a first operating state and FIG. 17B illustrates a second operating state.

FIG. 17A illustrates a state where the first indoor unit (U1) is performing a cooling and moisture-absorbing operation and the second indoor unit (U2) is performing a heating and moisture-desorbing operation. In the first indoor unit (U1), the tensile force applied to the thermoelastic material (21) of the cooling/heating module (20) and the humidity control module (24) is removed. Thus, the room air (RA) sucked into the casing (10) is not only dehumidified but also cooled. As a result, the dehumidified and cooled air is supplied as supply air (SA) to the indoor space (3).

On the other hand, in the second indoor unit (U2), the fan (30) revolves in a direction in which the outdoor air (OA) is sucked into the casing (10), processed, and then exhausted, while tensile force is applied at the same time to the thermoelastic material (21) of the cooling/heating module (20) and humidity control module (24). As a result, the air heated by the cooling/heating module (20) and humidified by the humidity control module (24) is released as exhaust air (EA) to the outdoor space. At this time, the adsorption layer of the humidity control module (24) is regenerated by releasing moisture.

Figure 17B:
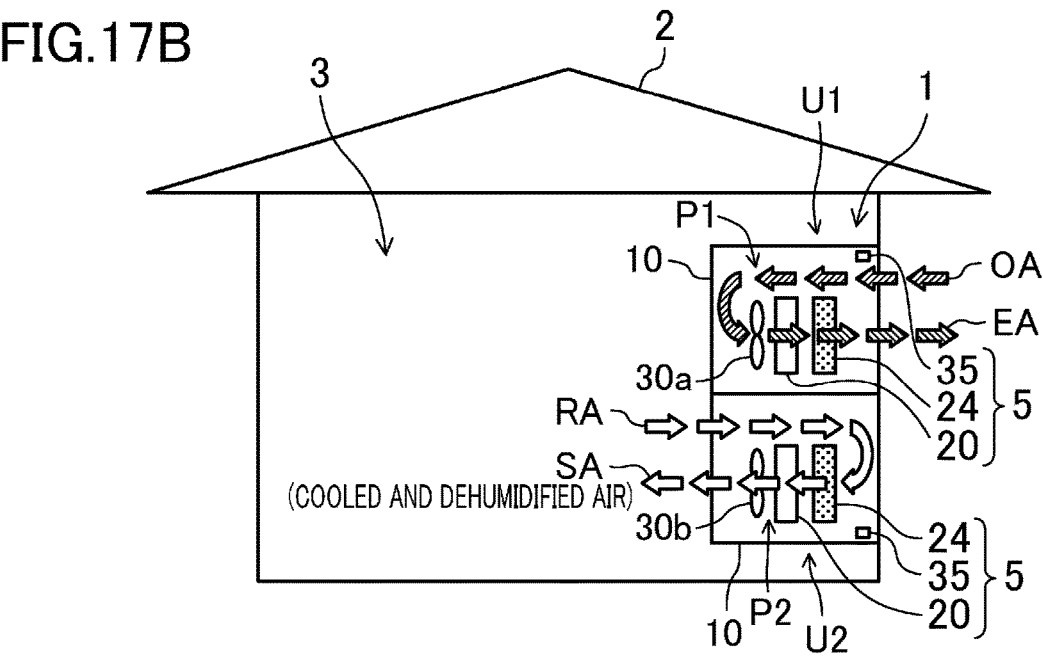

FIG. 17B illustrates a state where the second indoor unit (U2) is performing a cooling and moisture-absorbing operation and the first indoor unit (U1) is performing a heating and moisture-desorbing operation. In the second indoor unit (U2), the tensile force applied to the thermoelastic material (21) of the cooling/heating module (20) and the humidity control module (24) is removed. Thus, the room air (RA) sucked into the casing (10) is not only dehumidified but also cooled. As a result, the dehumidified and cooled air is supplied as supply air (SA) to the indoor space (3).

On the other hand, in the first indoor unit (U1), the fan (30) revolves in a direction in which the outdoor air (OA) is sucked into the casing (10), processed, and then exhausted, while tensile force is applied at the same time to the thermoelastic material (21) of the cooling/heating module (20) and humidity control module (24). As a result, the air heated by the cooling/heating module (20) and humidified by the humidity control module (24) is released as exhaust air (EA) to the outdoor space. At this time, the adsorption layer of the humidity control module (24) is regenerated by releasing moisture.

As can be seen, this third embodiment allows for performing a dehumidifying and cooling mode of operation continuously by switching the modes of operation shown in FIGS. 17A and 17B alternately so that while one indoor unit (U1, U2) is cooling and dehumidifying the air and giving the air to the indoor space (3), the other indoor unit (U2, U1) performs heating and moisture-desorbing processing.

In this embodiment, the cooling/heating module (20) and the humidity control module (24) are arranged in series together with respect to the air flow so that sensible heat processing and latent heat processing are performed on the air in series and the resultant air is supplied to the indoor space. However, the cooling/heating module (20) and the humidity control module (24) may also be arranged in parallel with each other so that the air subjected to the sensible heat processing and the air subjected to the latent heat processing are supplied as mixture to the indoor space. This alternative configuration is also applicable to any of the variations to be described below.

——Variations of Third Embodiment——
(First Variation)

Figure 18:
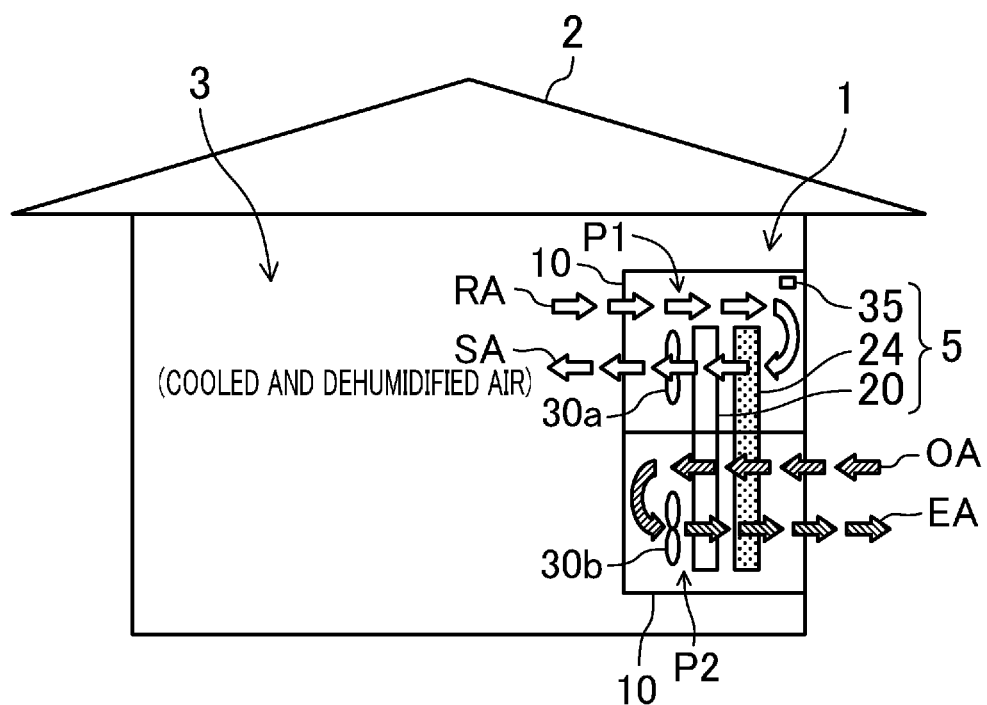
FIG. 18 illustrates generally a state where an air conditioner according to a first variation of the third embodiment and a sixth variation of the fourth embodiment is installed indoors.

The first variation of the third embodiment illustrated in FIG. 18 is directed to an exemplary air conditioner (1) which uses a cooling/heating module (20) implemented as a rotor. This air conditioner (1) includes not only the cooling/heating module (20) implemented as a rotor but also a humidity control module (24) implemented as a rotor as well, and is configured to perform a dehumidifying and cooling mode of operation.

The casing (10) of this air conditioner (1) has an air supply passage (P1) and an air exhaust passage (P2). The air supply passage (P1) is provided with an air supply fan (30a), while the air exhaust passage (P2) is provided with an air exhaust fan (30b). The cooling/heating module (20) is configured as a disk, which is arranged to partially cover both of the air supply passage (P1) and air exhaust passage (P2) inside the casing (10). This cooling/heating module (20) is configured to rotate on an axis so as to allow a portion located in the air supply passage (P1) to move into the air exhaust passage (P2) and also allow a portion located in the air exhaust passage (P2) to move into the air supply passage (P1).

The humidity control module (24) is also configured as a disk, which is arranged to partially cover both of the air supply passage (P1) and air exhaust passage (P2) inside the casing (10). This humidity control module (24) is configured to rotate on an axis so as to allow a portion located in the air supply passage (P1) to move into the air exhaust passage (P2) and also allow a portion located in the air exhaust passage (P2) to move into the air supply passage (P1).

In the air conditioner (1) of this first variation of the third embodiment, a cooling and moisture-absorbing operation is performed in the air supply passage (P1) and a heating and moisture-desorbing operation is performed in the air exhaust passage (P2). More particularly, no tensile force is applied to a portion of the cooling/heating module (20) which is located in the air supply passage (P1), and the thermoelastic material (21) absorbs heat, thereby cooling the air. Meanwhile, no tensile force is applied, either, to a portion of the humidity control module (24) which is located in the air supply passage (P1), and the thermoelastic material (21) absorbs heat, thereby cooling the adsorbent and adsorbing moisture in the air into the adsorbent. As a result, the cooled and dehumidified air is supplied as supply air (SA) to the indoor space (3).

On the other hand, tensile force is applied to a portion of the cooling/heating module (20) which is located in the air exhaust passage (P2), and the thermoelastic material (21) dissipates heat and heats the air. Meanwhile, tensile force is also applied to a portion of the humidity control module (24) which is located in the air exhaust passage (P2), and the thermoelastic material (21) dissipates heat and heats the adsorbent. Thus, the adsorbent is regenerated by desorbing moisture to the air. As a result, the heated and humidified air is released as exhaust air (EA) to the outdoor space.

According to this variation, the cooling and moisture-absorbing operation and the heating and moisture-desorbing operation are performed with the cooling/heating module (20) and humidity control module (24) rotated either continuously or intermittently. This thus allows the cooling/heating module (20) and humidity control module (24) to cool the air and absorb moisture from the air in the air supply passage (P1) while making the cooling/heating module (20) perform heat dissipating processing and humidity control module (24) perform moisture-desorbing processing in the air exhaust passage (P2). This allows for supplying dehumidified and cooled air continuously to the indoor space (3).

(Second Variation)

Although the air conditioner (1) according to the third embodiment shown in FIG. 17 is a dehumidifier-cooler, the second variation of the third embodiment shown in FIG. 19 is configured as a humidifier-heater. In this variation, both of the first and second indoor units (U1, U2) are also arranged on the same wall surface on the paper (i.e., on the wall surface on the right hand side).

In this air conditioner (1), each of the first and second indoor units (U1, U2) also includes not only the cooling/heating module (20) but also the humidity control module (24) configured to cool and heat the air as well.

The first and second indoor units (U1, U2) have the same configuration as their counterparts of the third embodiment shown in FIG. 17.

Figure 19A:
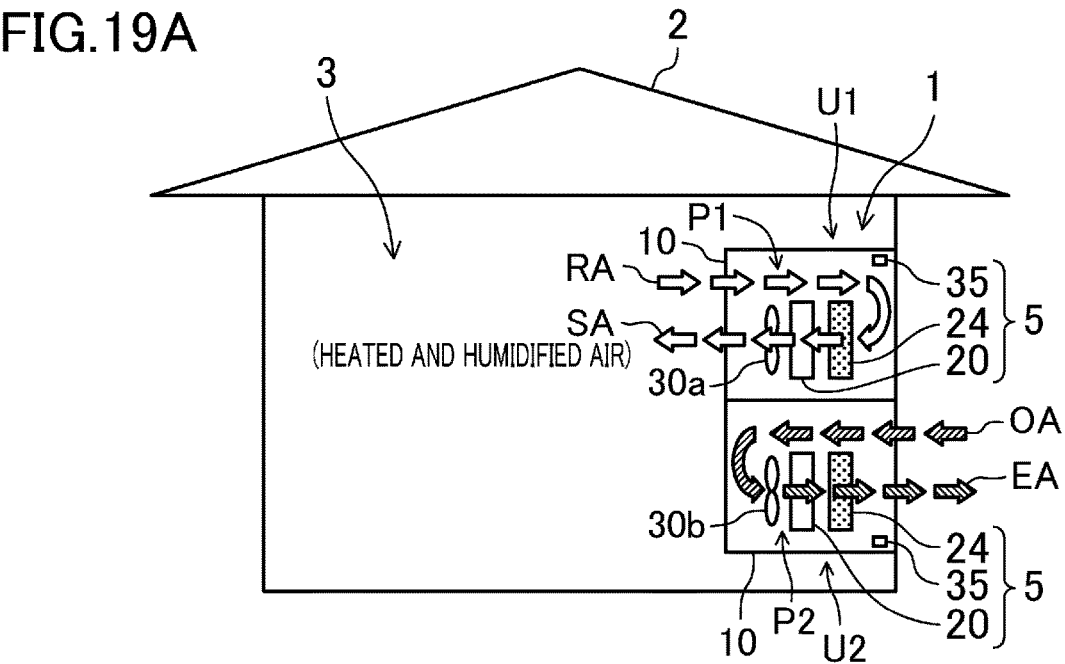
FIG. 19A illustrates a first operating state and FIG. 19B illustrates a second operating state.

FIG. 19A illustrates a state where the first indoor unit (U1) is performing a heating and moisture-desorbing operation and the second indoor unit (U2) is performing a cooling and moisture-absorbing operation. In the first indoor unit (U1), tensile force is applied to the thermoelastic material (21) of the cooling/heating module (20) and the humidity control module (24). Thus, the room air (RA) sucked into the casing (10) is not only heated but also humidified. As a result, the humidified and heated air is supplied as supply air (SA) to the indoor space (3).

On the other hand, in the second indoor unit (U2), the fan (30) revolves in a direction in which the outdoor air (OA) is sucked into the casing (10), processed, and then exhausted, while the tensile force applied to the thermoelastic material (21) of the cooling/heating module (20) and humidity control module (24) is removed. As a result, the air that has been cooled by the cooling/heating module (20) and has had its moisture absorbed by the humidity control module (24) is released as exhaust air (EA) to the outdoor space.

Figure 19B:
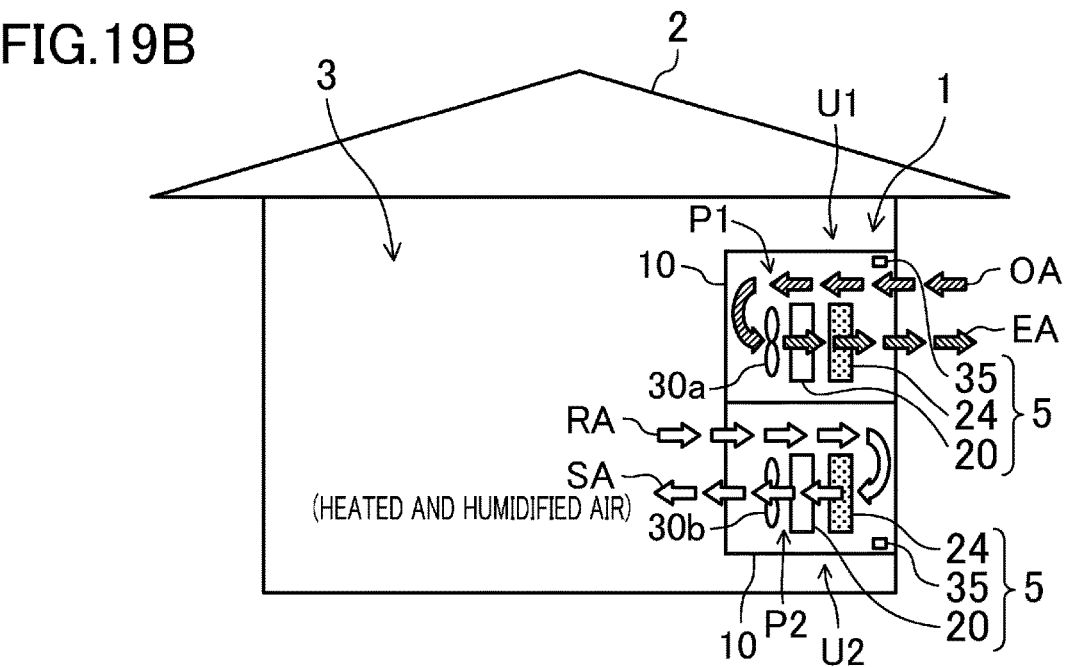

FIG. 19B illustrates a state where the second indoor unit (U2) is performing a heating and moisture-desorbing operation and the first indoor unit (U1) is performing a cooling and moisture-absorbing operation. In the second indoor unit (U2), tensile force is applied to the thermoelastic material (21) of the cooling/heating module (20) and the humidity control module (24). Thus, the room air (RA) sucked into the casing (10) is not only heated but also humidified. As a result, the humidified and heated air is supplied as supply air (SA) to the indoor space (3).

On the other hand, in the first indoor unit (U1), the fan (30) revolves in a direction in which the outdoor air (OA) is sucked into the casing (10), processed, and then exhausted, while the tensile force applied to the thermoelastic material (21) of the cooling/heating module (20) and humidity control module (24) is removed. As a result, the air that has been cooled by the cooling/heating module (20) and has had its moisture absorbed by the humidity control module (24) is released as exhaust air (EA) to the outdoor space.

As can be seen, this second variation of the third embodiment allows for performing a humidifying and heating mode of operation continuously by switching the modes of operation shown in FIGS. 19A and 19B alternately so that while one indoor unit (U1, U2) is heating and humidifying the air and supplying the air to the indoor space (3), the other indoor unit (U2, U1) cools the air and absorbs the moisture of the air into the adsorption layer (23).

(Third Variation)

Figure 20:
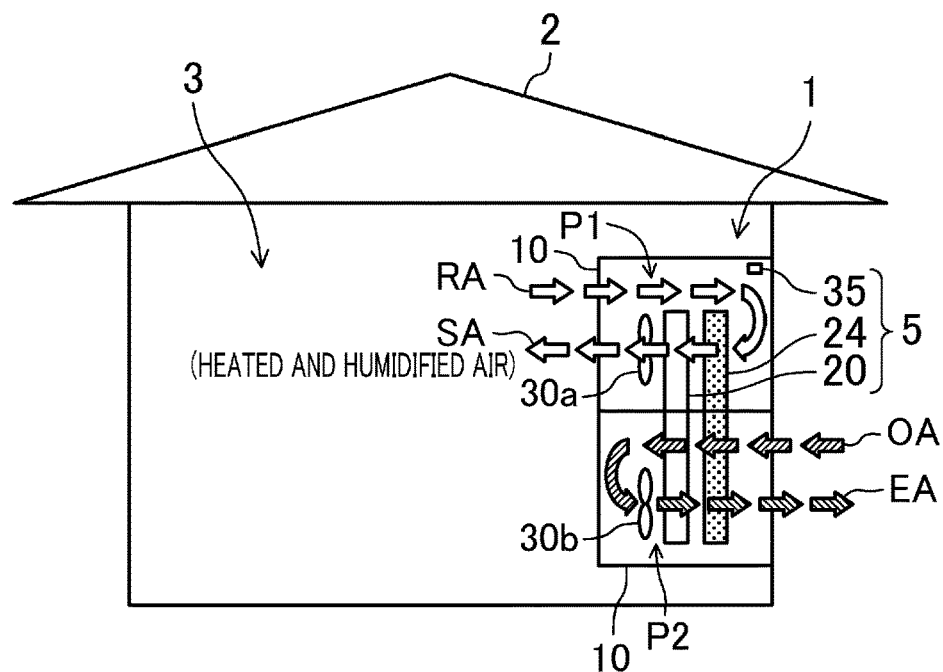
FIG. 20 illustrates generally a state where an air conditioner according to a third variation of the third embodiment and a sixth variation of the fourth embodiment is installed indoors.

Although the air conditioner (1) according to the first variation shown in FIG. 18 is a dehumidifier-cooler, the third variation of the third embodiment shown in FIG. 20 is configured as a humidifier-heater. In this variation, not only a cooling/heating module (20) implemented as a rotor but also a humidity control module (24) implemented as a rotor are used as well.

The casing (10), cooling/heating module (20) and humidity control module (24) of this air conditioner (1) have the same configuration as their counterparts shown in FIG. 18.

More particularly, the casing (10) of this air conditioner (1) has an air supply passage (P1) and an air exhaust passage (P2). The air supply passage (P1) is provided with an air supply fan (30a), while the air exhaust passage (P2) is provided with an air exhaust fan (30b). The cooling/heating module (20) is configured as a disk, which is arranged to partially cover both of the air supply passage (P1) and air exhaust passage (P2) inside the casing (10). This cooling/heating module (20) is configured to rotate on an axis so as to allow a portion located in the air supply passage (P1) to move into the air exhaust passage (P2) and also allow a portion located in the air exhaust passage (P2) to move into the air supply passage (P1). The humidity control module (24) is also configured as a disk, which is arranged to partially cover both of the air supply passage (P1) and air exhaust passage (P2) inside the casing (10). This humidity control module (24) is configured to rotate on an axis so as to allow a portion located in the air supply passage (P1) to move into the air exhaust passage (P2) and also allow a portion located in the air exhaust passage (P2) to move into the air supply passage (P1).

In the air conditioner (1) of this third variation, a heating and moisture-desorbing operation is performed in the air supply passage (P1) and a cooling and moisture-absorbing operation is performed in the air exhaust passage (P2). More particularly, tensile force is applied to a portion of the cooling/heating module (20) which is located in the air supply passage (P1), and the thermoelastic material (21) generates heat, thereby heating the air. Meanwhile, tensile force is applied to a portion of the humidity control module (24) which is located in the air supply passage (P1), and the thermoelastic material (21) generates heat, thereby heating the adsorbent and desorbing moisture from the adsorbent into the air.

On the other hand, the tensile force applied to a portion of the cooling/heating module (20) which is located in the air exhaust passage (P2) is removed, and the thermoelastic material (21) absorbs heat from the air. Meanwhile, the tensile force applied to a portion of the humidity control module (24) which is located in the air exhaust passage (P2) is removed, and the thermoelastic material (21) absorbs heat and cools the adsorbent. Thus, moisture in the air is adsorbed into the adsorbent.

According to this third variation of the third embodiment, the heating and moisture-desorbing operation and the cooling and moisture-absorbing operation are performed with the cooling/heating module (20) rotated either continuously or intermittently. This thus allows for heating the air and desorbing moisture to the air in the air supply passage (P1) while performing cooling processing and moisture-absorbing processing in the air exhaust passage (P2). Consequently, the device is allowed to operate so that heated and humidified air is supplied continuously to the indoor space (3).

«Fourth Embodiment of this Invention»

A fourth embodiment of the present invention will now be described.

An air conditioner (1) according to this fourth embodiment is obtained by modifying the air conditioner (1) shown in FIGS. 1 and 10 so that the air conditioner (1) can switch modes of operation from a cooling operation mode in which the air cooled by the cooling/heating module (20) is supplied to the indoor space (3) to a heating operation mode in which the air heated by the cooling/heating module (20) is supplied to the indoor space (3), and vice versa.

For example, the air conditioner (1) shown in FIG. 1 may be configured to switch modes of operation from removing the tensile force applied to the thermoelastic material (21) of the cooling/heating module (20) as shown in FIG. 1A to applying tensile force to the thermoelastic material (21) of the cooling/heating module (20) as shown in FIG. 10A, and vice versa, while processing the room air (RA) sucked into the casing (10). In addition, the air conditioner (1) shown in FIG. 1 may also be configured to switch modes of operation from applying tensile force to the cooling/heating module (20) as shown in FIG. 1B to removing the tensile force applied to the cooling/heating module (20) as shown in FIG. 10B, and vice versa, while processing the outdoor air (OA) sucked into the casing (10).

Such a configuration allows an air conditioner (1) including an indoor unit (U) with a single cooling/heating module (20) to switch modes of operation from cooling the indoor space (3) intermittently to heating the indoor space (3) intermittently, and vice versa.

——Variations of Fourth Embodiment——

(First Variation)

According to a first variation of the fourth embodiment, by changing the state of application of the tensile force, the air conditioner (1) shown in FIGS. 4 and 11 is configured to switch from the operation mode shown in FIG. 4A to the one shown in FIG. 11A, and vice versa, and from the operation mode shown in FIG. 4B to the one shown in FIG. 11B, and vice versa. The basic configuration of this device is the same as the ones shown in FIGS. 4 and 11, and a detailed description thereof will be omitted herein.

While this air conditioner (1) is performing the mode of operation shown in FIGS. 4A and 4B, the tensile force applied to a portion of the cooling/heating module (20), through which the room air (RA) sucked into the casing (10) passes, is removed, and tensile force is applied to a portion of the cooling/heating module (20), through which the outdoor air (OA) sucked into the casing (10) passes. On the other hand, while this air conditioner (1) is performing the mode of operation shown in FIGS. 11A and 11B, tensile force is applied to a portion of the cooling/heating module (20), through which the room air (RA) sucked into the casing (10) passes, and the tensile force applied to a portion of the cooling/heating module (20), through which the outdoor air (OA) sucked into the casing (10) passes, is removed.

This configuration allows an air conditioner (1), including two indoor units (U1, U2) that are installed on two opposing wall surfaces of a room, to switch modes of operation from cooling the indoor space (3) continuously to heating the indoor space (3) continuously, and vice versa.

(Second Variation)

According to a second variation of the fourth embodiment, by changing the state of application of the tensile force, the air conditioner (1) shown in FIGS. 5 and 12 is configured to switch from the operation mode shown in FIG. 5A to the one shown in FIG. 12A, and vice versa, and from the operation mode shown in FIG. 5B to the one shown in FIG. 12B, and vice versa. The basic configuration of this device is the same as the ones shown in FIGS. 5 and 12, and a detailed description thereof will be omitted herein.

While this air conditioner (1) is performing the mode of operation shown in FIGS. 5A and 5B, the tensile force applied to a portion of the cooling/heating module (20), through which the room air (RA) sucked into the casing (10) passes, is removed, and tensile force is applied to a portion of the cooling/heating module (20), through which the outdoor air (OA) sucked into the casing (10) passes. On the other hand, while this air conditioner (1) is performing the mode of operation shown in FIGS. 12A and 12B, tensile force is applied to a portion of the cooling/heating module (20), through which the room air (RA) sucked into the casing (10) passes, and the tensile force applied to a portion of the cooling/heating module (20), through which the outdoor air (OA) sucked into the casing (10) passes, is removed.

This configuration allows an air conditioner (1), including two indoor units (U1, U2) that are installed on a single wall surface of a room, to switch modes of operation from cooling the indoor space (3) continuously to heating the indoor space (3) continuously, and vice versa.

(Third Variation)

According to a third variation of the fourth embodiment, by changing the state of application of the tensile force, the air conditioner (1) shown in FIGS. 6-8 and FIGS. 13-15 is configured to switch from the operation mode shown in FIG. 7 to the one shown in FIG. 14, and vice versa, and from the operation mode shown in FIG. 8 to the one shown in FIG. 15, and vice versa. The basic configuration of this device is the same as the ones shown in FIGS. 6-8 and FIGS. 13-15, and a detailed description thereof will be omitted herein.

While this air conditioner (1) is performing the mode of operation shown in FIGS. 7 and 8, the tensile force applied to a portion of the cooling/heating module (20), through which the room air (RA) sucked into the casing (10) passes, is removed, and tensile force is applied to a portion of the cooling/heating module (20), through which the outdoor air (OA) sucked into the casing (10) passes. On the other hand, while this air conditioner (1) is performing the mode of operation shown in FIGS. 14 and 15, tensile force is applied to a portion of the cooling/heating module (20), through which the room air (RA) sucked into the casing (10) passes, and the tensile force applied to a portion of the cooling/heating module (20), through which the outdoor air (OA) sucked into the casing (10) passes, is removed.

This configuration allows an air conditioner (1), which uses a unit that can switch the air flow paths in the casing (10) including two cooling/heating modules (20), to switch modes of operation from cooling the indoor space (3) continuously to heating the indoor space (3) continuously, and vice versa.

(Fourth Variation)

According to a fourth variation of the fourth embodiment, by combining the air conditioners (1) shown in FIGS. 9 and 16 into a single device and changing the state of application of the tensile force, the device is configured to switch from the operation mode shown in FIG. 9 to the one shown in FIG. 16, and vice versa. The basic configuration of the device is the same as the ones shown in FIGS. 9 and 16, and a detailed description thereof will be omitted herein.

While this air conditioner (1) is performing the mode of operation shown in FIG. 9, the tensile force applied to a portion of the cooling/heating module (20), through which the room air (RA) sucked into the casing (10) passes, is removed, and tensile force is applied to a portion of the cooling/heating module (20), through which the outdoor air (OA) sucked into the casing (10) passes. On the other hand, while this air conditioner (1) is performing the mode of operation shown in FIG. 16, tensile force is applied to a portion of the cooling/heating module (20), through which the room air (RA) sucked into the casing (10) passes, and the tensile force applied to a portion of the cooling/heating module (20), through which the outdoor air (OA) sucked into the casing (10) passes, is removed.

This configuration allows an air conditioner (1), including a cooling/heating module (20) implemented as a rotor, to switch modes of operation from cooling the indoor space (3) continuously to heating the indoor space (3) continuously, and vice versa.

(Fifth Variation)

According to a fifth variation of the fourth embodiment, by changing the state of application of the tensile force, the air conditioner (1) shown in FIGS. 17 and 19 is configured to switch from the operation mode shown in FIG. 17A to the one shown in FIG. 19A, and vice versa, and from the operation mode shown in FIG. 17B to the one shown in FIG. 19B, and vice versa. The basic configuration of this device is the same as the ones shown in FIGS. 17 and 19, and a detailed description thereof will be omitted herein.

While this air conditioner (1) is performing the mode of operation shown in FIGS. 17A and 17B, the tensile force applied to the cooling/heating module (20) and humidity control module (24), through which the room air (RA) sucked into the casing (10) passes, is removed, and tensile force is applied to the cooling/heating module (20) and humidity control module (24), through which the outdoor air (OA) sucked into the casing (10) passes. On the other hand, while this air conditioner (1) is performing the mode of operation shown in FIGS. 19A and 19B, tensile force is applied to the cooling/heating module (20) and humidity control module (24), through which the room air (RA) sucked into the casing (10) passes, and the tensile force applied to the cooling/heating module (20) and humidity control module (24), through which the outdoor air (OA) sucked into the casing (10) passes, is removed.

This configuration allows an air conditioner (1), in which a cooling/heating module (20) and a humidity control module (24) are provided for each of two indoor units (U1, U2), to switch modes of operation from cooling the indoor space (3) continuously to heating the indoor space (3) continuously, and vice versa.

(Sixth Variation)

According to a sixth variation of the fourth embodiment, by combining the air conditioners (1) shown in FIGS. 18 and 20 into a single device and changing the state of application of the tensile force, the device is configured to switch from the operation mode shown in FIG. 18 to the one shown in FIG. 20, and vice versa. The basic configuration of the device is the same as the ones shown in FIGS. 18 and 20, and a detailed description thereof will be omitted herein.

While this air conditioner (1) is performing the mode of operation shown in FIG. 18, the tensile force applied to a portion of the cooling/heating module (20) and humidity control module (24), through which the room air (RA) sucked into the casing (10) passes, is removed, and tensile force is applied to a portion of the cooling/heating module (20) and humidity control module (24), through which the outdoor air (OA) sucked into the casing (10) passes. On the other hand, while this air conditioner (1) is performing the mode of operation shown in FIG. 20, tensile force is applied to a portion of the cooling/heating module (20) and humidity control module (24), through which the room air (RA) sucked into the casing (10) passes, and the tensile force applied to a portion of the cooling/heating module (20) and humidity control module (24), through which the outdoor air (OA) sucked into the casing (10) passes, is removed.

This configuration allows an air conditioner (1), which includes a cooling/heating module (20) and humidity control module (24), each being implemented as a rotor, to switch modes of operation from dehumidifying and cooling the indoor space (3) continuously to and humidifying and heating the indoor space (3) continuously, and vice versa.

«Fifth Embodiment of this Invention»

A fifth embodiment of the present invention will now be described. The fifth embodiment illustrated in FIG. 24 relates to a specific configuration for the cooling/heating module (20). In the cooling/heating module (20) according to this fifth embodiment, the switching control section (35) adjusts the positions of movable plates (41a, 41b), thereby selectively applying and removing tensile force to/from the thermoelastic material (21).

Figure 24:
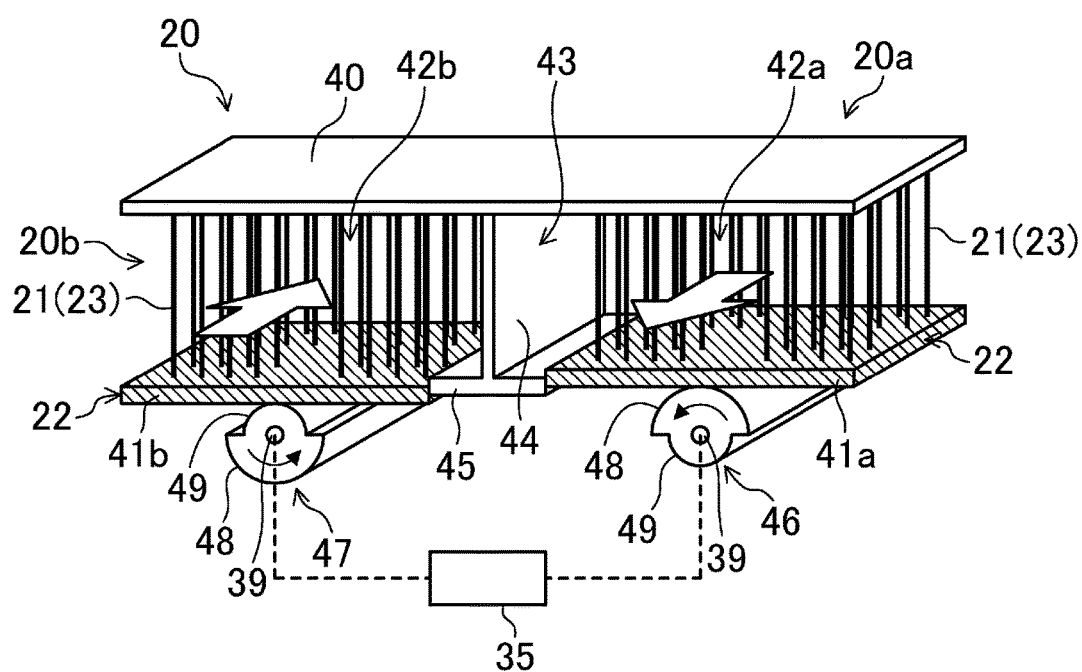
FIG. 24 is a perspective view illustrating the structure of a cooling/heating module according to a fifth embodiment.

As shown in FIG. 24, the cooling/heating module (20) according to this fifth embodiment is comprised of first and second cooling/heating modules (20a, 20b). In FIG. 24, the first cooling/heating module (20a) is supposed to be arranged on the right hand side, and the second cooling/heating module (20b) on the left hand side.

Each of these cooling/heating modules (20a, 20b) includes a thermoelastic material (21), an actuator (22) and a switching control section (35). These two cooling/heating modules (20a, 20b) are laterally separated from each other by a partition plate (43).

The thermoelastic material (21) is configured as wires that extend vertically upward and downward. This thermoelastic material (21) may be made of a shape memory alloy, for example, and heats the object when tension is applied to the material and cools the object when tension is removed from the material. More particularly, as shown in FIG. 21, when tensile force is applied to the thermoelastic material (21), the thermoelastic material (21) changes from the parent phase (i.e., austenitic phase) to the martensitic phase. Thus, the thermoelastic material (21) comes to have decreased entropy and generates some heat correspondingly. As a result, the thermoelastic material (21) heats itself (i.e., the phase changes from I to II). When the thermoelastic material (21) is brought into contact with the object to be heated with tensile force continuously applied to the thermoelastic material (21), the heat propagates from the thermoelastic material (21) to the object to be heated (i.e., the phase changes from II to III). Consequently, the temperature of the thermoelastic material (21) falls. Thereafter, when the tensile force applied to the thermoelastic material (21) is removed (taken away), the thermoelastic material (21) changes from the martensitic phase to the parent phase (austenitic phase) (i.e., the phase changes from III to IV). If the thermoelastic material (21) is thermally insulated at this time, the temperature of the thermoelastic material (21) falls. When the object to be cooled is brought into contact with the thermoelastic material, of which the temperature has fallen, the heat propagates from the object to be cooled to the thermoelastic material (21) (i.e., the phase changes from IV to I).

The actuator (22) includes a fixed plate (40), which is an exemplary fixed portion, first and second movable plates (41a, 41b), which are an implementation of the movable portions, and first and second cams (46, 47) and their shafts (39), which together function as the displacement mechanism. The fixed plate (40) is configured as a substantially rectangular thin plate. The lower surface of the fixed plate (40) is divided by a partition plate (43) into left and right regions. One end of the thermoelastic material (21) of the first cooling/heating module (20a) (i.e., the first cooling/heating module) is attached to the right region, and one end of the thermoelastic material (21) of the second cooling/heating module (20b) (i.e., the second cooling/heating module) is attached to the left region.

The partition plate (43) is provided to laterally separate the first and second cooling/heating modules (20a, 20b) from each other. The partition plate (43) is configured as a member with a substantially T-cross section. The partition plate (43) is comprised of a body portion (44) which extends perpendicularly downward with respect to the fixed plate (40) and which is configured as a thin rectangular plate, and a flange portion (45) which extends substantially parallel to the fixed plate (40) and which is configured as a thin rectangular plate. In this partition plate (43), the base end of the body portion (44) is attached to the fixed plate (40), and the flange portion (45) is arranged substantially level with the other end of the thermoelastic material (21).

The first and second movable plates (41a, 41b) are members for applying tensile force to the thermoelastic material (21), and are provided for the first and second cooling/heating modules (20a, 20b), respectively. Specifically, the first movable plate (41a) is attached to the other end of the thermoelastic material (21) of the first cooling/heating module (20a) and is arranged to face the fixed plate (40). The second movable plate (41b) is attached to the other end of the thermoelastic material (21) of the second cooling/heating module (20b) and is arranged to face the fixed plate (40). A first air passage (42a) is defined between the first movable plate (41a) and the fixed plate (40), and a second air passage (42b) is defined between the second movable plate (41b) and the fixed plate (40).

Also, each of the first and second movable plates (41a, 41b) is configured as a substantially rectangular thin plate and has a predetermined weight. Thus, the first and second movable plates (41a, 41b) apply some load to the thermoelastic material (21) due to their own weight, thereby applying downward tensile force to the thermoelastic material (21). Therefore, the first and second movable plates (41a, 41b) have a weight that is heavy enough to apply such tensile force to the thermoelastic material (21).

Each of the first and second cams (46, 47) is a substantially cylindrical member which extends in the width direction of the first and second movable plates (41a, 41b) (i.e., in the depth direction in FIG. 24). More particularly, the first cam (46) is comprised of an outer peripheral portion (48) with a circular cross section and a reduced diameter portion (49) with a partially notched, semi-circular cross section. A shaft (39) is inserted into, and extends through, the middle of the first cam (46) so that the cam (46) is rotatable in the direction of rotation of the shaft (39). Likewise, the second cam (47) is also comprised of an outer peripheral portion (48) with a circular cross section and a reduced diameter portion (49) with a partially notched, semi-circular cross section. A shaft (39) is also inserted into, and extends through, the middle of the second cam (47) so that the cam (47) is rotatable in the direction of rotation of the shaft (39). The switching control section (35) is connected to these shafts (39) to control the rotational positions of the first and second cams (46, 47).

The first and second cams (46, 47) are configured to have their phases horizontally shifted from each other by 180 degrees. More particularly, these cams (46, 47) are configured so that when the outer peripheral portion (48) of the first cam (46) contacts with the first movable plate (41a), the reduced diameter portion (49) of the second cam (47) contacts with the second movable plate (41a). By adopting such a configuration, load (and therefore, tensile force) is applied from the second movable plate (41b) to the thermoelastic material (21) of the second cooling/heating module (20b). As a result, the thermoelastic material (21) of the second cooling/heating module (20b) generates heat, and the air flowing around the thermoelastic material (21) is heated. On the other hand, since the load of the first movable plate (41a) is supported by the first cam (46), the tensile force has been removed from the thermoelastic material (21) of the first cooling/heating module (20a). As a result, the thermoelastic material (21) of the first cooling/heating module (20a) is cooled, and eventually, the air flowing around the thermoelastic material (21) is cooled.

The cooling/heating module (20) according to this fifth embodiment not only has so simple a configuration as to use it in practice effectively but also has a reduced module size as well. That is why application of such a cooling/heating module (20) to the air conditioner (1) of the first embodiment shown in FIG. 1, for example, not only prevents the air conditioner (1) from having a complicated structure but also reduces the size of the device (1) as well.

In addition, this embodiment enables a switch from heating to cooling, and vice versa, which is applicable advantageously to the batch switching type air conditioner (1) of the embodiment described above.

Note that the control may be carried out with a motor attached to each shaft (39) so that the phase difference between the two cams (46, 47) becomes 180 degrees. Alternatively, the shafts (39, 39) may also be interlocked with each other via gears, for example, even when a single motor is used.

Figure 25:
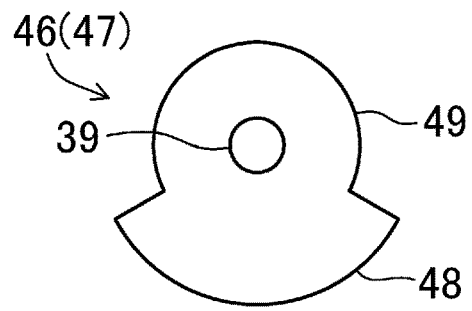
FIG. 25 illustrates an exemplary shape for a cam according to the fifth embodiment.
Figure 26:
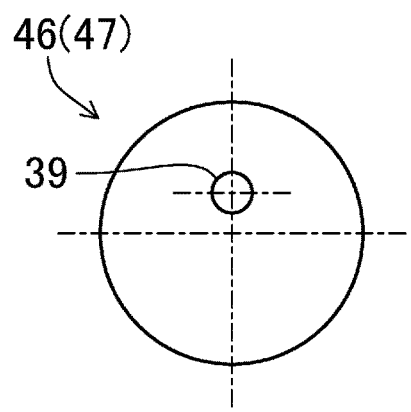
FIG. 26 illustrates another exemplary shape for a cam according to the fifth embodiment.
Figure 27:
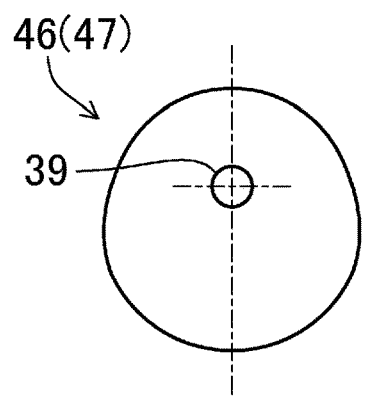
FIG. 27 illustrates still another exemplary shape for a cam according to the fifth embodiment.

Also, the shape of the cams may be modified as well. For example, the reduced diameter portion (49) and outer peripheral portion (48) may have different proportions as shown in FIG. 25. Alternatively, the cams may also be configured by simply offsetting the shaft (39) as shown in FIG. 26. Still alternatively, the radius of curvature of the outer peripheral portion (48) may be changed and the shaft (39) may be offset as shown in FIG. 27.

——Variations of Fifth Embodiment——

(First Variation)

Next, a first variation of the fifth embodiment will be described. This first variation includes an actuator (22) with a different configuration from its counterpart of the first embodiment. Note that illustration of the switching control section (35) is omitted.

Figure 28:
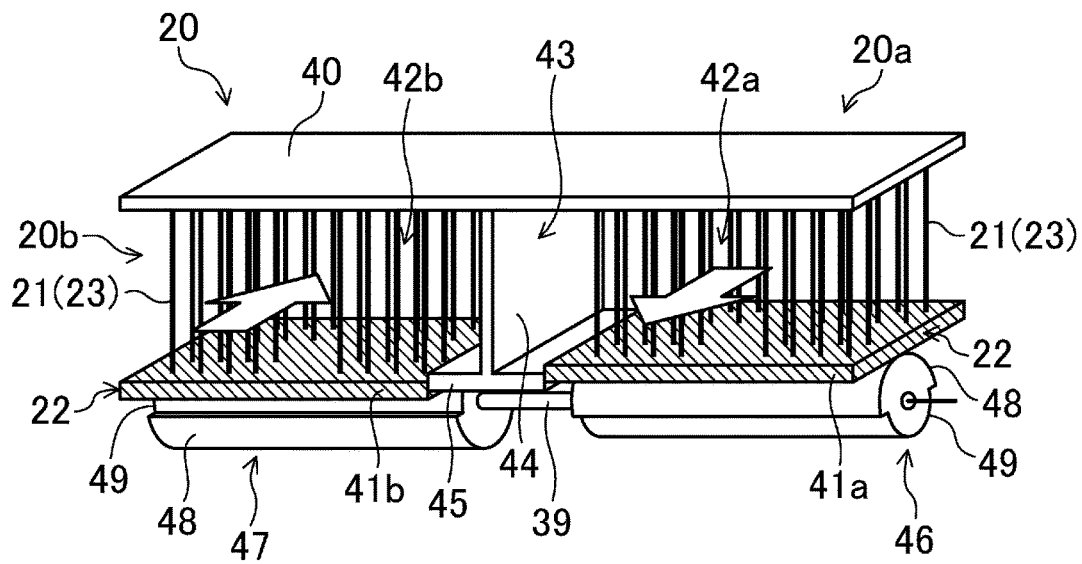
FIG. 28 is a perspective view illustrating the structure of a cooling/heating module according to a first variation of the fifth embodiment.

Specifically, the first and second cams (46, 47) of this first variation extend in the longitudinal direction of, and are arranged coaxially with, the first and second movable plates (41a, 41b) as shown in FIG. 28. The same shaft (39) is inserted into, and extends through, the first and second cams (46, 47). The first and second cams (46, 47) are mounted to the shaft (39) with their phases shifted from each other by 180 degrees. This variation is configured so that as the shaft (39) is turned by the switching control section (35), the first and second cams (46, 47) both rotate synchronously with each other. In the other respects, the configuration, functions and effects of this variation are the same as those of the fifth embodiment.

(Second Variation)

Next, a second variation of the fifth embodiment will be described. This second variation includes an actuator (22) with a different configuration from its counterpart of the first embodiment. Note that illustration of the switching control section (35) is omitted.

Figure 29:
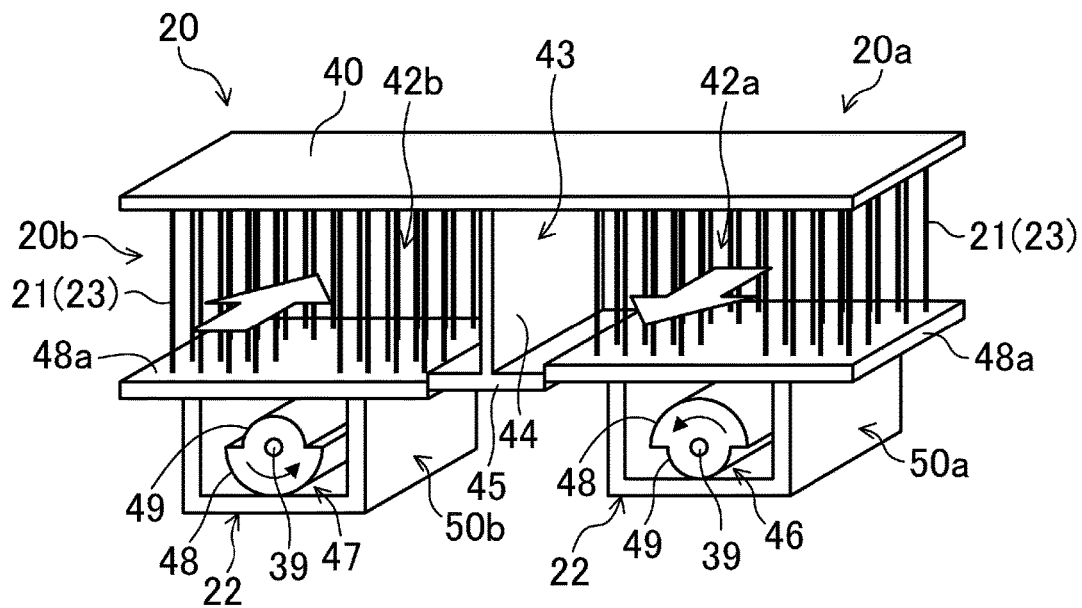
FIG. 29 is a perspective view illustrating the structure of a cooling/heating module according to a second variation of the fifth embodiment.

Specifically, although the actuator (22) of the fifth embodiment described above includes first and second movable plates (41a, 41b) with a weight, the actuator (22) according to this second variation does not include such first and second movable plates (41a, 41b) but does include first and second movable housings (50a, 50b) as shown in FIG. 29. The first movable housing (50a) is provided for the first cooling/heating module (20a) (i.e., first cooling/heating section), and the second movable housing (50b) is provided for the second cooling/heating module (20b) (i.e., second cooling/heating section).

Each of the first and second movable housings (50a, 50b) is configured as a rectangular parallelepiped box, of which one side is open and the upper wall projects horizontally. The other end of the thermoelastic material (21) is attached to the upper wall of the first and second movable housings (50a, 50b). Inside the first movable housing (50a), arranged are the first cam (46) and its shaft (39). Inside the second movable housing (50b), arranged are the second cam (47) and its shaft (39). The first and second cams (46, 47) are configured to have their phases horizontally shifted from each other by 180 degrees by the switching control section (35). More particularly, these cams (46, 47) are configured so that when the reduced diameter portion (49) of the first cam (46) contacts with the inner lower surface of the first movable housing (50a), the outer peripheral portion (48) of the second cam (47) contacts with the inner lower surface of the second movable housing (50b) as shown in FIG. 29. By adopting such a configuration, the second movable housing (50b) is pulled downward by the outer peripheral portion (48) of the second cam (47), so is the thermoelastic material (21) of the second cooling/heating module (20b).

Then, as the respective shafts (39, 39) turn, their phases shift from each other by 180 degrees, the reduced diameter portion (49) of the second cam (47) contacts with the inner lower surface of the second movable housing (50b), and the outer peripheral portion (48) of the first cam (46) contacts with the inner lower surface of the first movable housing (50a). As a result, the first movable housing (50a) is pulled downward by the outer peripheral portion (48) of the first cam (46), so is the thermoelastic material (21) of the first cooling/heating module (20a).

(Third Variation)

Next, a third variation of the fifth embodiment will be described. This third variation includes an actuator (22) with a different configuration from its counterpart of the first variation described above. Note that illustration of the switching control section (35) is omitted.

Figure 30:
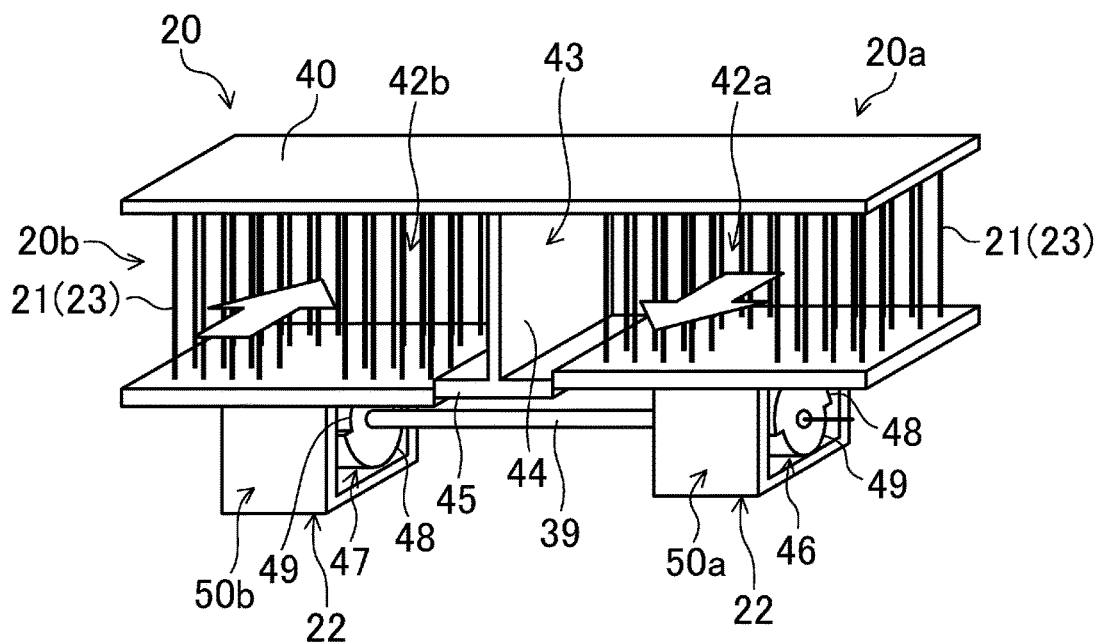
FIG. 30 is a perspective view illustrating the structure of a cooling/heating module according to a third variation of the fifth embodiment.

Specifically, as shown in FIG. 30, the first and second cams (46, 47) according to this third variation extend in the longitudinal direction of, and are arranged coaxially with, the first and second movable housings (50a, 50b). A single shaft (39) is inserted into, and extends through, the first and second cams (46, 47). The first and second cams (46, 47) are mounted to the shaft (39) so that their phases are shifted from each other by 180 degrees by the switching control section (35). This variation is configured so that as this shaft (39) turns, the first and second cams (46, 47) rotate together.

In this third variation, the repulsive force when the tensile force is removed from the thermoelastic material (21) is recovered as the power to turn the shaft (39). More particularly, when the state where the outer peripheral portion (48) of the second cam (47) and the second movable housing (50b) are in contact with each other (i.e., the state where tensile force is applied to the thermoelastic material (21) of the second cooling/heating module (20b)) changes into a state where the outer peripheral portion (48) of the second cam (47) and the second movable housing (50b) are out of contact with each other (i.e., the state where tensile force is removed from the thermoelastic material (21) of the second cooling/heating module (20b)) as shown in FIG. 30, for example, the supply of the power to the motor driving the shaft (39) is temporarily stopped to set the shaft (39) free temporarily. As a result, the shaft (39) is driven in rotation under the repulsive force produced by the thermoelastic material (21) of the second cooling/heating module (20b). This thus allows for reducing the power to turn the shaft (39) and saving the energy to be dissipated by the air conditioner. In the same way, when tensile force is removed from the thermoelastic material (21) of the first cooling/heating module (20a), the supply of the power to the motor driving the shaft (39) is also temporarily stopped. As a result, the repulsive force produced by the thermoelastic material (21) of the first cooling/heating module (20a) is recovered as the power to turn the shaft (39).

(Fourth Variation)

Next, a fourth variation of the fifth embodiment will be described. This fourth variation includes an actuator (22) with a different configuration from the counterpart of the third variation described above. Note that illustration of the switching control section (35) is omitted.

Figure 31:
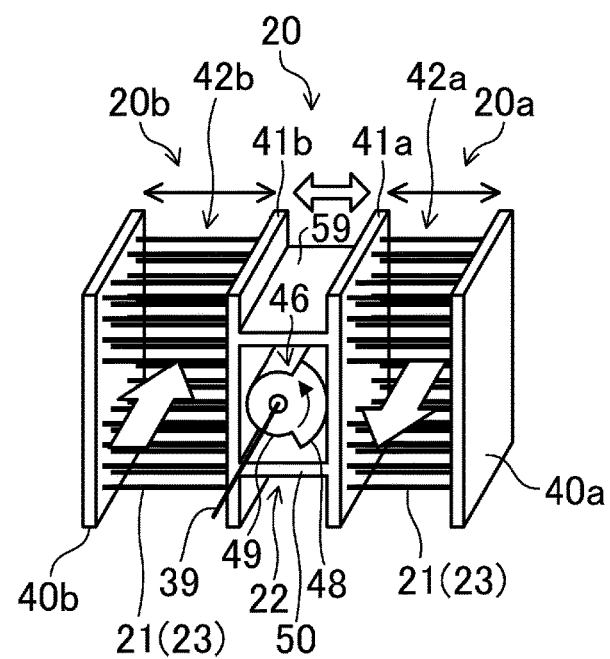
FIG. 31 is a perspective view illustrating the structure of a cooling/heating module according to a fourth variation of the fifth embodiment.

Specifically, as shown in FIG. 31, a cooling/heating module (20) according to this fourth variation includes a thermoelastic material (21), first and second fixed plates (40a, 40b) functioning as fixed portions, a movable housing (50), and a cam (46) and its shaft (39) which together function as a displacement mechanism.

Each of the first and second fixed plates (40a, 40b) is configured as a substantially rectangular thin plate. The first fixed plate (40a) is arranged vertically close to the right end to form part of the first cooling/heating module (20a), while the second fixed plate (40b) is arranged vertically close to the left end to form part of the second cooling/heating module (20b). One end of the thermoelastic material (21) of the first cooling/heating module (20a) is connected to the left end face of the first fixed plate (40a), and one end of the thermoelastic material (21) of the second cooling/heating module (20b) is connected to the right end face of the second fixed plate (40b).

The movable housing (50) is arranged between the first and second fixed plates (40a, 40b). The movable housing (50) includes first and second movable plates (41a, 41b) and two connecting plates (59, 59).

Each of the first and second movable plates (41a, 41b) is configured as a substantially rectangular thin plate. The first movable plate (41a) is vertically arranged to face the first fixed plate (40a), and the second movable plate (41b) is vertically arranged to face the second fixed plate (40b). The first movable plate (41a) is attached to the other end of the thermoelastic material (21) of the first cooling/heating module (20a), and the second movable plate (41b) is attached to the other end of the thermoelastic material (21) of the second cooling/heating module (20b). A first air passage (42a) is defined between the first fixed plate (40a) and the first movable plate (41a), and a second air passage (42b) is defined between the second fixed plate (40b) and the second movable plate (41b).

Each of the connecting plates (59, 59) is configured as a substantially rectangular thin plate. These connecting plates (59, 59) are arranged between the first and second movable plates (41a, 41b) so as to leave a predetermined gap between them in the height direction. That is to say, the first and second movable plates (41a, 41b) and connecting plates (59, 59) are configured to move integrally with each other.

Inside the movable housing (50), arranged are a cam (46) and its shaft (39). The cam (46) is a substantially cylindrical member which extends in the width direction of the first and second movable plates (41a, 41b) (i.e., in the depth direction in FIG. 31). More particularly, the cam (46) is comprised of an outer peripheral portion (48) with a circular cross section and a reduced diameter portion (49) defined by partially notching the semi-circular cross section of the outer peripheral portion (48). A shaft (39) is inserted into, and extends through, the middle of the cam (46) so that the cam (46) is rotatable in its circumferential direction. More particularly, this variation is configured so that if the rotation of the cam (46) brings the outer peripheral portion (48) of the cam (46) into contact with the first movable plate (41a), the reduced diameter portion (49) of the cam (46) contacts with the second movable plate (41b). As a result, the movable housing (50) moves to the right, the second movable plate (41b) is pulled to the right, and the thermoelastic material (21) of the second cooling/heating module (20b) is also pulled to the right.

This variation is also configured so that if the rotation of the cam (46) brings the outer peripheral portion (48) of the cam (46) into contact with the second movable plate (41b) to the contrary, the reduced diameter portion (49) of the cam (46) contacts with the first movable plate (41b). As a result, the movable housing (50) moves to the left, the first movable plate (41a) is pulled to the left, and the thermoelastic material (21) of the first cooling/heating module (20a) is also pulled to the left.

In this fourth variation, the repulsive force when the tensile force is removed from the thermoelastic material (21) is also recovered as the power to turn the shaft (39). More particularly, when the state where the outer peripheral portion (48) of the cam (46) and the first movable plate (41a) are in contact with each other (i.e., the state where tensile force is applied to the thermoelastic material (21) of the second cooling/heating module (20b)) changes into a state where the outer peripheral portion (48) of the cam (46) and the first movable plate (41a) are out of contact with each other (i.e., the state where tensile force is removed from the thermoelastic material (21) of the second cooling/heating module (20b)) as shown in FIG. 31, for example, the supply of the power to the motor driving the shaft (39) is temporarily stopped to set the shaft (39) free temporarily. As a result, the shaft (39) is driven in rotation under the repulsive force produced by the thermoelastic material (21) of the second cooling/heating module (20b). This thus allows for reducing the power to turn the shaft (39) and saving the energy to be dissipated by the air conditioner. In the same way, when tensile force is removed from the thermoelastic material (21) of the first cooling/heating module (20a), the supply of the power to the motor driving the shaft (39) is also temporarily stopped. As a result, the repulsive force produced by the thermoelastic material (21) of the first cooling/heating module (20a) is recovered as the power to turn the shaft (39).

(Fifth Variation)

Figure 32:
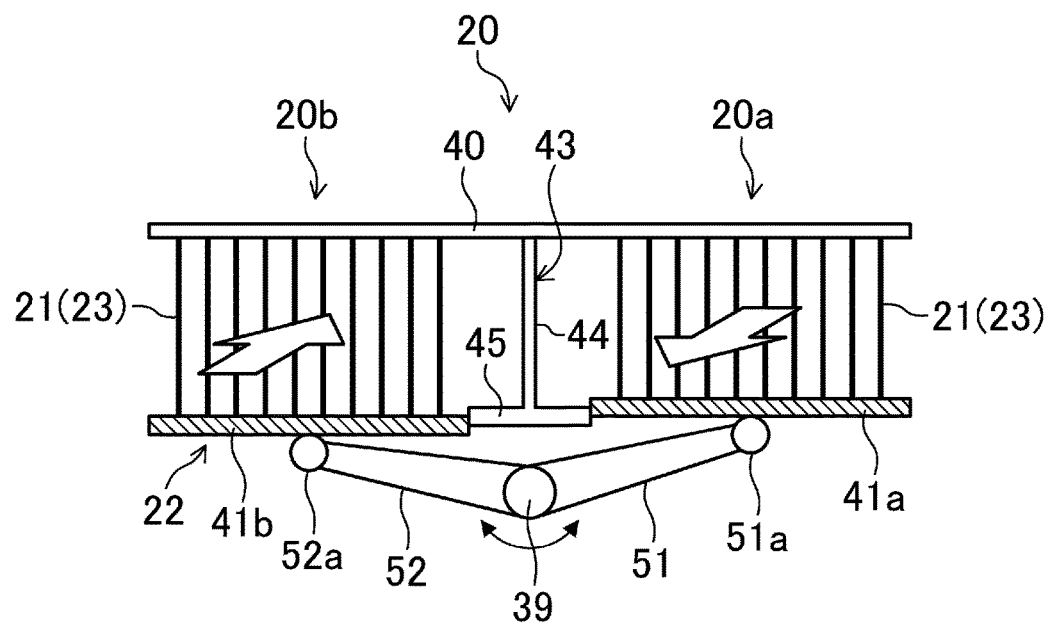
FIG. 32 is a perspective view illustrating the structure of a cooling/heating module according to a fifth variation of the fifth embodiment.

Next, a fifth variation of the fifth embodiment will be described. This fifth variation includes an actuator (22) with a different configuration from its counterpart of the first embodiment as shown in FIG. 32. Note that illustration of the switching control section (35) is omitted.

Specifically, an actuator (22) according to this fifth variation includes first and second arms (51, 52), a shaft (39) and a stepping motor (not shown).

The shaft (39) has an axis which extends in the width direction of the movable plates (41a, 41b) (i.e., the depth direction shown in FIG. 32). The shaft (39) is arranged under a partition plate (43). The first and second arms (51, 52) are mounted to the shaft (39). This shaft (39) is connected to the stepping motor and configured to be freely turned in the circumferential direction by the stepping motor.

The first and second arms (51, 52) are each formed as an elongate plate member and mounted to the shaft (39). At the tip end thereof, the first arm (51) has a first supporting portion (51a) to be brought into contact with the first movable plate (41a). At the tip end thereof, the second arm (52) has a second supporting portion (52a) to be brought into contact with the second movable plate (41b). The first arm (51) has a base end attached to the shaft (39) and a tip end extending toward the first movable plate (41a). The second arm (52) has a base end attached to the shaft (39) and a tip end extending toward the second movable plate (41b).

As shown in FIG. 32, as the shaft (39) turns counterclockwise, the first supporting portion (51a) at the tip end of the first arm (51) rises, whereas the second supporting portion (52a) at the tip end of the second arm (52) falls. In this case, since the first supporting portion (51a) of the first arm (51) pushes the first movable plate (41a) upward from under it, the weight of the first movable plate (41a) stops being applied to the thermoelastic material (21) of the first cooling/heating module (20a) and the tensile force is removed. Conversely, the weight of the second movable plate (41b) starts being applied to the thermoelastic material (21) of the second cooling/heating module (20b) and tensile force is applied thereto.

On the other hand, as shown in FIG. 32, as the shaft (39) turns clockwise, the first supporting portion (51a) of the first arm (51) falls and goes out of contact with the first movable plate (41a). Thus, the weight of the first movable plate (41a) starts being applied to the first cooling/heating module (20a). As a result, tensile force is applied to the thermoelastic material (21) of the first cooling/heating module (20a).

Optionally, in this fifth variation, the weight of each movable plate (41a, 41b) may be controlled by adjusting step by step the angle of rotation of the stepping motor. This allows for controlling the quantity of heat generated by adjusting the tensile force applied to the thermoelastic material (21).

(Sixth Variation)

Next, a sixth variation of the fifth embodiment will be described. This sixth variation includes an actuator (22) with a different configuration from its counterparts of the second and fifth variations described above.

Figure 33:
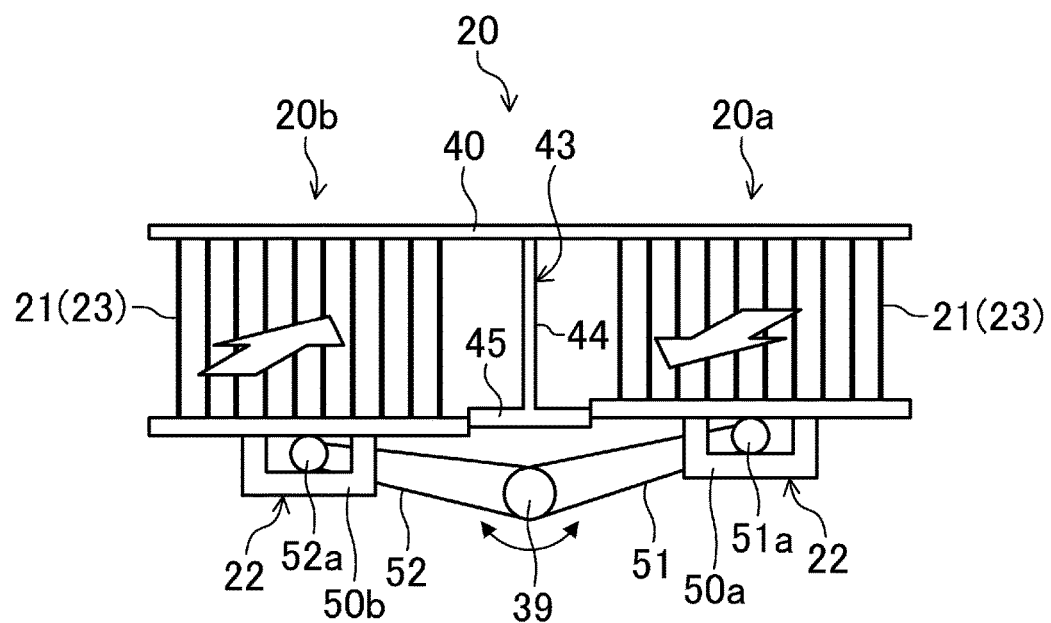
FIG. 33 is a perspective view illustrating the structure of a cooling/heating module according to a sixth variation of the fifth embodiment.

Specifically, as shown in FIG. 33, an actuator (22) according to this sixth variation includes first and second movable housings (50a, 50b) and first and second arms (51, 52) and their shaft (39) which together function as a displacement mechanism. The first arm (51) is mounted to the first movable housing (50a), while the second arm (52) is mounted to the second movable housing (50b). Thus, this actuator (22) is configured so that as the first supporting portion (51a) of the first arm (51) rises, the first movable housing (50a) rises and that as the second supporting portion (52a) of the second arm (52) falls, the second movable housing (50b) falls. In the other respects, this variation has the same configuration, functions and effects as the second variation described above.

In this sixth variation, the repulsive force when the tensile force is removed from one thermoelastic material (21) is recovered as the power to turn the shaft (39). More particularly, in this sixth variation, when the first arm (51) or the second arm (52) is located at their lower end, the supply of the power to the motor driving the shaft (39) is temporarily stopped to set the shaft (39) free temporarily. For example, as shown in FIG. 33, when the state where tensile force is applied to the thermoelastic material (21) of the second cooling/heating module (20b) changes into a state where the shaft (39) is set free, the tensile force is removed from the thermoelastic material (21) of the second cooling/heating module (20b), and the repulsive force produced then turns the shaft (39). In the same way, when the state where tensile force is applied to the thermoelastic material (21) of the first cooling/heating module (20a) changes into a state where the shaft (39) is set free, the tensile force is removed from the thermoelastic material (21) of the first cooling/heating module (20b), and the repulsive force produced then turns the shaft (39). Thus, this sixth variation allows for saving the energy to be dissipated by the air conditioner.

(Seventh Variation)

Next, a seventh variation of the fifth embodiment will be described. This seventh variation includes an actuator (22) and switching control section (35) each having a different configuration from their counterpart of the fifth embodiment.

Figure 34:
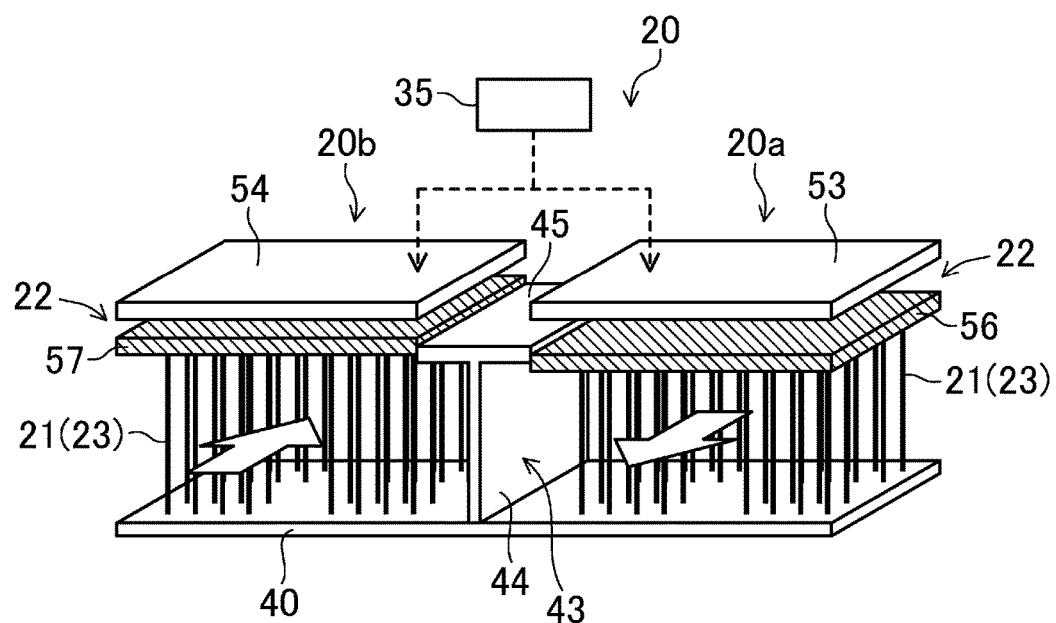
FIG. 34 is a perspective view illustrating the structure of a cooling/heating module according to a seventh variation of the fifth embodiment.

Specifically, as shown in FIG. 34, an actuator (22) according to this seventh variation includes a fixed plate (40), first and second movable plates (56, 57) and first and second electromagnets (53, 54).

The fixed plate (40) is arranged under the first cooling/heating module (20a). The first and second movable plates (56, 57) are arranged over the first and second cooling/heating modules (20a, 20b), respectively. The fixed plate (40) and the first movable plate (56) are arranged to face each other. The fixed plate (40) and the second movable plate (57) are also arranged to face each other. The first and second movable plates (56, 57) are each made of a magnetic metal such as a magnet or iron. The first electromagnet (53) is arranged near the first movable plate (56) to face the first movable plate (56), and the second electromagnet (54) is arranged near the second movable plate (57) to face the second movable plate (57). The first and second electromagnets (53 and 54) are both connected to the switching control section (35), which performs a switching control on their electrically conductive state.

The switching control section (35) controls the selective supply of electric power to the first and second electromagnets (53, 54). Specifically, if tensile force is going to be applied to the first cooling/heating module (20a), the polarity of the first electromagnet (53) is set to be inverse of that of the first movable plate (56) that faces the first electromagnet (53), thereby applying tensile force to the thermoelastic material (21) of the first cooling/heating module (20a). In this case, the supply of the electric power to the second electromagnet (54) is stopped to remove tensile force from the thermoelastic material (21) of the second cooling/heating module (20b).

On the other hand, if tensile force is going to be applied to the second cooling/heating module (20b), the polarity of the second electromagnet (54) is set to be inverse of that of the second movable plate (57) that faces the second electromagnet (54), thereby applying tensile force to the thermoelastic material (21) of the second cooling/heating module (20b). In this case, the supply of the electric power to the first electromagnet (54) is stopped to remove tensile force from the thermoelastic material (21) of the first cooling/heating module (20a).

(Eighth Variation)

Next, an eighth variation of the fifth embodiment will be described. This eighth variation includes an actuator (22) with a different configuration from its counterpart of the seventh variation of the fifth embodiment described above. The following description of the eighth variation will be focused on only differences from the seventh variation described above.

Figure 35:
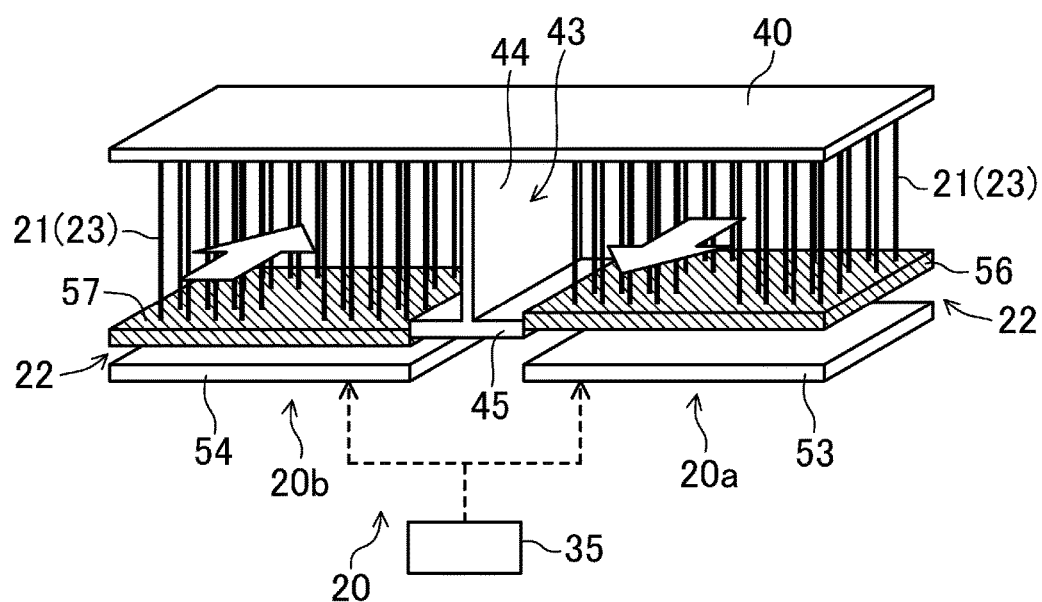
FIG. 35 is a perspective view illustrating the structure of a cooling/heating module according to an eighth variation of the fifth embodiment.

Specifically, in an actuator (22) according to this eighth variation, the fixed plate (40) is arranged over the cooling/heating module (20) as shown in FIG. 35. First and second movable plates (56, 57) are arranged under the cooling/heating module (20) so as to face the fixed plate (40). First and second electromagnets (53, 54) are arranged to face these first and second movable plates (56, 57), respectively.

The first and second movable plates (56, 57) are each made of a magnetic metal such as magnet or iron and each have a predetermined weight.

If tensile force is going to be applied to the first cooling/heating module (20a), the supply of the electric power to the first electromagnet (53) is stopped, thereby applying tensile force to the thermoelastic material (21) of the first cooling/heating module (20a) by utilizing the weight of the first movable plate (56). In this case, the polarity of the second electromagnet (54) is set to be the same as the magnetic polarity of the second movable plate (57), thereby removing tensile force from the thermoelastic material (21) of the second cooling/heating module (20b).

On the other hand, if tensile force is going to be applied to the second cooling/heating module (20b), the supply of the electric power to the second electromagnet (54) is stopped, thereby applying tensile force to the thermoelastic material (21) of the second cooling/heating module (20b) by utilizing the weight of the second movable plate (57). In this case, the polarity of the first electromagnet (53) is set to be the same as the magnetic polarity of the first movable plate (56), thereby removing tensile force from the thermoelastic material (21) of the first cooling/heating module (20a).

In this eighth variation, the first and second movable plates (56, 57) are each supposed to have a predetermined weight. However, the first and second movable plates (56, 57) may also be made of a magnetic metal such as magnet or iron and may be configured as relatively lightweight members.

In that case, if tensile force is going to be applied to the first cooling/heating module (20a), the polarity of the first electromagnet (53) is set to be inverse of that of the first movable plate (56), thereby applying tensile force to the thermoelastic material (21) of the first cooling/heating module (20a). In this case, by stopping supplying electric power to the second electromagnet (54), tensile force is removed from the thermoelastic material (21) of the second cooling/heating module (20b).

On the other hand, if tensile force is going to be applied to the second cooling/heating module (20b), the polarity of the second electromagnet (54) is set to be inverse of that of the second movable plate (57), thereby applying tensile force to the thermoelastic material (21) of the second cooling/heating module (20b). In this case, by stopping supplying electric power to the first electromagnet (53), tensile force is removed from the thermoelastic material (21) of the first cooling/heating module (20a).

(Ninth Variation)

Next, a ninth variation of the fifth embodiment will be described. This ninth variation includes an actuator (22) with a different configuration from its counterpart of the seventh variation of the fifth embodiment described above. The following description of the ninth variation will be focused on only differences from the seventh variation described above.

Figure 36:
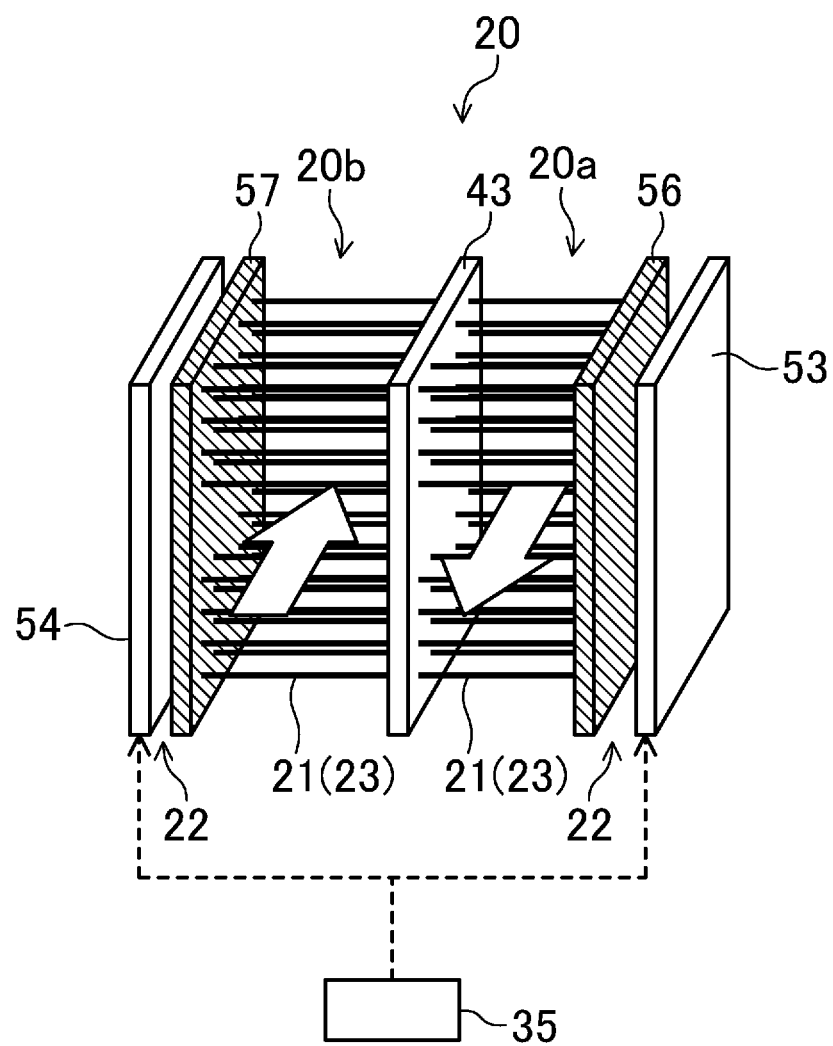
FIG. 36 is a perspective view illustrating the structure of a cooling/heating module according to a ninth variation of the fifth embodiment.

Specifically, as shown in FIG. 36, an actuator (22) according to this ninth variation includes a thermoelastic material (21), first and second movable plates (56, 57), first and second electromagnets (53, 54) and a partition plate (43).

Each of the first and second movable plates (56, 57) is configured as a substantially rectangular thin plate. The first movable plate (56) is arranged vertically close to the right end to form part of the first cooling/heating module (20a), while the second movable plate (57) is arranged vertically close to the left end to form part of the second cooling/heating module (20b). One end of the thermoelastic material (21) of the first cooling/heating module (20a) is connected to the left end face of the first movable plate (56) and one end of the thermoelastic material (21) of the second cooling/heating module (20b) is connected to the right end face of the second movable plate (57).

The partition plate (43) is arranged between the first and second cooling/heating modules (20a, 20b) so as to face the first and second movable plates (56, 57). The respective other ends of the thermoelastic materials (21) of the first and second cooling/heating modules (20a, 20b) are connected to the partition plate (43).

«Sixth Embodiment of This Invention»

A sixth embodiment of the present invention will now be described. The sixth embodiment illustrated in FIGS. 37 and 38 relates to a specific configuration for a cooling/heating module (20). A cooling/heating module (20) according to this sixth embodiment includes a belt conveyor system (65), which is a drive member to convey a plurality of fins (70) made of a thermoelastic material (21), inside a casing (60), and is configured to selectively apply or remove tension to/from the thermoelastic material (21) in an air passage (P).

The casing (60) is configured as a rectangular box and an air passage (P) is defined inside the casing (60). The inside of the casing (60) is configured so that the air flows from the front toward the depth in FIG. 37. The inside of the casing (60) is partitioned into upper and lower chambers by an up-down partition plate (61), thereby defining an upper air passage (62) and a lower air passage (63) there. The up-down partition plate (61) also has an opening to mount the belt conveyor system (65).

The belt conveyor system (65) includes a guide rail (69), a belt (67) and two wheels (66, 66).

The wheels (66, 66) are rotating bodies formed in a generally cylindrical shape, and are configured to convey the belt (67). Two wheels (66, 66) are arranged side by side inside the casing (60), and are configured to spin counterclockwise.

The belt (67) is formed as a sheet member and is comprised of an outer peripheral belt (67a) and an inner peripheral belt (67b).

The inner peripheral belt (67b) is put on the two wheels (66, 66) so as to run inside. That is to say, by making the pair of wheels (66, 66) spin counterclockwise, the inner peripheral belt (67b) is conveyed leftward when passing through the upper air passage (62) inside the casing (60), but is conveyed rightward when passing through the lower air passage (63). The inner peripheral belt (67b) has projecting portions (68), which project outward from the portion with the thermoelastic material (21), at both ends in the width direction. These projecting portions (68) will slide on an inner peripheral rail (69b) to be described later.

The outer peripheral belt (67a) is attached to the inner peripheral belt (67b) with the thermoelastic material (21) interposed between them so as to run outside. That is to say, the outer peripheral belt (67a), thermoelastic material (21) and inner peripheral belt (67b) are conveyed altogether. The outer peripheral belt (67a) also has projecting portions (68), which project outward from the portion with the thermoelastic material (21), at both ends in the width direction. These projecting portions (68) will slide on an outer peripheral rail (69a) to be described later.

Figure 38A:
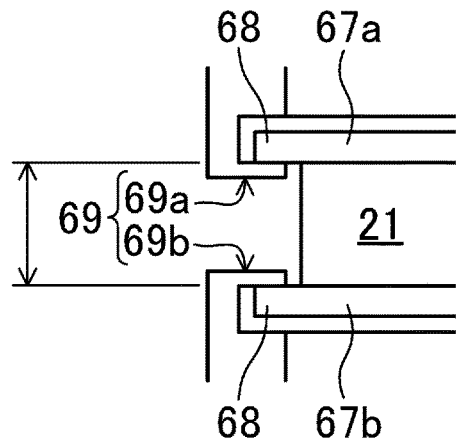
FIG. 38A illustrates generally its portion inside an upper air passage.
Figure 38B:
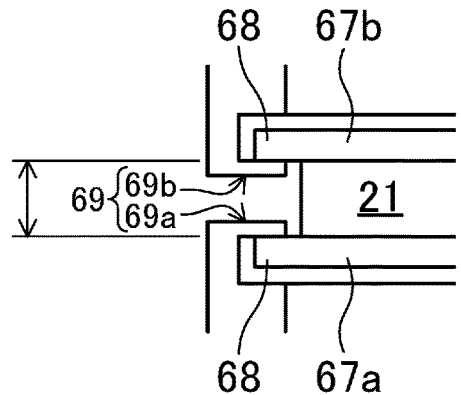
FIG. 38B illustrates generally its portion inside a lower air passage.

As shown in FIG. 38, the guide rail (69) guides the outer and inner peripheral belts (67a, 67b). The guide rail (69) is comprised of an outer peripheral rail (69a) and an inner peripheral rail (69b).

The outer peripheral rail (69a) is a rail member provided at both ends in the width direction of the outer peripheral belt (67a). The outer peripheral rail (69a) is configured to guide the outer peripheral belt (67a) by hooking a side edge portion of the outer peripheral belt (67a) onto an outwardly recessed portion thereof.

The inner peripheral rail (69b) is a rail member provided at both ends in the width direction of the inner peripheral belt (67b). The inner peripheral rail (69b) is configured to guide the inner peripheral belt (67b) by hooking a side edge portion of the inner peripheral belt (67b) onto an outwardly recessed portion thereof.

The gap between the outer and inner peripheral rails (69a, 69b) in the upper portion of the casing (60) is different from the gap between them in the lower portion of the casing (60). Specifically, the gap between the outer and inner peripheral rails (69a, 69b) is relatively wide in the upper portion of the casing (60) (i.e., in the upper air passage (62)) but is relatively narrow in the lower portion of the casing (60) (i.e., in the lower air passage (63)).

The cooling/heating module (20) further includes fins (70) made of the thermoelastic material (21).

Figure 37:
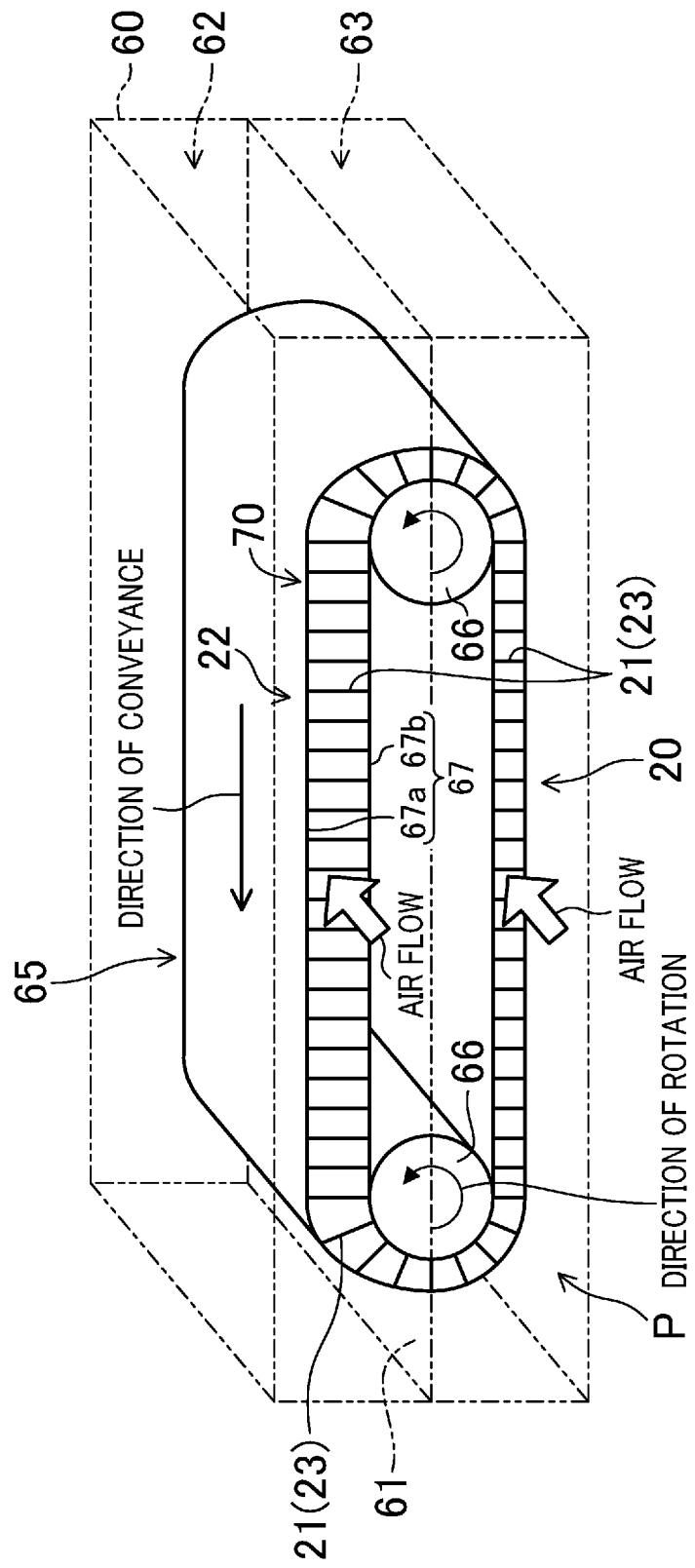
FIG. 37 generally illustrates the structure of a cooling/heating module according to a sixth embodiment.

Each of those fins (70) is formed in the shape of a plate extending in the width direction of the casing (60) (i.e., in the depth direction shown in FIG. 37). Each fin (70) has one end thereof attached to the outer peripheral belt (67a) and has the other end thereof attached to the inner peripheral belt (67b).

If the wheels (66, 66) are turned simultaneously, the outer peripheral belt (67a), inner peripheral belt (67b) and fins (70) start to be conveyed. Then, when they are conveyed through the upper air passage (62) of the casing (60), the gap between the outer and inner peripheral belts (67a, 67b) widens, thus pulling upward the thermoelastic material (21) that makes the fins (70).

Meanwhile, when the belts are conveyed through the lower air passage (63) of the casing (60), the gap between the outer and inner peripheral belts (67a, 67b) narrows, thus removing tensile force from the thermoelastic material (21) that makes the fins (70). That is to say, the upper air passage (62) is located in an air heating region inside the casing (60), while the lower air passage (63) is located in an air cooling region inside the casing (60). Thus, this configuration allows for performing heating and cooling operations continuously, and is usable advantageously in the rotor-type air conditioner (1) of the embodiment described above.

——Variations of Sixth Embodiment——

(First Variation)

Figure 39:
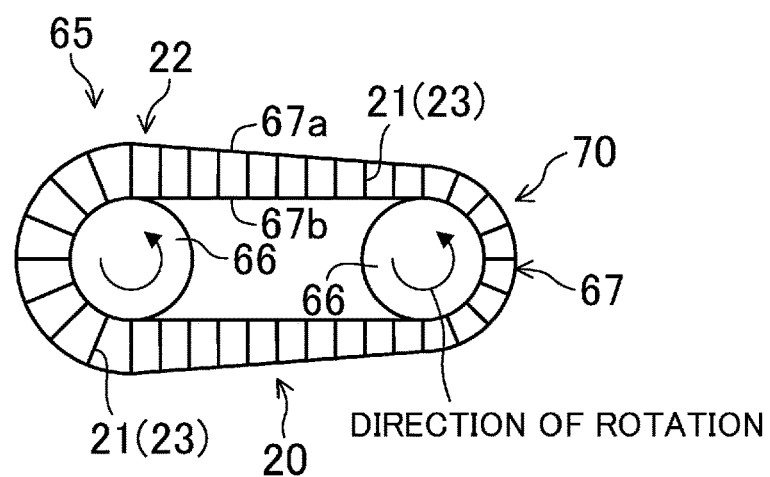
FIG. 39 generally illustrates the structure of a cooling/heating module according to a first variation of the sixth embodiment.

Next, a first variation of the sixth embodiment will be described. As shown in FIG. 39, this first variation uses a belt conveyor system (65) with a different configuration from its counterpart of the sixth embodiment described above.

Specifically, the belt conveyor system (65) of this first variation is configured so that the gap between the outer and inner peripheral rails (69a, 69b) on the right hand side of the casing (60) is different from the gap between them on the left hand side of the casing (60). In the other respects, this first variation has the same configuration, functions and effects as the sixth embodiment described above.

(Second Variation)

Figure 40:
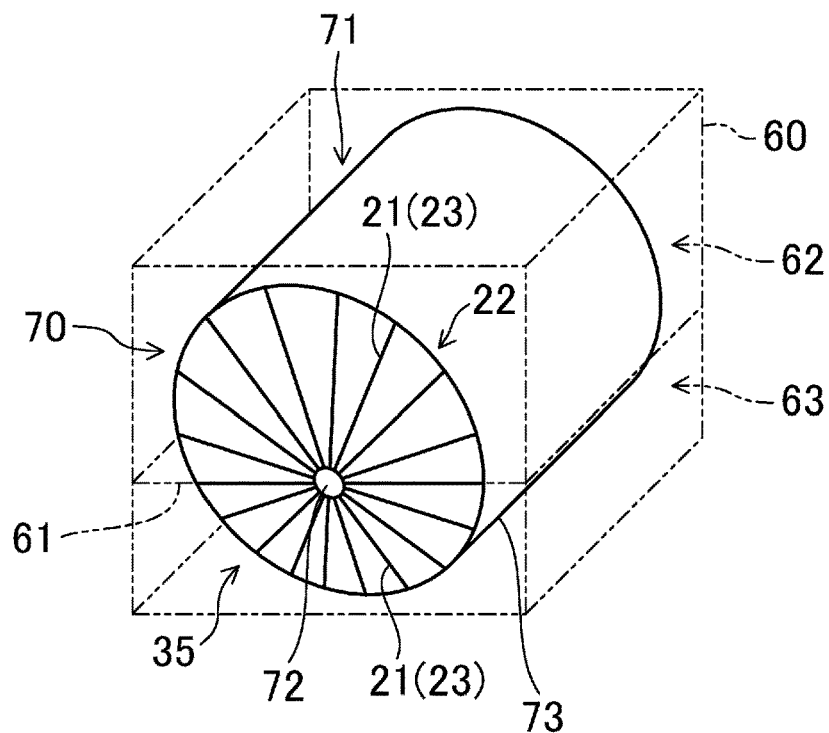
FIG. 40 generally illustrates the structure of a cooling/heating module according to a second variation of the sixth embodiment.

Next, a second variation of the sixth embodiment will be described. As shown in FIG. 40, this second variation uses a drive member with a different configuration from its counterpart of the sixth embodiment described above.

Specifically, in this second variation, a rotor device (71) is provided instead of the belt conveyor system (65). This rotor device (71) includes an outer peripheral body (73) and an eccentric shaft (72).

The eccentric shaft (72) is a shaft, of which the axial direction extends in the depth direction of the casing (60). The eccentric shaft (72) is located inside of the outer peripheral body (73) to be described later so as to be substantially level with the up-down partition plate (61) inside the casing (60). A large number of fins (70) are attached in the circumferential direction to the outer periphery of the eccentric shaft (72) so as to extend radially. Also, the eccentric shaft (72) is connected to a motor (not shown) and is configured to be turned by the motor.

The outer peripheral body (73) is a member that forms an outer peripheral portion of the rotor device (71). The outer peripheral body (73) is formed in a generally cylindrical shape and arranged to be rotatable inside the casing (60). In this case, the outer peripheral body (73) is configured to rotate at a fixed position along a guide rail (not shown). The respective outer peripheral edges of the fins (70) are attached to the inner peripheral surface of the outer peripheral body (73).

As the eccentric shaft (72) turns, the fins (70) and the outer peripheral body (73) also rotate altogether. Since the eccentric shaft (72) is eccentric with respect to the outer peripheral body (73), the thermoelastic material (21) is pulled when the material is passing through the upper air passage (62) of the casing (60) but the tensile force is removed from the thermoelastic material (21) while the material is passing through the lower air passage (63). That is to say, the upper air passage (62) of the casing (60) is defined in a region where the air is heated, and the lower air passage (63) of the casing (60) is defined in a region where the air is cooled. In the other respects, this variation has the same configuration, functions and effects as the sixth embodiment described above.

(Third Variation)

Figure 41:
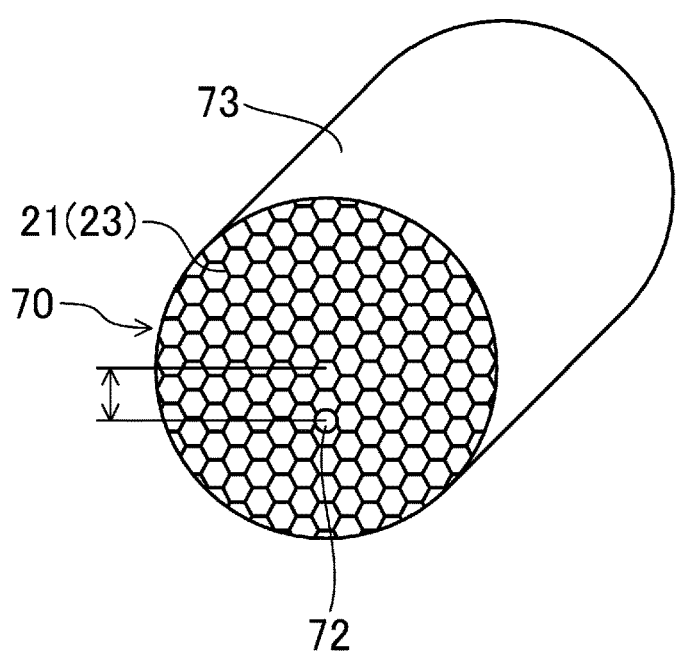
FIG. 41 generally illustrates the structure of a cooling/heating module according to a third variation of the sixth embodiment.

Next, a third variation of the sixth embodiment will be described. As shown in FIG. 41, this third variation uses a rotor device (71) with a different configuration from its counterpart of the third variation described above.

Specifically, the rotor device (71) of this third variation includes fins (70) with a honeycomb structure. In the other respects, this third variation has the same configuration, functions and effects as the second variation described above.

(Fourth Variation)

Figure 42:
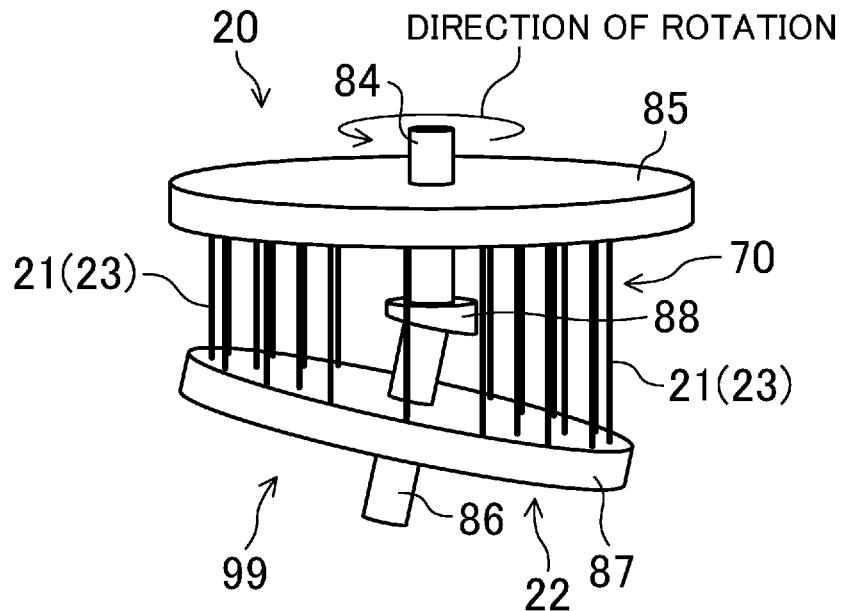
FIG. 42 is a perspective view illustrating the structure of a cooling/heating module according to a fourth variation of the sixth embodiment.
Figure 43:
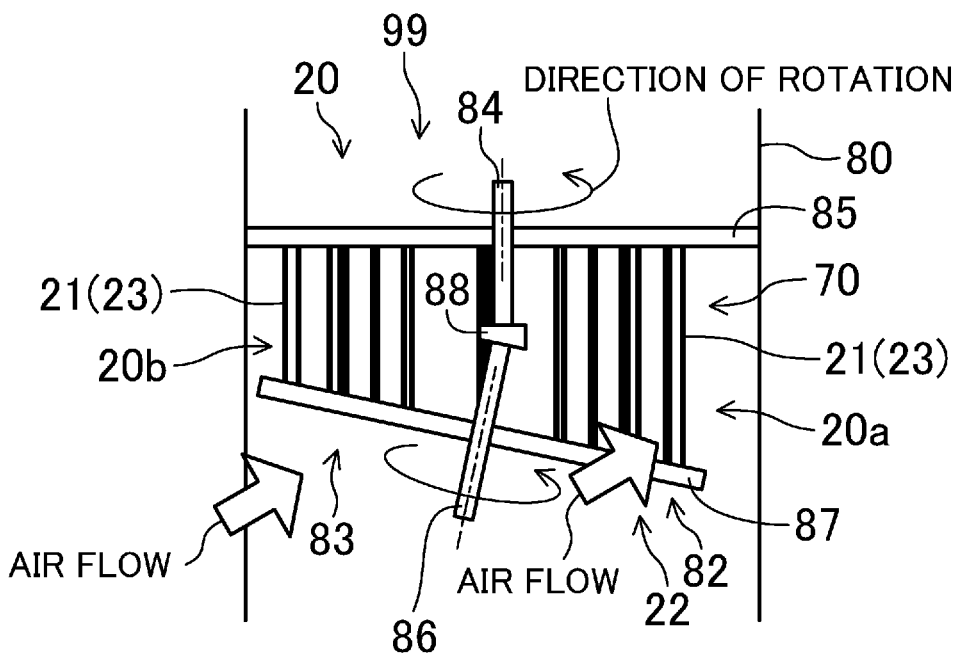
FIG. 43 is a cross-sectional view generally illustrating the structure of the cooling/heating module according to the fourth variation of the sixth embodiment.
Figure 44:
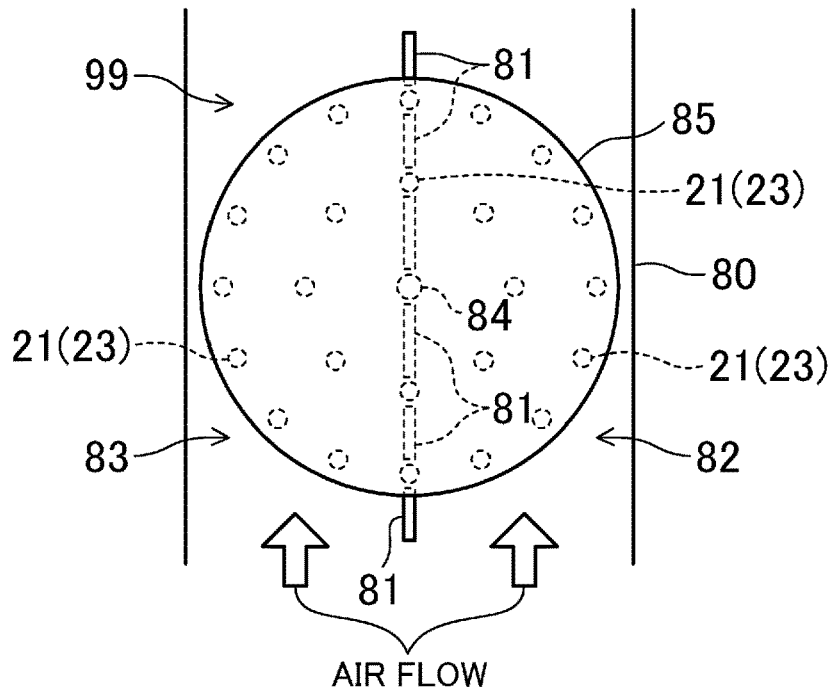
FIG. 44 is a plan view illustrating the structure of the cooling/heating module according to the fourth variation of the sixth embodiment.

Next, a fourth variation of the sixth embodiment will be described. As shown in FIGS. 42 to 44, this fourth variation uses a drive member with a different configuration from its counterpart of the sixth embodiment described above.

Specifically, in this fourth variation, a rotating device (99) is provided instead of the belt conveyor system (65).

According to this fourth variation, the inner space of the casing (60) is split by a partition plate (81) into a right portion and a left portion, which are defined in first and second air passages (82, 83), respectively. The rotating device (99) is provided inside the casing (60).

The rotating device (99) includes a shaft (84), a first rotating plate (85) mounted to the shaft (84), a connecting portion (88) attached to one end of the shaft (84), a tilted pivot (86) attached to the shaft (84) via the connecting portion (88), and a second rotating plate (87) mounted to the tilted pivot (86). Also, fins (70) in the shape of wires, which are made of the thermoelastic material (21), are attached between the first and second rotating plates (85, 87). Slits have been cut through the partition plate (81) so as to pass the fins (70). In this fourth variation, the rotating device (99) is configured so that the air flows sideward (i.e., in the depth direction between the first and second rotating plates (85) and (87) in FIG. 43).

The tilted pivot (86) is attached to the shaft (84) so as to define a predetermined tilt angle with respect to the shaft (84). Meanwhile, the shaft (84) is connected to a motor (not shown) and configured to be rotatable. That is why as the shaft (84) turns, the tilted pivot (86) also rotates synchronously with the shaft (84). Thus, the distance between the first and second rotating plates (85, 87) increases according to the angle of tilt defined by the second rotating plate (87) with respect to the first rotating plate (85). Therefore, when the fins (70) pass through the first air passage (82), the distance between the first and second rotating plates (85, 87) increases so much that tensile force is applied to the thermoelastic material (21) that makes the fins (70). On the other hand, when the fins (70) pass through the second air passage (83), the distance between the first and second rotating plates (85, 87) decreases so much that tensile force is removed from the thermoelastic material (21) that makes the fins (70).

(Fifth Variation)

Figure 45:
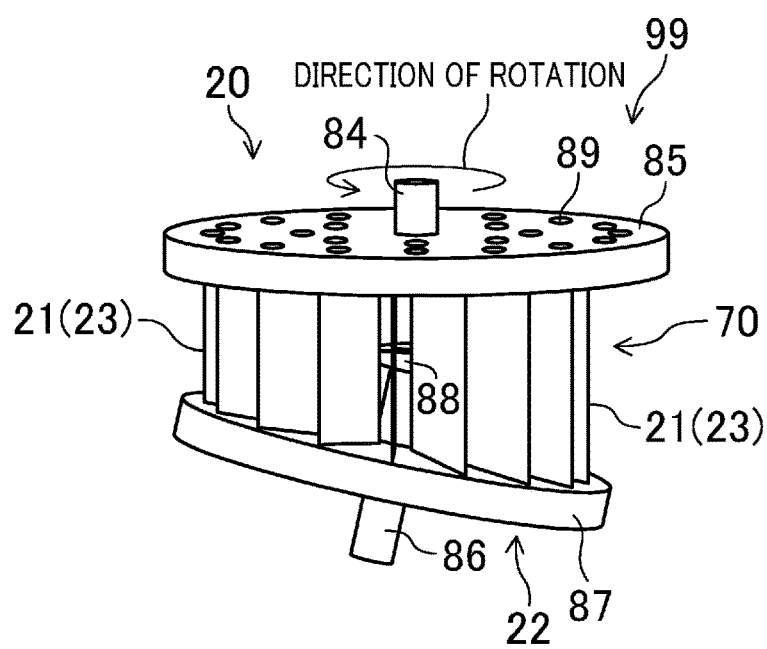
FIG. 45 is a perspective view illustrating the structure of a cooling/heating module according to a fifth variation of the sixth embodiment.
Figure 46:
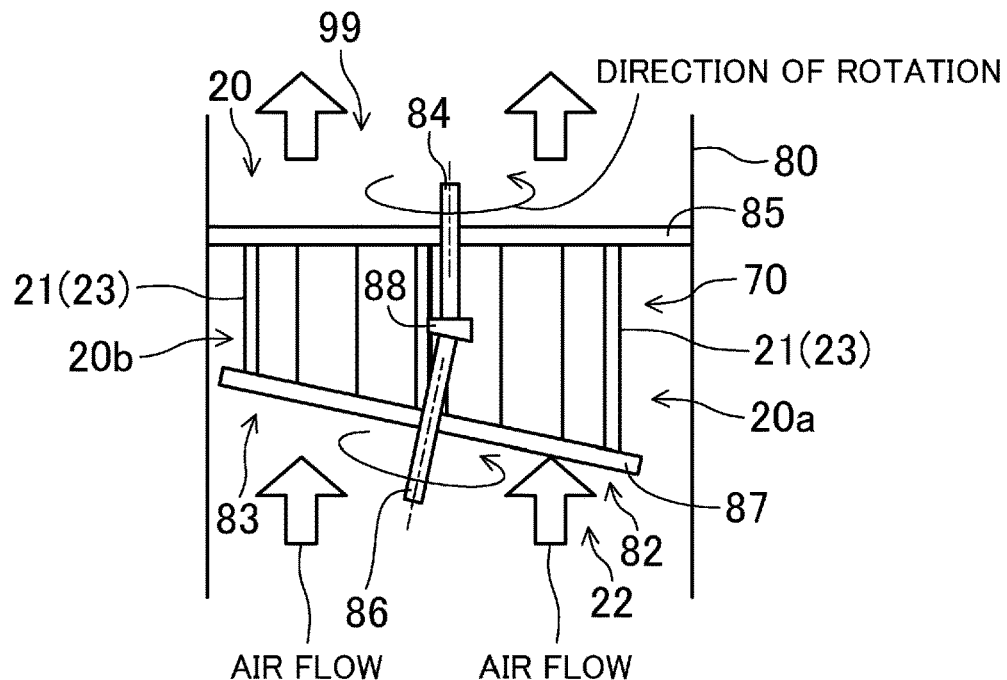
FIG. 46 is a cross-sectional view generally illustrating the structure of the cooling/heating module according to the fifth variation of the sixth embodiment.
Figure 47:
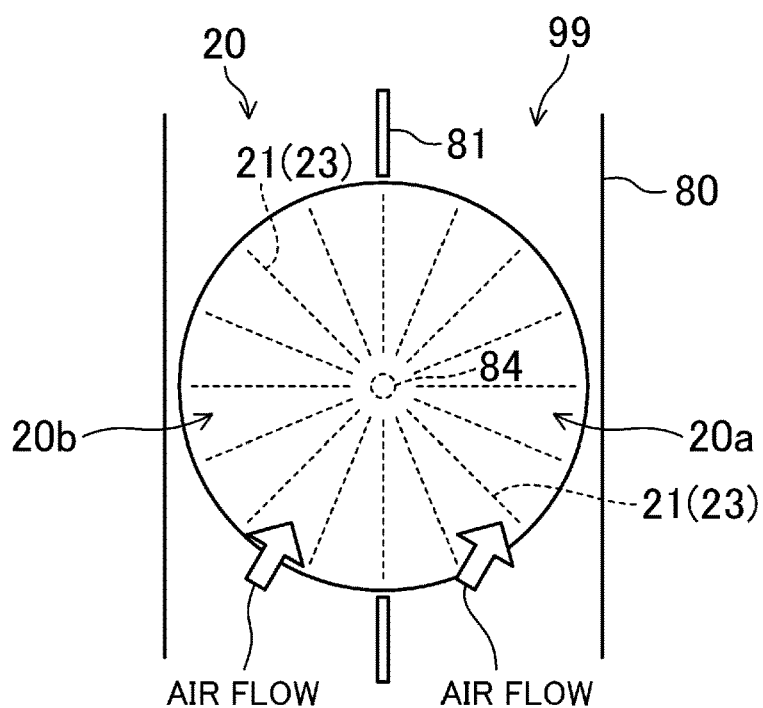
FIG. 47 is a plan view illustrating the structure of the cooling/heating module according to the fifth variation of the sixth embodiment.

Next, a fifth variation of the sixth embodiment will be described. As shown in FIGS. 45 to 47, this variation includes a rotating device (99) with a different configuration from its counterpart of the fourth variation described above.

Specifically, in a rotating device (99) according to this fifth variation, through holes (89) running in the thickness direction are cut through the first and second rotating plates (85, 87). Further, between the first and second rotating plates (85, 87), arranged are fins (70) which extend radially from the shaft (84) and the tilted pivot (86) and which are made of a thermoelastic material (21) in the shape of a sheet.

That is to say, according to this fifth variation, the rotating device (99) is configured so that the air flows vertically (i.e., vertically through the gap between the first and second rotating plates (85, 87) in FIG. 46).

Note that the inner space of the casing (60) is split into right and left portions by arranging the fins (70) at the same position as the partition plate (81).

«Seventh Embodiment of this Invention»

Figure 48:
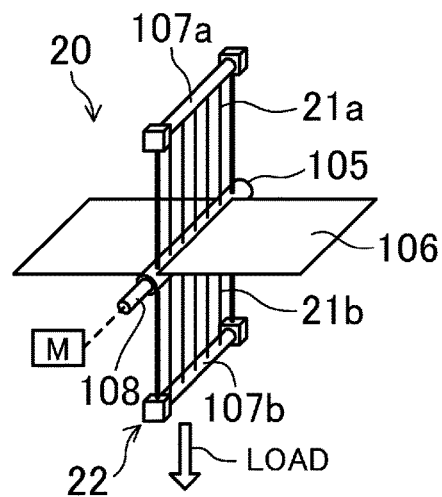
FIG. 48 generally illustrates the structure of a cooling/heating module according to a seventh embodiment.
Figure 49:
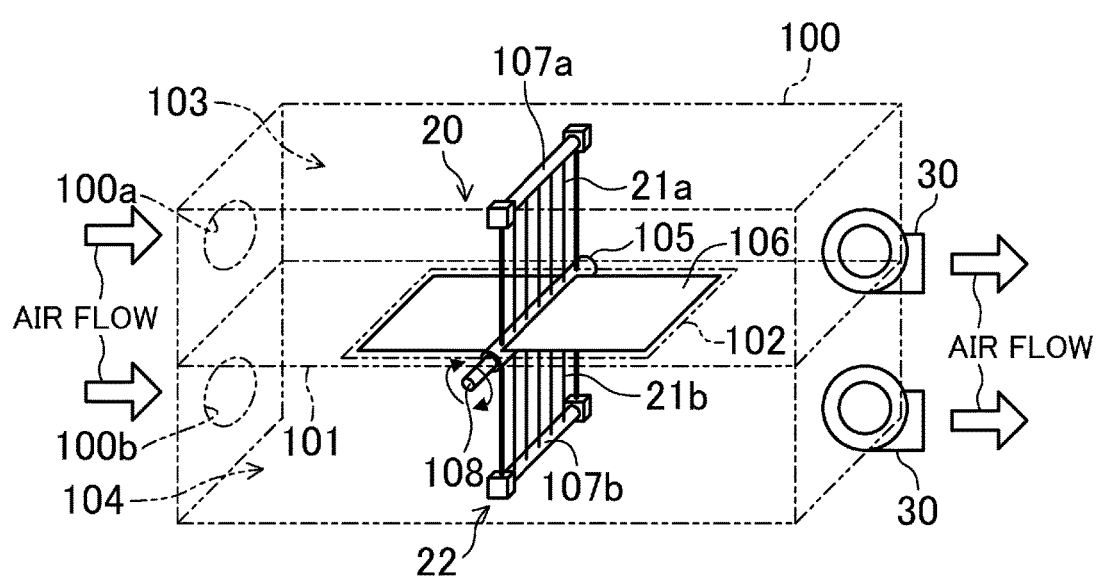
FIG. 49 generally illustrates the structure of a casing and cooling/heating module according to the seventh embodiment.

A seventh embodiment of the present invention will be described. Note that illustration of the switching control section (35) is omitted herein. The seventh embodiment illustrated in FIGS. 48 and 49 relates to a specific configuration for the cooling/heating module (20). A cooling/heating module (20) according to this seventh embodiment includes a shaft (105) provided at the base end of the thermoelastic material (21), which is configured as wires, and first and second anchor portions (107a, 107b) which are provided at the tip ends of the thermoelastic material (21). The cooling/heating module (20) is configured to selectively apply or remove tension to/from the thermoelastic material (21) inside an air passage (P) by turning the shaft (105). The cooling/heating module (20) is provided in the casing (100) in which the air passage (P) is defined.

The casing (100) is formed in a rectangular box shape and has its inner space split into an upper portion and a lower portion by an up-down partition plate (101). The upper portion of the inner space of the casing (100) is located in an upper air passage (103), and the lower portion thereof is located in a lower air passage (104). A fan (30) is provided for the outlet of the upper air passage (103). Another fan (30) is provided for the outlet of the lower air passage (104). The up-down partition plate (101) has an opening (102), in which the cooling/heating module (20) is fitted inside the casing (100).

In the longitudinal direction thereof, one side surface of the casing (100) has two air inlets (100a, 100b) in the upper and lower portions thereof, respectively, and the other side surface thereof has two air outlets corresponding to the air inlets (100a, 100b) in the upper and lower portions thereof, respectively. This casing (100) is configured so that the air is sucked into the casing (100) through the air inlets (100a, 100b) and exhausted out of the casing (100) through the air outlets.

The cooling/heating module (20) includes a shaft (105) extending in the width direction of the casing (100), a motor shaft (108) fitted into the shaft (105), a first thermoelastic material (21a) extending in one direction from the shaft (105), a first anchor portion (107a), a second thermoelastic material (21b) extending from the shaft (105) in the opposite direction from the first thermoelastic material (21a), a second anchor portion (107b), and a closing plate (106) attached to the shaft (105).

The first thermoelastic material (21a) is formed in the shape of wires. The first thermoelastic material (21a) has its base end secured to the outer periphery of the shaft (105) and has its tip ends extended upward from the shaft (105). A large number of pieces of the first thermoelastic material (21a) are arranged in the axial direction of the shaft (105). The first anchor portion (107a) is attached to the respective tip ends of the first thermoelastic material (21a). The first anchor portion (107a) is formed in an elongate cylindrical shape and arranged substantially parallel to the shaft (105).

The second thermoelastic material (21b) is also formed in the shape of wires. The second thermoelastic material (21b) has its base end secured to the outer periphery of the shaft (105) and has its tip ends extended downward from the shaft (105). A large number of pieces of the second thermoelastic material (21b) are arranged in the axial direction of the shaft (105). The second anchor portion (107b) is attached to the respective tip ends of the second thermoelastic material (21b). The second anchor portion (107b) is formed in an elongate cylindrical shape and arranged substantially parallel to the shaft (105).

That is to say, this module is configured so that as the shaft (105) is turned by a motor (not shown), each of the first and second thermoelastic materials (21a, 21b) shifts 180 degrees apiece. Specifically, when the first anchor portion (107a) faces down as a result of the rotation of the shaft (105), tensile force is applied to the first thermoelastic material (21a). On the other hand, when the second anchor portion (107b) faces down as a result of the rotation of the shaft (105), tensile force is applied to the second thermoelastic material (21b).

The closing plate (106) is provided horizontally to the shaft (105). The closing plate (106) is configured to keep the opening (102) always closed as the shaft (105) turns.

——Variations of Seventh Embodiment——

(Variation)

Figure 50:
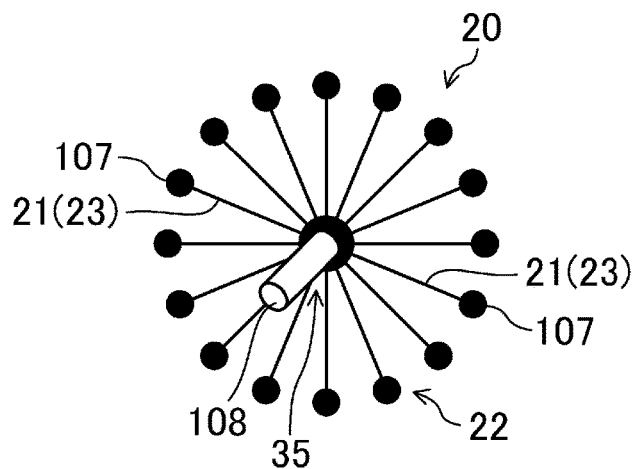
FIG. 50 generally illustrates a portion of a cooling/heating module according to a variation of the seventh embodiment.
Figure 51:
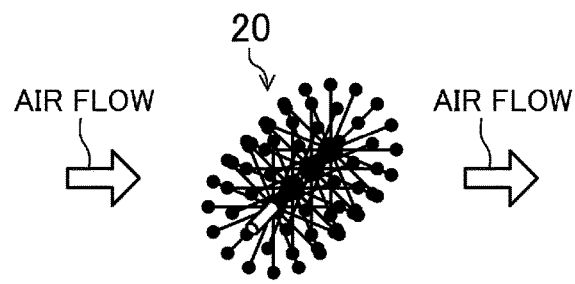
FIG. 51 generally illustrates the structure of a cooling/heating module according to a variation of the seventh embodiment.
Figure 52:
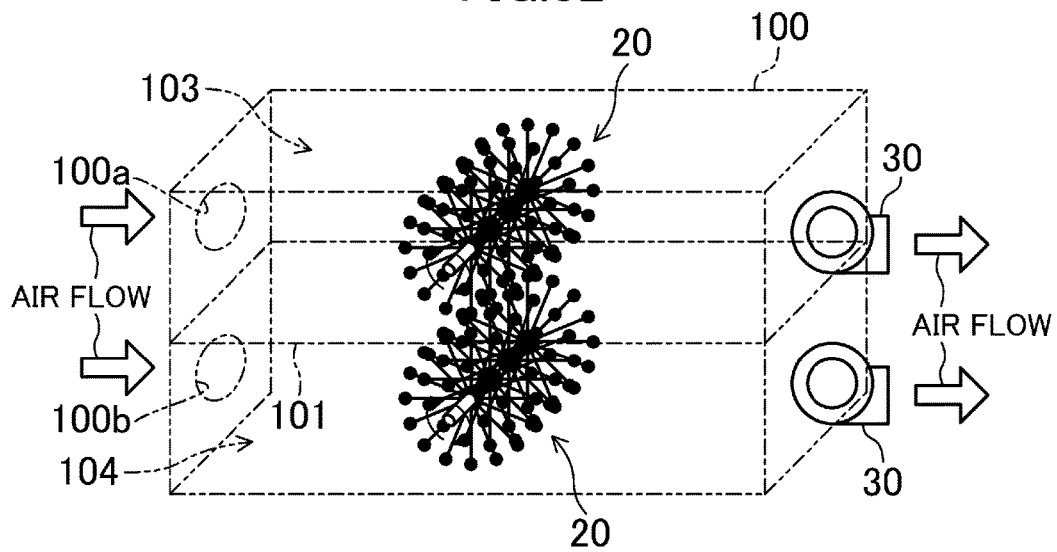
FIG. 52 generally illustrates the structure of a casing and cooling/heating module according to a variation of the seventh embodiment.

Next, a variation of the seventh embodiment will be described. As shown in FIGS. 50 to 52, this variation includes a cooling/heating module (20) with a different configuration from its counterpart of the seventh embodiment described above.

A cooling/heating module (20) according to this variation includes a shaft (105), a motor shaft fitted into the shaft (105), great many pieces of the thermoelastic material (21) extending radially from the shaft (105), and anchor portions (107) secured to the respective tip ends of those pieces of the thermoelastic material (21).

In this variation, the cooling/heating module (20) is provided for each of the upper and lower air passages (103, 104) inside the casing (100).

The thermoelastic material (21) is formed in the shape of wires. The thermoelastic material (21) has its base end secured to the outer periphery of the shaft (105) and its tip end extended radially outward from the shaft (105). Sixteen pieces of the thermoelastic material (21) are provided for each round of the shaft (105) and are arranged continuously in axial direction of the shaft (105).

That is to say, centrifugal force, produced by those anchor portions (107), is applied to the thermoelastic material (21) that rotates as the shaft (105) turns. As a result, tensile force is applied to the thermoelastic material (21). Conversely, by stopping turning the shaft (105), tensile force is removed from the thermoelastic material (21).

<Other Embodiments>

The embodiments of the present invention described above may be modified in the following manner.

Specifically, the cooling/heating module (20) of the embodiment described above may be embodied using the actuator (22) shown in FIGS. 53 to 56.

Figure 53:
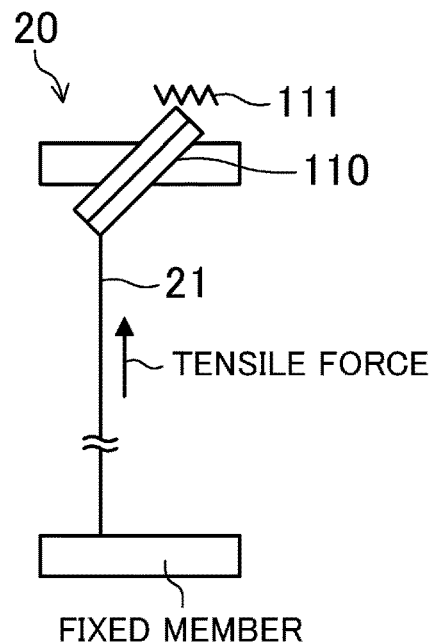
FIG. 53 illustrates a configuration for an actuator according to another embodiment.
Figure 54:
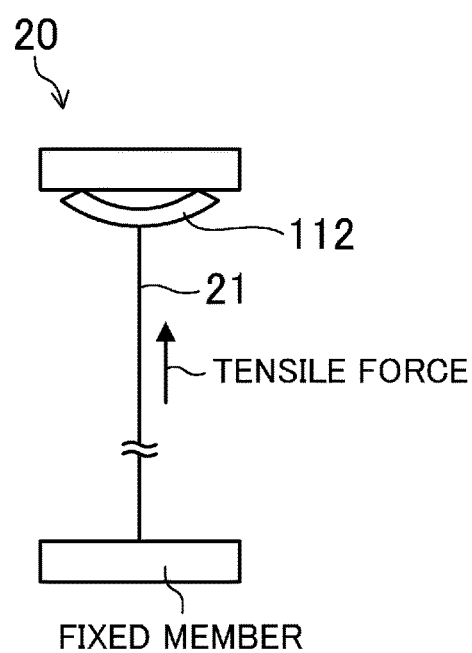
FIG. 54 illustrates a configuration for an actuator according to another embodiment.
Figure 55:
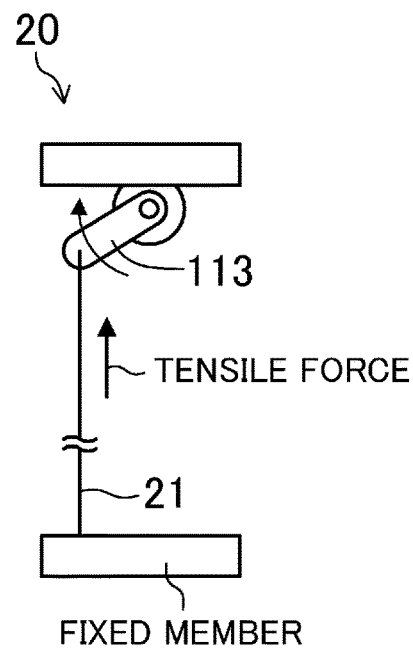
FIG. 55 illustrates a configuration for an actuator according to another embodiment.
Figure 56:
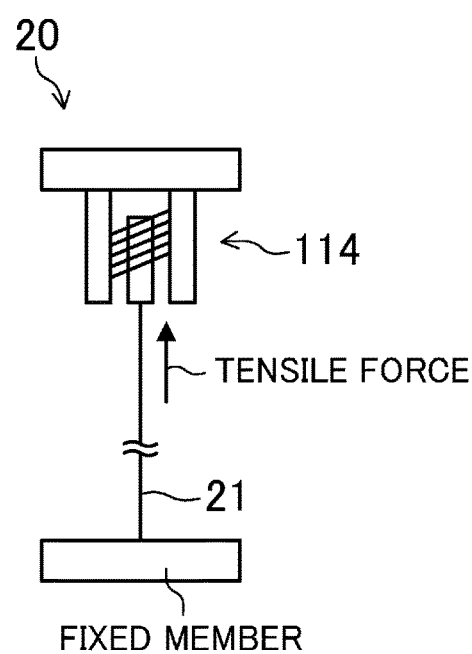
FIG. 56 illustrates a configuration for an actuator according to another embodiment.

The actuator shown in FIG. 53 is comprised of a heater (111) and a bimetal (110). The actuator shown in FIG. 54 is configured as a piezoelectric element (112). The actuator shown in FIG. 55 is implemented as a drive arm (113). The actuator shown in FIG. 56 is embodied as a solenoid (114).

Also, in the embodiments described above, the circulation method is adopted so that the room air sucked into the casing (10) is processed by the cooling/heating module (20) and supplied to the indoor space (3), while the outdoor air sucked into the casing (10) is processed by the cooling/heating module (20) and then exhausted to the outdoor space. However, a ventilation method may also be adopted so that the outdoor air sucked into the casing (10) is processed by the cooling/heating module (20) and supplied to the indoor space (3), while the room air sucked into the casing (10) is processed by the cooling/heating module (20) and then exhausted to the outdoor space.

Furthermore, the specific configuration of the cooling/heating module (20) described in the foregoing description of embodiments may be changed appropriately according to the configuration of the air conditioner (1).

Furthermore, the configuration of the air conditioner (1) may also be changed appropriately as long as the air conditioner (1) is able to perform a cooling or heating mode of operation or a dehumidifying and cooling mode of operation or a humidifying and heating mode of operation.

«Eighth Embodiment of This Invention»

An eighth embodiment is an air conditioner which includes a humidity control module (24), obtained by forming an adsorption layer (23) on the surface of the thermoelastic material (21) of a cooling/heating module (20), to control the humidity of the air using the humidity control module (24). That is to say, the air conditioner of this eighth embodiment functions as a humidity controller (150). The humidity control module (24) may adopt the actuator (22) of a cooling/heating module (20) according to any of the embodiments and their variations described above.

——Overall Configuration for Device——

FIG. 57 illustrates generally a state where a humidity controller (150) according to an eighth embodiment is installed inside a building (2) (i.e., in an indoor space (3) to be air-conditioned). FIG. 57A illustrates an operating state of its moisture-absorbing operation and FIG. 57B illustrates an operating state of its moisture-desorbing operation. The humidity controller (150) of this eighth embodiment is configured to operate as a dehumidifier.

This humidity controller (150) includes a casing (10), a humidity control module (24) housed inside the casing (10), a fan (30) which makes air flow through the humidity control module (24), and a switching control section (35) which adjusts the tensile force to be applied to the humidity control module (24). The humidity control module (24) and the switching control section (35) constitute a humidity control unit (151). Also, the casing (10) and various functional parts housed inside the casing (10) constitute an indoor unit (U).

Inside the casing (10), an air passage (P) has been formed to make the air introduced into the casing (10) pass through the humidity control module (24) and be supplied to the indoor space (3). In this embodiment, the humidity controller (150) is allowed to perform a moisture-absorbing mode of operation by introducing the air subjected to the moisture-absorbing processing by the humidity control module (24) into the indoor space (3) through the air passage (P).

——Humidity Control Module——

As can be seen from its general configuration illustrated in FIG. 2B, the humidity control module (24) includes a thermoelastic material (21) and an actuator (22) which applies tensile force to the thermoelastic material (21). Note that the tensile force applied to the thermoelastic material (21) constitutes tension according to the present invention. The surface of this humidity control module (24) is provided with an adsorption layer (23) with the ability to adsorb and desorb moisture from/into the air.

Figure 58:
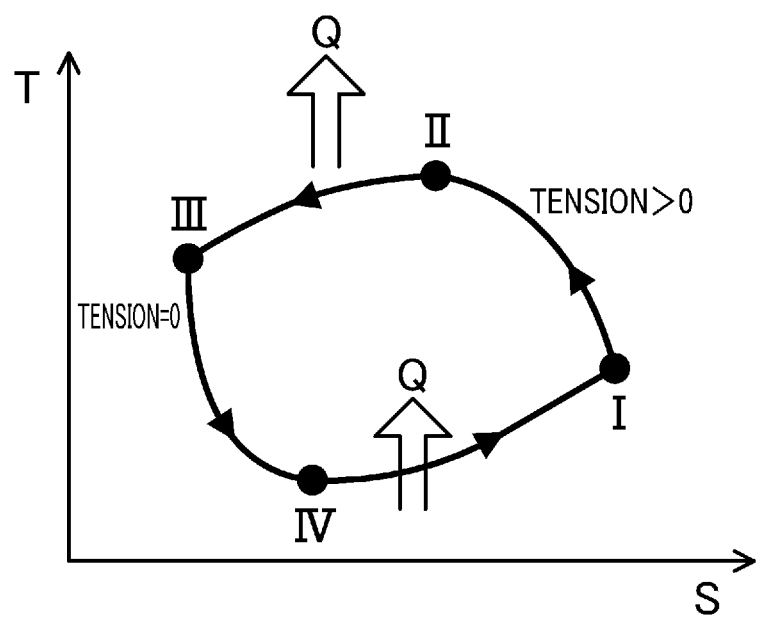
FIG. 58 is a T-S diagram of a thermoelastic material.

The thermoelastic material (21) may be made of a shape memory alloy, for example, and heats the object when tension is applied to the material and cools the object when tension is removed from the material. More particularly, as shown in FIG. 58, when tensile force is applied to the thermoelastic material (21), the thermoelastic material (21) changes from the parent phase (i.e., austenitic phase) to the martensitic phase. Thus, the thermoelastic material (21) comes to have decreased entropy and generates some heat correspondingly. As a result, the thermoelastic material (21) heats itself (i.e., the phase changes from I to II). When the thermoelastic material (21) is brought into contact with the object to be heated with tensile force continuously applied to the thermoelastic material (21), the heat propagates from the thermoelastic material (21) to the object to be heated (i.e., the phase changes from II to III). Consequently, the temperature of the thermoelastic material (21) falls. Thereafter, when the tensile force applied to the thermoelastic material (21) is removed (taken away), the thermoelastic material (21) changes from the martensitic phase to the parent phase (austenitic phase) (i.e., the phase changes from III to IV). If the thermoelastic material (21) is thermally insulated at this time, the temperature of the thermoelastic material (21) falls. When the object to be cooled is brought into contact with the thermoelastic material, of which the temperature has fallen, the heat propagates from the object to be cooled to the thermoelastic material (21) (i.e., the phase changes from IV to I).

Figure 59B:
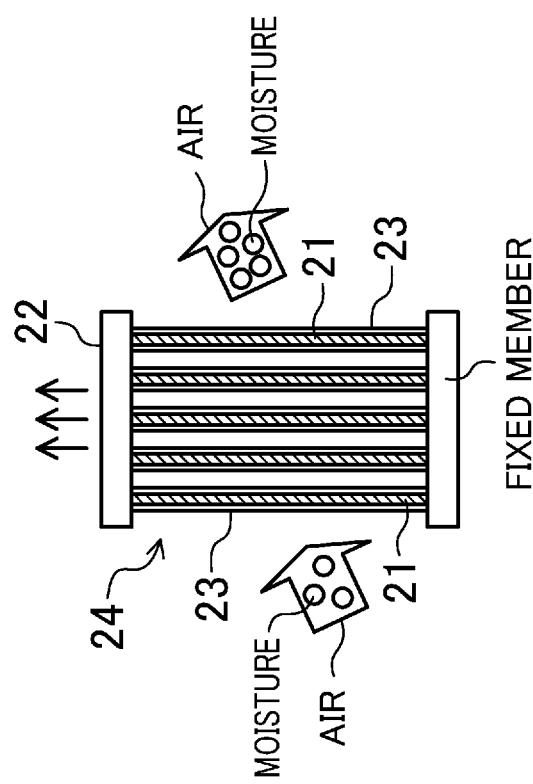
FIG. 59B illustrates a general configuration for a humidity control module to show a moisture absorbing operation state thereof.
Figure 59A:
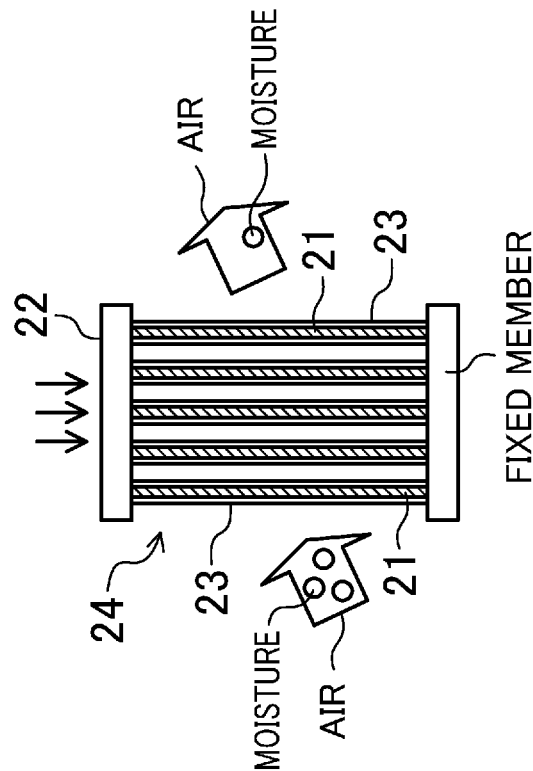
FIG. 59A illustrates a general configuration for a humidity control module to show a moisture desorbing operation state thereof.

Therefore, when tensile force is applied to the thermoelastic material (21), the thermoelastic material (21) generates heat and the adsorption layer (23) is heated as shown in FIG. 59A. When the adsorption layer (23) is heated, the moisture adsorbed in the adsorption layer (23) is released to the air (i.e., a moisture-desorbing operation is performed). As a result, the air that has passed through the humidity control module (24) has more moisture than the air yet to enter the humidity control module (24). Conversely, when the tensile force applied to the thermoelastic material (21) is removed, the thermoelastic material (21) absorbs heat and the adsorption layer (23) is cooled as shown in FIG. 59B. When the adsorption layer (23) is cooled, the moisture in the air is adsorbed into the adsorption layer (23) (i.e., a moisture-absorbing operation is performed). As a result, the air that has passed through the humidity control module (24) has less moisture than the air yet to enter the humidity control module (24). This humidity controller (150) performs the moisture-desorbing operation and the moisture-absorbing operation alternately.

Specifically, a Ti/Ni/Cu alloy may be used as an exemplary thermoelastic material (21). More particularly, such an alloy may have a composition including 40-80% of Ti, 20-60% of Ni, and 0-30% of Cu.

The actuator (22) is provided to apply tensile force to the thermoelastic material (21). The actuator (22) is connected to the switching control section (35) so that application and removal of the tensile force to/from the thermoelastic material (21) is controlled by the switching control section (35).

——Tensile Force Applying Operation——

The switching control section (35) controls the actuator (22) so that tensile force is selectively applied to, or removed from, the thermoelastic material (21). The switching control section (35) is configured to adjust the quantity of heat generated by the thermoelastic material (21) and thereby control the moisture-absorbing and moisture-desorbing ability by changing the magnitude of the tensile force applied by the actuator (22) to the thermoelastic material (21) in FIGS. 60A to 60C.

Alternatively, the switching control section (35) may also be configured to adjust the quantity of heat generated by the thermoelastic material (21) and thereby control the moisture-absorbing and moisture-desorbing ability by changing the proportion of a portion of the thermoelastic material (21), to which tensile force is applied, to the entire thermoelastic material (21) in FIGS. 61A to 61C.

Still alternatively, the switching control section (35) may also be configured to adjust the quantity of heat generated by the thermoelastic material (21) and thereby control the moisture-absorbing and moisture-desorbing ability by changing the time intervals at which the moisture-absorbing and moisture-desorbing operations are performed a number of times.

——Operation——

This humidity controller (150) performs only a dehumidifying operation. More particularly, in FIG. 57A, tensile force is removed from the humidity control module (24) that has been heated. Then, the humidity control module (24) absorbs heat from the air (i.e., the outdoor air (OA)) and the adsorption layer (23) shown in FIGS. 2B and 59 is cooled. The adsorption layer (23) has been heated, and therefore, has already desorbed moisture. That is why if the air flows from the outdoor space into the indoor space (3), moisture is adsorbed from the air as shown in FIG. 57A. Then, the air dehumidified by having had its moisture adsorbed (i.e., supply air (SA)) is supplied to the indoor space (3). Also, since the humidity control module (24) is cooled in this case, the heat generated by the adsorption layer (23) due to the adsorbed heat is reduced. Consequently, the moisture-absorbing operation is performed without causing a decline in the moisture-absorbing performance.

When the moisture-desorbing mode of operation is performed as shown in FIG. 57B, the direction of revolution of the fan (30) is switched to exhaust the room air (RA) to the outdoor space. In the meantime, tensile force is applied to the thermoelastic material (21) of the humidity control module (24). Then, the humidity control module (24) dissipates heat and the adsorption layer (23) is heated. When the adsorption layer (23) is heated, moisture in the adsorption layer (23) is released to the air flowing from the indoor space (3) to the outdoor space. As a result, during this moisture-desorbing mode of operation, the adsorption layer (23) of the humidity control module (24) is regenerated and the moisture, as well as the air (i.e., exhaust air (EA)), is discharged out of the room.

According to this embodiment, by performing the moisture-absorbing operation shown in FIG. 57A and the moisture-desorbing operation shown in FIG. 57B repeatedly a number of times, the dehumidifying mode of operation is performed intermittently.

——Advantages of Eighth Embodiment——

According to this eighth embodiment, no elastic member such as a rubber member coated with an adsorbent is adopted in the humidity control module (24). In this case, if an elastic member such as a rubber member coated with an adsorbent were adopted in the humidity control module (24), then a mechanism for making the elastic member expand or contract should be used, which would complicate the structure of the humidity controller (150) excessively and increase the overall size of the device (1) overly. In contrast, since no such elastic member is used in this embodiment for the humidity control module (24), the humidity controller (150) is prevented from having its size increased or its structure complicated too much.

In addition, the thermoelastic material (21) as a constituent material for the humidity control module (24) is not an elastic member which expands and contracts significantly. This thus allows for avoiding an inconvenience such as detachment of the adsorbent from the humidity control module (24).

Furthermore, this eighth embodiment allows for adjusting the quantity of heat generated by the thermoelastic material (21) and eventually controlling the moisture-absorbing and moisture-desorbing ability, thus enabling the device to operate adaptively to the given humidity control load.

——Variations of Eighth Embodiment——

(First Variation)

The first variation shown in FIG. 62 has a configuration in which two indoor units (U1, U2) are installed in the indoor space (3) to be air-conditioned. In the example illustrated in FIG. 62, a first indoor unit (U1) is arranged at one of two opposing wall surfaces of the room (i.e., on the wall on the right hand side on the paper), and a second indoor unit (U2) is arranged at the other wall surface of the room (i.e., on the wall on the left hand side on the paper). Each of these indoor units (U1, U2) has the same configuration as the indoor unit (U) of the humidity controller (150) shown in FIG. 57. Thus, the configuration of those indoor units (U1, U2) will not be described all over again to avoid redundancies. Note that the indoor units (U1, U2) have their own air passage (P1, P2).

Figure 62A:
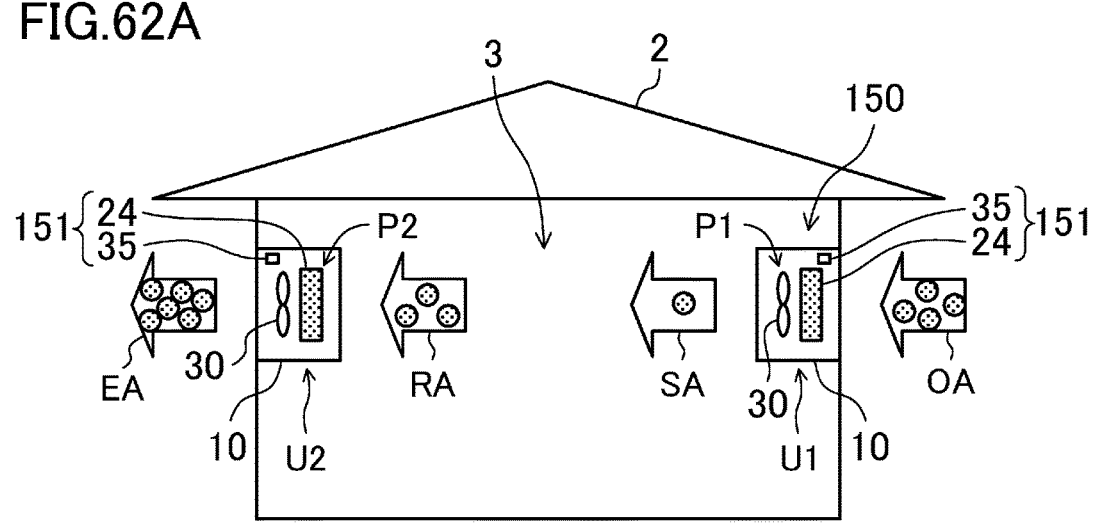
FIG. 62A illustrates a first operating state and FIG. 62B illustrates a second operating state.

FIG. 62A illustrates a state where the first indoor unit (U1) is performing a moisture-absorbing operation and the second indoor unit (U2) is performing a moisture-desorbing operation. In the first indoor unit (U1), the tensile force applied to the thermoelastic material (21) of the humidity control module (24) is removed. Thus, the humidity control module (24) of the first indoor unit (U1) absorbs heat and the outdoor air (OA) flowing from the outdoor space into the indoor space (3) has its moisture adsorbed. As a result, the air dehumidified by having had its moisture adsorbed is supplied as supply air (SA) to the indoor space (3).

On the other hand, in the second indoor unit (U2), the fan (30) revolves in a direction in which the room air (RA) is exhausted to the outdoor space, while tensile force is applied at the same time to the thermoelastic material (21) of the humidity control module (24). As a result, moisture in the adsorption layer (23) is desorbed to the air, which is then released as exhaust air (EA) to the outdoor space, thus regenerating the adsorption layer (23) of the humidity control module (24).

Figure 62B:
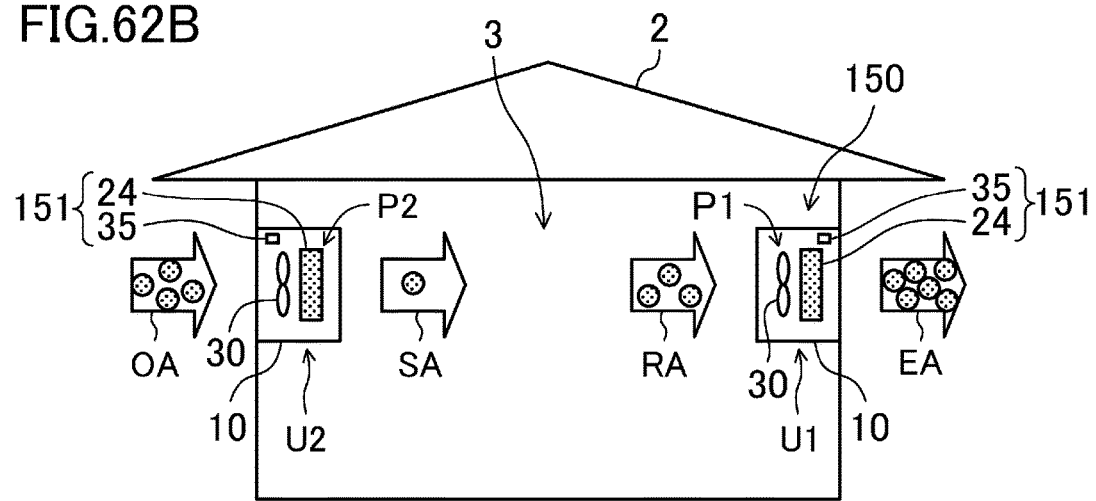

FIG. 62B illustrates a state where the second indoor unit (U2) is performing a moisture-absorbing operation and the first indoor unit (U1) is performing a moisture-desorbing operation. In the second indoor unit (U2), the tensile force applied to the thermoelastic material (21) of the humidity control module (24) is removed. Thus, the humidity control module (24) of the second indoor unit (U1) absorbs heat and the outdoor air (OA) flowing from the outdoor space into the indoor space (3) has its moisture adsorbed. As a result, the air dehumidified by having had its moisture adsorbed is supplied as supply air (SA) to the indoor space (3).

On the other hand, in the first indoor unit (U1), the fan (30) revolves in a direction in which the room air (RA) is exhausted to the outdoor space, while tensile force is applied at the same time to the thermoelastic material (21) of the humidity control module (24). As a result, moisture in the adsorption layer (23) is desorbed to the air, which is released as exhaust air (EA) to the outdoor space, thus regenerating the adsorption layer (23) of the humidity control module (24).

As can be seen, according to the first variation of the eighth embodiment, while either one of the two indoor units (U1, U2) is dehumidifying air and supplying that dehumidified air to the indoor space (3), the other indoor unit (U2, U1) switches from the mode of operation of regenerating the adsorption layer (23) as shown in FIG. 62A to the mode of operation shown in FIG. 62B, and vice versa, thus performing the dehumidifying mode of operation continuously.

(Second Variation)

In the second variation shown in FIG. 63, two indoor units (U1, U2) are also installed in the indoor space (3) to be air-conditioned as in the device (150) shown in FIG. 62. In this variation, however, both of the first and second indoor units (U1, U2) are arranged on the same wall surface on the right hand side of the paper, unlike the first variation shown in FIG. 62. Each of the indoor units (U1, U2) has the same configuration as its counterpart of the humidity controller (150) shown in FIGS. 57 and 62.

FIG. 63A illustrates a state where the first indoor unit (U1) is performing a moisture-absorbing operation and the second indoor unit (U2) is performing a moisture-desorbing operation. In the first indoor unit (U1), the tensile force applied to the thermoelastic material (21) of the humidity control module (24) is removed. Thus, the humidity control module (24) of the first indoor unit (U1) absorbs heat and the outdoor air (OA) flowing from the outdoor space into the indoor space (3) has its moisture adsorbed. As a result, the air dehumidified by having had its moisture adsorbed is supplied as supply air (SA) to the indoor space (3).

On the other hand, in the second indoor unit (U2), the fan (30) revolves in a direction in which the room air (RA) is exhausted to the outdoor space, while tensile force is applied at the same time to the thermoelastic material (21) of the humidity control module (24). As a result, moisture in the adsorption layer (23) is desorbed to the air, which is then released as exhaust air (EA) to the outdoor space, thus regenerating the adsorption layer (23) of the humidity control module (24).

FIG. 63B illustrates a state where the second indoor unit (U2) is performing a moisture-absorbing operation and the first indoor unit (U1) is performing a moisture-desorbing operation. In the second indoor unit (U2), the tensile force applied to the thermoelastic material (21) of the humidity control module (24) is removed. Thus, the humidity control module (24) of the second indoor unit (U1) absorbs heat and the outdoor air (OA) flowing from the outdoor space into the indoor space (3) has its moisture adsorbed. As a result, the air dehumidified by having had its moisture adsorbed is supplied as supply air (SA) to the indoor space (3).

On the other hand, in the first indoor unit (U1), the fan (30) revolves in a direction in which the room air (RA) is exhausted to the outdoor space, while tensile force is applied at the same time to the thermoelastic material (21) of the humidity control module (24). As a result, moisture in the adsorption layer (23) is desorbed to the air, which is then released as exhaust air (EA) to the outdoor space, thus regenerating the adsorption layer (23) of the humidity control module (24).

As can be seen, according to the second variation of the eighth embodiment, while either one of the two indoor units (U1, U2) is dehumidifying air and supplying that dehumidified air to the indoor space (3), the other indoor unit (U2, U1) switches from the mode of operation of regenerating the adsorption layer (23) as shown in FIG. 63A to the mode of operation shown in FIG. 63B, and vice versa, thus performing a dehumidifying mode of operation continuously.

(Third Variation)

Figure 64:
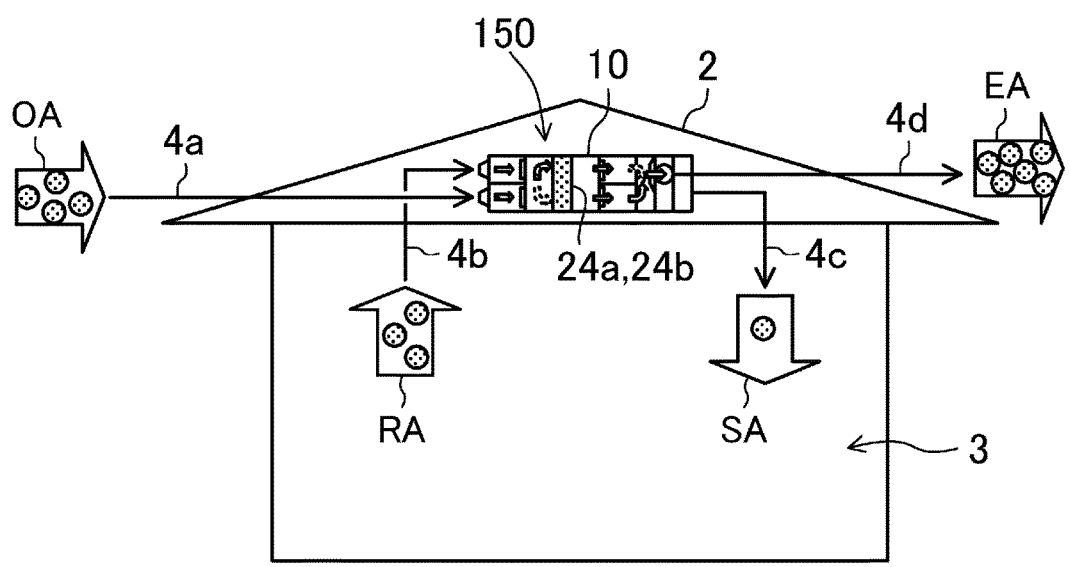
FIG. 64 illustrates generally a state where a humidity control device according to a third variation of the eighth embodiment and a third variation of the eleventh embodiment is installed indoors.

In the third variation illustrated in FIG. 64, two humidity control modules (24) are provided inside the casing (10) of the humidity controller (150). This humidity controller (150) is configured to switch modes of operation from a first mode of operation in which the air that has passed through one humidity control module (24) (e.g., the first humidity control module (24a)) is supplied to the indoor space (3) and the air that has passed through the other humidity control module (24) (e.g., the second humidity control module (24b)) is released to the outdoor space to a second mode of operation in which the air that has passed through the second humidity control module (24b) is supplied to the indoor space (3) and the air that has passed through the first humidity control module (24a) is released to the outdoor space, and vice versa.

More particularly, this humidity controller (150) has the configuration shown in FIGS. 65 and 66. This humidity controller (150) has an integrated configuration in which two humidity control modules (24a, 24b) and two fans (30a, 30b) are housed in the same casing (10) and is installed in a roof space. Specifically, FIG. 65 illustrates the first mode of operation in which the first humidity control module (24a) functions as a moisture absorber and the second humidity control module (24b) functions as a moisture desorber. On the other hand, FIG. 66 illustrates the second mode of operation in which the second humidity control module (24b) functions as a moisture absorber and the first humidity control module (24a) functions as a moisture desorber. In FIGS. 65 and 66, A, B and C respectively illustrate a planar structure, a left side face structure and a right side face structure thereof. That is to say, A is a plan view illustrating an internal structure of the device.

The casing (10) of this humidity controller (150) is configured as a rectangular box. One side wall surface of this casing (10) is provided with a first inlet (11), through which the outdoor air (OA) is sucked into the casing (10), and a second inlet (12), through which the room air (RA) is sucked into the casing (10). Meanwhile, two side wall surfaces on the right and left sides of the side wall surface with the inlets (11, 12) are respectively provided with a first outlet (13), through which the supply air (SA) is supplied to the indoor space (3), and a second outlet (14), through which the exhaust air (EA) is released to the outdoor space. As schematically indicated by the arrows in FIG. 64, ducts (4a, 4b, 4c, 4d) are respectively connected to the first and second inlets (11, 12) and first and second outlets (13, 14).

The inner space of the casing (10) includes humidity control chambers (C1, C2) where the humidity control modules (24) are arranged and fan chambers (C3, C4) where the fans (30a, 30b) are arranged. The humidity control chambers (C1, C2) are comprised of first and second humidity control chambers (C1, C2) which are located laterally adjacent to each other inside the casing (10) in FIGS. 65 and 66. Likewise, the fan chambers (C3, C4) are comprised of first and second fan chambers (C3, C4) which are located laterally adjacent to each other inside the casing (10). An air supply fan (30a) is arranged in the first fan chamber (C3), and an air exhaust fan (30b) is arranged in the second fan chamber (C4).

Also, inlet ventilation chambers (C5, C6) are arranged between those inlets (11, 12) and the humidity control chambers (C1, C2). The inlet ventilation chambers (C5, C6) are comprised of first and second inlet ventilation chambers (C5, C6) which are vertically stacked one upon the other in two levels inside the casing (10). The first inlet ventilation chamber (C5) is provided with the first inlet (11) and the second inlet ventilation chamber (C6) is provided with the second inlet (12). An openable and closable damper (D1, D2, D3, D4) is provided between each inlet ventilation chamber (C5, C6) and its associated humidity control chamber (C1, C2). That is to say, four dampers (D1, D2, D3, D4) are provided in total between the inlet ventilation chambers (C5, C6) and the humidity control chambers (C1, C2).

In addition, outlet ventilation chambers (C7, C8) are arranged between the humidity control chambers (C1, C2) and the fan chambers (C3, C4). The outlet ventilation chambers (C7, C8) are comprised of first and second outlet ventilation chambers (C7, C8) which are vertically stacked one upon the other in two levels inside the casing (10). An openable and closable damper (D5, D6, D7, D8) is provided between each humidity control chamber (C1, C2) and its associated outlet ventilation chamber (C7, C8). That is to say, four dampers (D5, D6, D7, D8) are provided in total between the humidity control chambers (C1, C2) and the outlet ventilation chambers (C7, C8).

Each outlet ventilation chamber (C7, C8) communicates with its associated fan chamber (C3, C4). The first outlet (13) is provided for one side of the casing (10) with the first fan chamber (C3), and the second outlet (14) is provided for the other side of the casing (10) with the second fan chamber (C4).

According to this configuration, while the device is performing the first mode of operation, the first, fourth, fifth, and eighth dampers (D1, D4, D5 and D8) are opened, and the second, third, sixth and seventh dampers (D2, D3, D6 and D7) are closed. On the other hand, while the device is performing the second mode of operation, the second, third, sixth and seventh dampers (D2, D3, D6 and D7) are opened, and the first, fourth, fifth, and eighth dampers (D1, D4, D5 and D8) are closed.

By controlling the opened/closed states of the dampers (D1-D8) in this manner, in the first mode of operation, the outdoor air introduced into the casing (10) through the first inlet (11) passes as shown in FIG. 65 through the first damper (D1), the first humidity control module (24a) and the fifth damper (D5) to be supplied to the indoor space (3) through the first outlet (13). Meanwhile, the room air introduced into the casing (10) through the second inlet (12) passes through the fourth damper (D4), the second humidity control module (24b) and the eighth damper (D8) to be exhausted to the outdoor space through the second outlet (14). On the other hand, in the second mode of operation, the outdoor air introduced into the casing (10) through the first inlet (11) passes as shown in FIG. 66 through the third damper (D3), the second humidity control module (24b) and the seventh damper (D7) to be supplied to the indoor space (3) through the first outlet (13). Meanwhile, the room air introduced into the casing (10) through the second inlet (14) passes through the second damper (D2), the first humidity control module (24a) and the sixth damper (D6) to be exhausted to the outdoor space through the second outlet (14).

Thus, according to this third variation of the eighth embodiment, the first and second modes of operation shown in FIGS. 65 and 66 are alternately performed a number of times by changing the opened and closed states of the dampers.

This humidity controller (150) is configured to operate as a dehumidifying-only machine. That is why no matter whether the path of the air to be supplied to the indoor space (3) has switched to the first humidity control module (24a) or the second humidity control module (24b), that humidity control module (24) is going to perform a moisture-absorbing operation. As a result, dehumidified air is supplied continuously to the indoor space (3). Likewise, no matter whether the path of the air to be exhausted to the outdoor space has switched to the second humidity control module (24b) or the first humidity control module (24a), that humidity control module (24) is going to perform a moisture-desorbing operation. As a result, the humidity control module (24) to pass the air that is going to be released to the outdoor space is always the regenerator.

As can be seen, according to the third variation of the eighth embodiment, the modes of operation shown in FIGS. 65 and 66 are switched alternately so that while one humidity control module (24a, 24b) is dehumidifying air and supplying the dehumidified air to the indoor space (3), the other humidity control module (24b, 24a) regenerates the adsorption layer (23), thus allowing for performing a dehumidifying mode of operation continuously.

(Fourth Variation)

Figure 67:
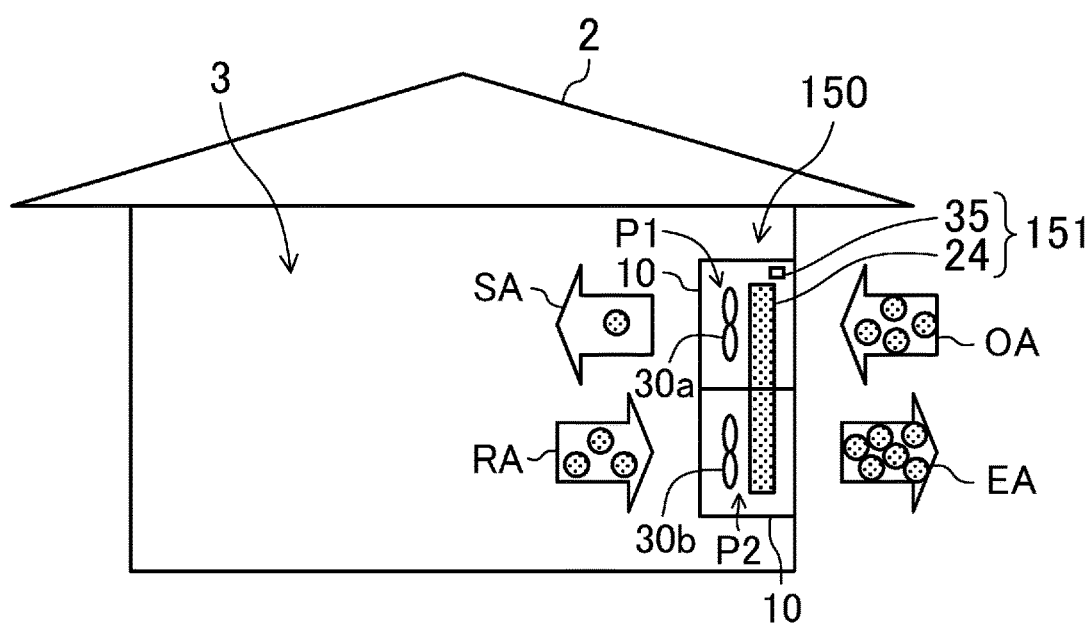
FIG. 67 illustrates generally a state where a humidity control device according to a fourth variation of the eighth embodiment and a fourth variation of the eleventh embodiment is installed indoors.

The fourth variation illustrated in FIG. 67 is directed to an exemplary humidity controller (150) which uses a humidity control module (24) implemented as a rotor. This humidity controller (150) is also configured to operate as a dehumidifying-only machine.

The casing (10) of this humidity controller (150) has an air supply passage (P1) and an air exhaust passage (P2). The air supply passage (P1) is provided with an air supply fan (30a), while the air exhaust passage (P2) is provided with an air exhaust fan (30b). The humidity control module (24) is configured as a disk, which is arranged to partially cover both of the air supply passage (P1) and air exhaust passage (P2) inside the casing (10). This humidity control module (24) is configured to rotate on an axis so as to allow a portion located in the air supply passage (P1) to move into the air exhaust passage (P2) and also allow a portion located in the air exhaust passage (P2) to move into the air supply passage (P1).

In the humidity controller (150) of this fourth variation, a moisture-absorbing operation is performed in the air supply passage (P1) and a moisture-desorbing operation is performed in the air exhaust passage (P2). Specifically, no tensile force is applied to a portion of the humidity control module (24) located in the air supply passage (P1), and the thermoelastic material (21) absorbs heat to cool the adsorption layer (23) and adsorb moisture in the air into the adsorption layer (23). On the other hand, tensile force is applied to a portion of the humidity control module (24) located in the air exhaust passage (P2), and the thermoelastic material (21) dissipates heat to heat the adsorption layer (23), release the moisture in the adsorption layer (23) to the air, and regenerate the adsorbent.

According to this embodiment, the moisture-absorbing and moisture-desorbing operations are performed with the humidity control module (24) rotated either continuously or intermittently. This thus allows the humidity control module (24) to perform moisture-absorbing processing in the air supply passage (P1) while making regeneration in the air exhaust passage (P2), thus enabling supply of dehumidified air to the indoor space (3).

«Ninth Embodiment of This Invention»

A ninth embodiment of the present invention will now be described.

The ninth embodiment illustrated in FIG. 68 is an example in which the humidity controller (150) of the eighth embodiment shown in FIG. 57 is configured to operate as a humidifying-only machine.

Just like the humidity controller (150) shown in FIG. 57, this humidity controller (150) also includes a casing (10), a humidity control module (24) housed inside the casing (10), a fan (30) which makes air flow through the humidity control module (24), and a switching control section (35) which adjusts the tensile force to be applied to the humidity control module (24). The casing (10) and various functional parts housed inside the casing (10) constitute an indoor unit (U). Also, inside the casing (10), defined is an air passage (P) to make the air introduced into the casing (10) pass through the humidity control module (24) and be supplied to the indoor space (3).

This humidity controller (150) is configured to perform a humidifying mode of operation by introducing the air subjected to moisture-desorbing processing by the humidity control module (24) into the indoor space (3) through the air passage (P), which is a major difference from the humidity controller (150) shown in FIG. 57.

Figure 68A:
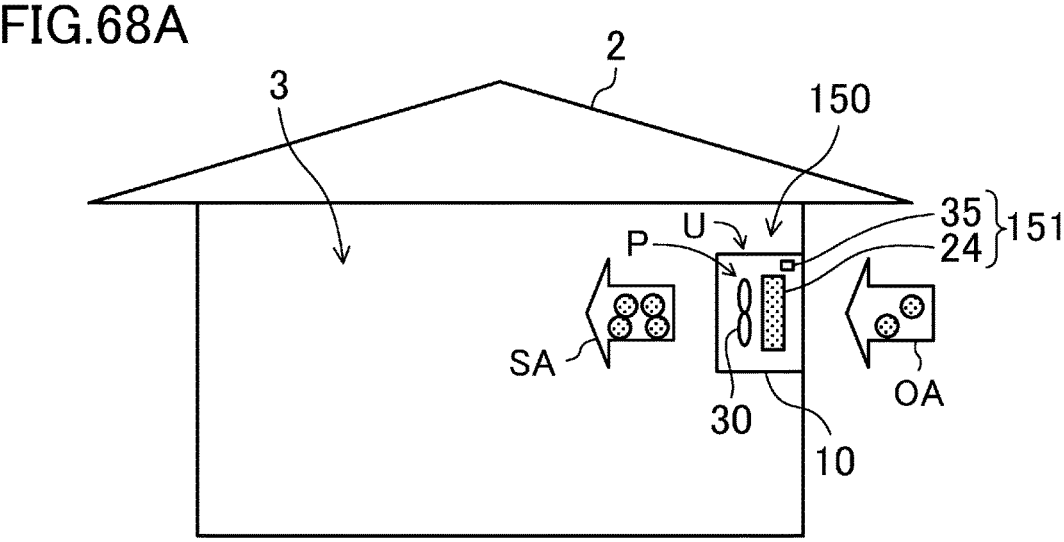
FIG. 68A illustrates an operating state of their moisture desorbing operation and FIG. 68B illustrates an operating state of their moisture absorbing operation.

In this humidity controller (150), tensile force is applied in FIG. 68A to the thermoelastic material (21) of the humidity control module (24) that has been cooled. Then, the humidity control module (24) dissipates heat and the adsorption layer (23) is heated. When the adsorption layer (23) is heated, the moisture in the adsorption layer (23) is released to the outdoor air (OA) flowing from the outdoor space to the indoor space (3). As a result, humidified air is supplied as supply air (SA) to the indoor space (3).

Figure 68B:
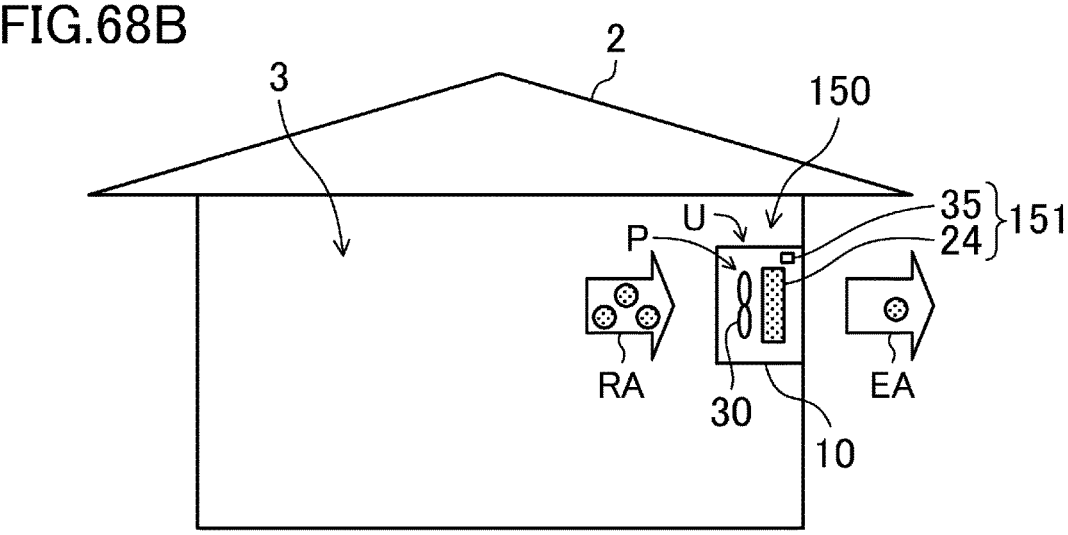

In FIG. 68B, on the other hand, the direction of revolution of the fan (30) is switched to exhaust the room air (RA) to the outdoor space. In this case, the tensile force applied to the thermoelastic material (21) of the humidity control module (24) is removed. Then, the humidity control module (24) absorbs heat and the adsorption layer (23) is cooled. When the adsorption layer (23) is cooled, the moisture in the air is adsorbed into the adsorption layer (23). Thus, the air dehumidified by having had its moisture adsorbed is released as exhaust air (EA) to the outdoor space. In this case, since the thermoelastic material (21) absorbs heat, the adsorption layer (23) is prevented from generating heat due to the heat of adsorption. As a result, the moisture-absorbing operation is performed without causing a decline in adsorption ability.

——Variations of Ninth Embodiment——
(First Variation)

The first variation of the ninth embodiment shown in FIG. 69 is an example in which the humidity controller (150) shown in FIG. 62 is configured to operate as a humidifying-only machine. As in the humidity controller (150) shown in FIG. 69, a first indoor unit (U1) is arranged at one of two opposing wall surfaces of the room (i.e., on the wall on the right hand side on the paper), and a second indoor unit (U2) is arranged at the other wall surface of the room (i.e., on the wall on the left hand side on the paper). Each of these indoor units (U1, U2) has the same configuration as its counterpart of the ninth embodiment shown in FIG. 68.

Figure 69A:
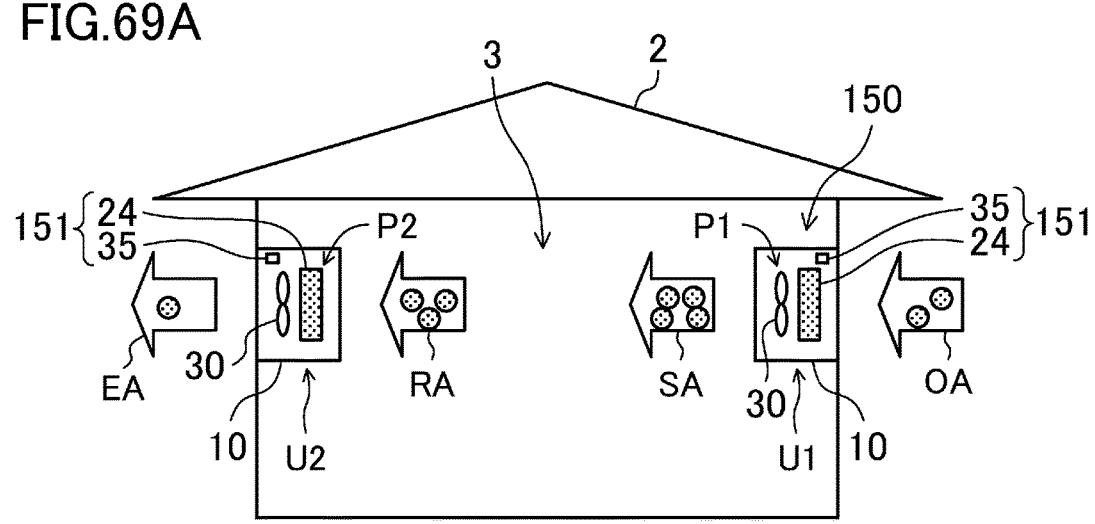
FIG. 69A illustrates a first operating state and FIG. 69B illustrates a second operating state.

FIG. 69A illustrates a state where the first indoor unit (U1) is performing a moisture-desorbing operation and the second indoor unit (U2) is performing a moisture-absorbing operation. In the first indoor unit (U1), tensile force is applied to the thermoelastic material (21) of the humidity control module (24). Thus, the humidity control module (24) of the first indoor unit (U1) dissipates heat and the outdoor air (OA) flowing from the outdoor space into the indoor space (3) is moisturized. As a result, the moisturized and humidified air is supplied as supply air (SA) to the indoor space (3).

On the other hand, in the second indoor unit (U2), the fan (30) revolves in a direction in which the room air (RA) is exhausted to the outdoor space, while the tensile force applied to the thermoelastic material (21) of the humidity control module (24) is removed. As a result, moisture in the air is adsorbed into the adsorption layer (23), and dehumidified air is released as exhaust air (EA) to the outdoor space.

Figure 69B:
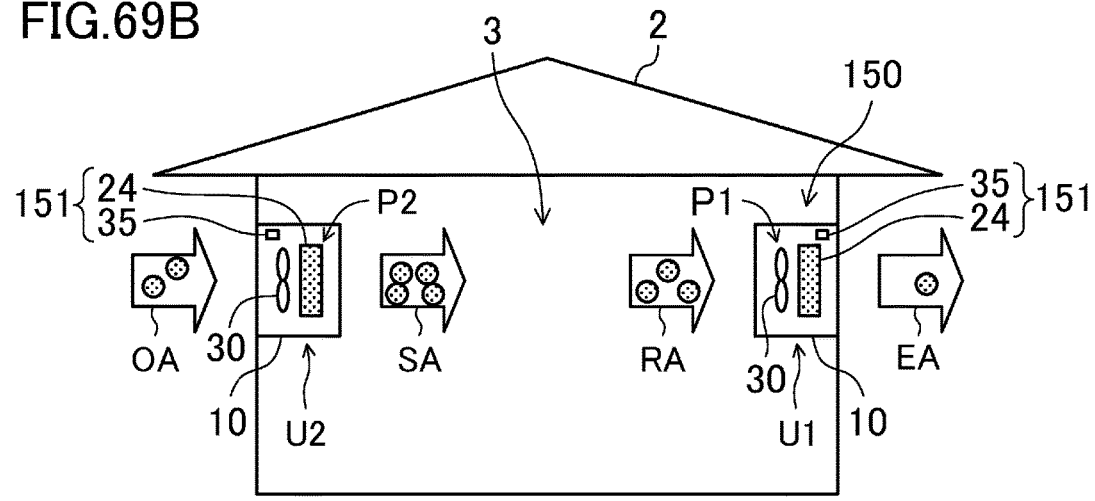

FIG. 69B illustrates a state where the second indoor unit (U2) is performing a moisture-desorbing operation and the first indoor unit (U1) is performing a moisture-absorbing operation. In the second indoor unit (U2), tensile force is applied to the thermoelastic material (21) of the humidity control module (24). Thus, the humidity control module (24) of the second indoor unit (U1) dissipates heat and the outdoor air (OA) flowing from the outdoor space into the indoor space (3) is moisturized. As a result, the moisturized and humidified air is supplied as supply air (SA) to the indoor space (3).

On the other hand, in the first indoor unit (U1), the fan (30) revolves in a direction in which the room air (RA) is exhausted to the outdoor space, while the tensile force applied to the thermoelastic material (21) of the humidity control module (24) is removed. As a result, moisture in the air is adsorbed into the adsorption layer (23) and dehumidified air is released as exhaust air (EA) to the outdoor space.

As can be seen, according to the first variation of the ninth embodiment, while either one of the two indoor units (U1, U2) is humidifying air and supplying that humidified air to the indoor space (3), the other indoor unit (U2, U1) switches from the mode of operation involving the moisture-absorbing operation as shown in FIG. 69A to the mode of operation shown in FIG. 69B, and vice versa, thus performing a humidifying mode of operation continuously.

(Second Variation)

In the second variation of the ninth embodiment shown in FIG. 70, two indoor units (U1, U2) are installed in the indoor space (3) to be air-conditioned, and the humidity controller (150) of the second variation of the eighth embodiment shown in FIG. 63 is configured to operate as a humidifying-only machine. In this variation, however, both of the first and second indoor units (U1, U2) are arranged on the same wall surface on the right hand side of the paper.

FIG. 70A illustrates a state where the first indoor unit (U1) is performing a moisture-desorbing operation and the second indoor unit (U2) is performing a moisture-absorbing operation. In the first indoor unit (U1), tensile force is applied to the thermoelastic material (21) of the humidity control module (24). Thus, the humidity control module (24) of the first indoor unit (U1) dissipates heat and the outdoor air (OA) flowing from the outdoor space into the indoor space (3) is moisturized. As a result, the moisturized and humidified air is supplied as supply air (SA) into the indoor space (3).

On the other hand, in the second indoor unit (U2), the fan (30) revolves in a direction in which the room air (RA) is exhausted to the outdoor space, while the tensile force applied to the thermoelastic material (21) of the humidity control module (24) is removed. As a result, moisture in the air is adsorbed into the adsorption layer (23), and dehumidified air is released as exhaust air (EA) to the outdoor space.

FIG. 70B illustrates a state where the second indoor unit (U2) is performing a moisture-desorbing operation and the first indoor unit (U1) is performing a moisture-absorbing operation. In the second indoor unit (U2), tensile force is applied to the thermoelastic material (21) of the humidity control module (24). Thus, the humidity control module (24) of the second indoor unit (U1) dissipates heat and the outdoor air (OA) flowing from the outdoor space into the indoor space (3) is moisturized. As a result, the moisturized and humidified air is supplied as supply air (SA) to the indoor space (3).

On the other hand, in the first indoor unit (U1), the fan (30) revolves in a direction in which the room air (RA) is exhausted to the outdoor space, while the tensile force applied to the thermoelastic material (21) of the humidity control module (24) is removed. As a result, moisture in the air is adsorbed into the adsorption layer (23) and dehumidified air is released as exhaust air (EA) to the outdoor space.

As can be seen, according to the second variation of the ninth embodiment, while either one of the two indoor units (U1, U2) is humidifying air and supplying that humidified air to the indoor space (3), the other indoor unit (U2, U1) switches from the mode of operation involving the moisture-absorbing operation as shown in FIG. 70A to the mode of operation shown in FIG. 70B, and vice versa, thus performing a humidifying mode of operation continuously.

(Third Variation)

Figure 71:
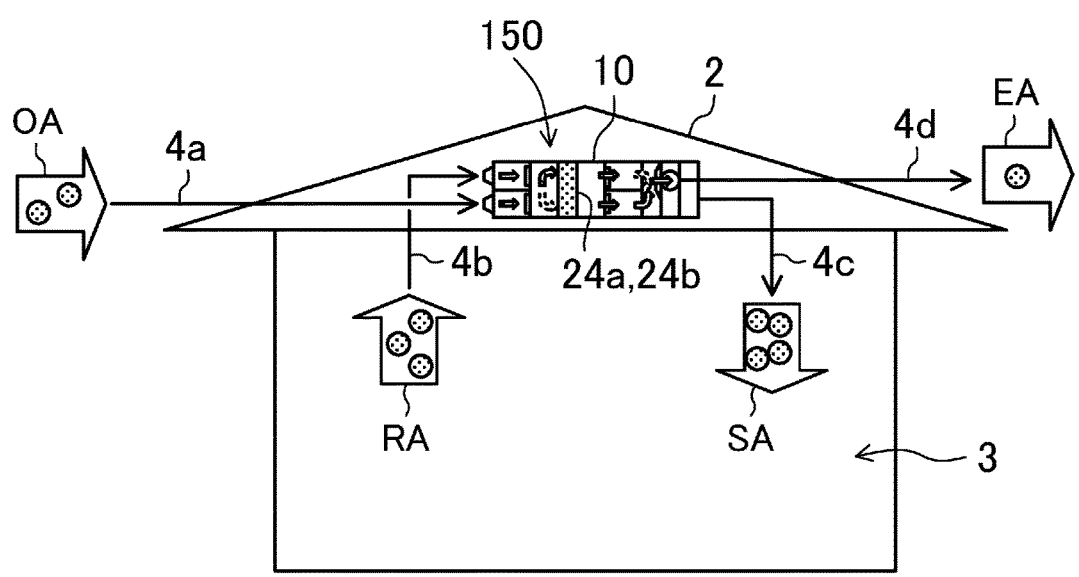
FIG. 71 illustrates generally a state where a humidity control device according to a third variation of the ninth embodiment and a third variation of the eleventh embodiment is installed indoors.

In the third variation of the ninth embodiment illustrated in FIG. 71, the humidity controller (150) of the third variation of the eighth embodiment shown in FIGS. 64-66 is configured to operate as a humidifying-only machine. More particularly, in this humidity controller (150), two humidity control modules (24a, 24b) are provided inside the casing (10) as in FIGS. 64-66. This humidity controller (150) is configured to switch modes of operation from a first mode of operation in which the air that has passed through one humidity control module (24) (e.g., the first humidity control module (24a)) is supplied to the indoor space (3) and the air that has passed through the other humidity control module (24) (e.g., the second humidity control module (24b)) is released to the outdoor space to a second mode of operation in which the air that has passed through the second humidity control module (24b) is supplied to the indoor space (3) and the air that has passed through the first humidity control module (24a) is released to the outdoor space, and vice versa.

More particularly, this humidity controller (150) has the configuration shown in FIGS. 72 and 73. This humidity controller (150) has an integrated configuration in which two humidity control modules (24a, 24b) and two fans (30a, 30b) are housed in the same casing (10) and is installed in a roof space. Specifically, FIG. 72 illustrates the first mode of operation in which the first humidity control module (24a) functions as a moisture desorber and the second humidity control module (24b) functions as a moisture absorber. On the other hand, FIG. 73 illustrates the second mode of operation in which the second humidity control module (24b) functions as a moisture desorber and the first humidity control module (24a) functions as a moisture absorber. In FIGS. 72 and 73, A, B and C respectively illustrate a planar structure, a left side face structure and a right side face structure thereof. That is to say, A is a plan view illustrating an internal structure of the device.

The casing (10) of this humidity controller (150) is configured as a rectangular box. One side wall surface of this casing (10) is provided with a first inlet (11), through which the outdoor air (OA) is sucked into the casing (10), and a second inlet (12), through which the room air (RA) is sucked into the casing (10). Meanwhile, two side wall surfaces on the right and left sides of the side wall surface with the inlets (11, 12) are respectively provided with a first outlet (13), through which the supply air (SA) is supplied to the indoor space (3), and a second outlet (14), through which the exhaust air (EA) is released to the outdoor space. As schematically indicated by the arrows in FIG. 71, ducts (4a, 4b, 4c, 4d) are respectively connected to the first and second inlets (11, 12) and first and second outlets (13, 14).

The inner space of the casing (10) includes humidity control chambers (C1, C2) where the humidity control modules (24) are arranged and fan chambers (C3, C4) where the fans (30a, 30b) are arranged. The humidity control chambers (C1, C2) are comprised of first and second humidity control chambers (C1, C2) which are located laterally adjacent to each other inside the casing (10) in FIGS. 72 and 73. Likewise, the fan chambers (C3, C4) are comprised of first and second fan chambers (C3, C4) which are located laterally adjacent to each other inside the casing (10). An air supply fan (30a) is arranged in the first fan chamber (C3), and an air exhaust fan (30b) is arranged in the second fan chamber (C4).

Also, inlet ventilation chambers (C5, C6) are arranged between those inlets (11, 12) and the humidity control chambers (C1, C2). The inlet ventilation chambers (C5, C6) are comprised of first and second inlet ventilation chambers (C5, C6) which are vertically stacked one upon the other in two levels inside the casing (10). The first inlet ventilation chamber (C5) is provided with the first inlet (11) and the second inlet ventilation chamber (C6) is provided with the second inlet (12). An openable and closable damper (D1, D2, D3, D4) is provided between each inlet ventilation chamber (C5, C6) and its associated humidity control chamber (C1, C2). That is to say, four dampers (D1, D2, D3, D4) are provided in total between the inlet ventilation chambers (C5, C6) and the humidity control chambers (C1, C2).

In addition, outlet ventilation chambers (C7, C8) are arranged between the humidity control chambers (C1, C2) and the fan chambers (C3, C4). The outlet ventilation chambers (C7, C8) are comprised of first and second outlet ventilation chambers (C7, C8) which are vertically stacked one upon the other in two levels inside the casing (10). An openable and closable damper (D5, D6, D7, D8) is provided between each humidity control chamber (C1, C2) and its associated outlet ventilation chamber (C7, C8). That is to say, four dampers (D5, D6, D7, D8) are provided in total between the humidity control chambers (C1, C2) and the outlet ventilation chambers (C7, C8).

Each outlet ventilation chamber (C7, C8) communicates with its associated fan chamber (C3, C4). The first outlet (13) is provided for one side of the casing (10) with the first fan chamber (C3), and the second outlet (14) is provided for the other side of the casing (10) with the second fan chamber (C4).

According to this configuration, while the device is performing the first mode of operation, the first, fourth, fifth, and eighth dampers (D1, D4, D5 and D8) are opened, and the second, third, sixth and seventh dampers (D2, D3, D6 and D7) are closed. On the other hand, while the device is performing the second mode of operation, the second, third, sixth and seventh dampers (D2, D3, D6 and D7) are opened, and the first, fourth, fifth, and eighth dampers (D1, D4, D5 and D8) are closed.

By controlling the opened/closed states of the dampers (D1-D8) in this manner, in the first mode of operation, the outdoor air introduced into the casing (10) through the first inlet (11) passes as shown in FIG. 72 through the first damper (D1), the first humidity control module (24a) and the fifth damper (D5) to be supplied to the indoor space (3) through the first outlet (13). Meanwhile, the room air introduced into the casing (10) through the second inlet (12) passes through the fourth damper (D4), the second humidity control module (24b) and the eighth damper (D8) to be exhausted to the outdoor space through the second outlet (14). On the other hand, in the second mode of operation, the outdoor air introduced into the casing (10) through the first inlet (11) passes as shown in FIG. 73 through the third damper (D3), the second humidity control module (24b) and the seventh damper (D7) to be supplied to the indoor space (3) through the first outlet (13). Meanwhile, the room air introduced into the casing (10) through the second inlet (14) passes through the second damper (D2), the first humidity control module (24a) and the sixth damper (D6) to be exhausted to the outdoor space through the second outlet (14).

Thus, according to this third variation of the ninth embodiment, the first and second modes of operation shown in FIGS. 72 and 73 are alternately performed a number of times by changing the opened and closed states of the dampers.

This humidity controller (150) is configured to operate as a humidifying-only machine. That is why no matter whether the path of the air to be supplied to the indoor space (3) has switched to the first humidity control module (24a) or the second humidity control module (24b), that humidity control module (24) is going to perform a moisture-desorbing operation. As a result, humidified air is supplied continuously to the indoor space (3).

Likewise, no matter whether the path of the air to be exhausted to the outdoor space has switched to the second humidity control module (24b) or the first humidity control module (24a), that humidity control module (24) is going to perform a moisture-absorbing operation. As a result, the humidity control module (24) to pass the air that is going to be released to the outdoor space is always the adsorber.

As can be seen, according to the third variation of the ninth embodiment, the modes of operation shown in FIGS. 72 and 73 are switched alternately so that while one humidity control module (24a, 24b) is humidifying air and supplying the humidified air to the indoor space (3), the other humidity control module (24b, 24a) further adsorbs moisture in the air into the adsorption layer (23), thus allowing for performing a humidifying mode of operation continuously.

(Fourth Variation)

Figure 74:
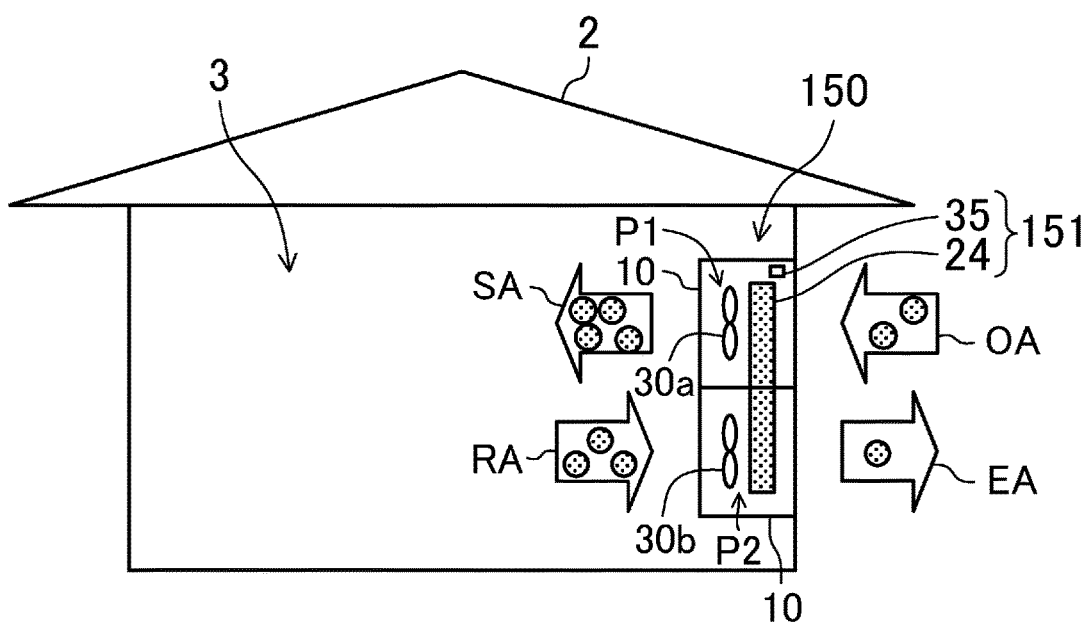
FIG. 74 illustrates generally a state where a humidity control device according to a fourth variation of the ninth embodiment is installed indoors.

The fourth variation of the ninth embodiment illustrated in FIG. 74 is directed to an exemplary humidity controller (150) which uses a humidity control module (24) implemented as a rotor. This humidity controller (150) is also configured to operate as a humidifying-only machine.

The casing (10) of this humidity controller (150) has an air supply passage (P1) and an air exhaust passage (P2). The air supply passage (P1) is provided with an air supply fan (30a), while the air exhaust passage (P2) is provided with an air exhaust fan (30b). The humidity control module (24) is configured as a disk, which is arranged to partially cover both of the air supply passage (P1) and air exhaust passage (P2) inside the casing (10). This humidity control module (24) is configured to rotate on an axis so as to allow a portion located in the air supply passage (P1) to move into the air exhaust passage (P2) and also allow a portion located in the air exhaust passage (P2) to move into the air supply passage (P1).

In the humidity controller (150) of this fourth variation, a moisture-desorbing operation is performed in the air supply passage (P1) and a moisture-absorbing operation is performed in the air exhaust passage (P2). Specifically, tensile force is applied to a portion of the humidity control module (24) located in the air supply passage (P1), and the thermoelastic material (21) dissipates heat to heat the adsorbent, regenerate the adsorbent, and desorb moisture in the adsorbent to the air. On the other hand, no tensile force is applied to a portion of the humidity control module (24) located in the air exhaust passage (P2), and the thermoelastic material (21) absorbs heat to cool the adsorbent, and adsorbs the moisture in the air into the adsorbent.

According to this embodiment, the moisture-desorbing and moisture-absorbing operations are performed with the humidity control module (24) rotated either continuously or intermittently. This thus allows the humidity control module (24) to perform moisture-desorbing processing in the air supply passage (P1) while performing moisture-absorbing processing in the air exhaust passage (P2), thus allowing for supplying humidified air to the indoor space (3) continuously.

«Tenth Embodiment of this Invention»

A tenth embodiment of the present invention will now be described.

Although the humidity controller (150) according to the second variation of the eighth embodiment shown in FIG. 63 is a dehumidifying-only machine, the tenth embodiment shown in FIG. 75 is configured to cool the air, too. As in the example illustrated in FIG. 63, this humidity controller (150) also includes two indoor units (U1, U2), and both of the first and second indoor units (U1, U2) are arranged on the same wall surface on the paper (i.e., on the wall surface on the right hand side).

In this humidity controller (150), each of the first and second indoor units (U1, U2) includes not only the humidity control module (24) described above but also the cooling/heating module (20) configured to cool and heat the air without providing any adsorption layer (23) for the humidity control module (24).

According to this tenth embodiment, in each of the first and second indoor units (U1, U2), the air passes through the humidity control module (24) and the cooling/heating module (20), thus allowing this humidity controller (150) to perform not only the processing of desorbing and absorbing moisture to/from the air but also the processing of cooling and heating the air as well.

The humidity control module (24) and cooling/heating module (20) are arranged such that the humidity control module (24) is located upstream of the cooling/heating module (20) while performing a moisture-absorbing operation but is located downstream of the cooling/heating module (20) while performing the moisture-desorbing operation.

Figure 75A:
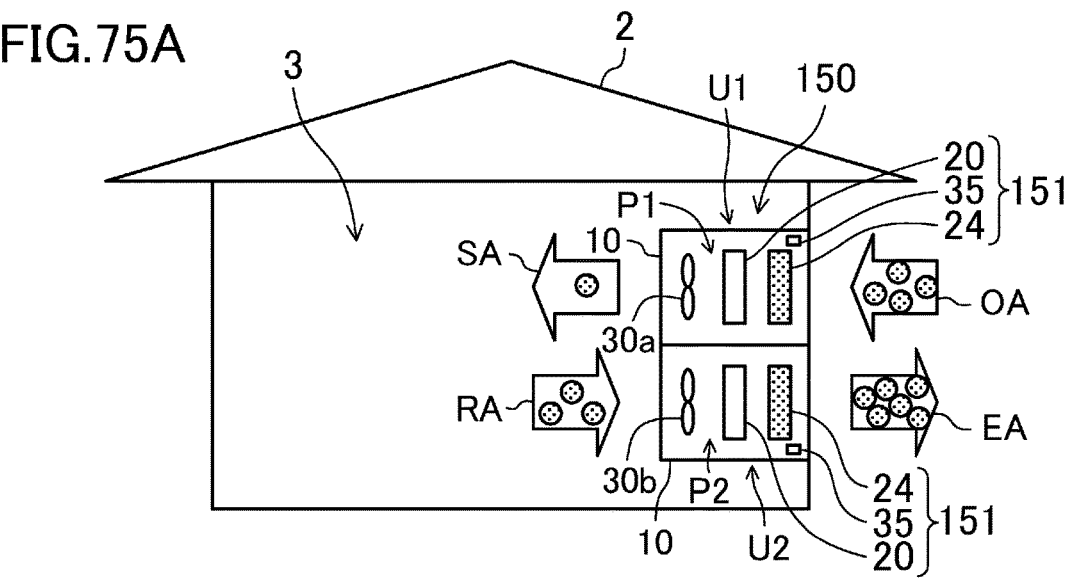
FIG. 75A illustrates a first operating state and FIG. 75B illustrates a second operating state.

FIG. 75A illustrates a state where the first indoor unit (U1) is performing a cooling and moisture-absorbing operation and the second indoor unit (U2) is performing a heating and moisture-desorbing operation. In the first indoor unit (U1), the tensile force applied to the thermoelastic material (21) of the humidity control module (24) is removed. Thus, the humidity control module (24) of the first indoor unit (U1) absorbs heat, and the outdoor air (OA) flowing from the outdoor space into the indoor space (3) has its moisture adsorbed. In addition, in the first indoor unit (U1), the tensile force applied to the cooling/heating module (20) is also removed. Thus, the air flowing from the outdoor space into the indoor space (3) is cooled. As a result, the dehumidified and cooled air is supplied as supply air (SA) to the indoor space (3).

On the other hand, in the second indoor unit (U2), the fan (30) revolves in a direction in which the room air (RA) is exhausted to the outdoor space, while tensile force is applied at the same time to the thermoelastic material (21c) of the cooling/heating module (20) and to the thermoelastic material (21) of the humidity control module (24). Thus, the air flowing from the indoor space (3) to the outdoor space is heated by the cooling/heating module (20), and then passes through the humidity control module (24). Since the humidity control module (24) generates heat in the meantime, the moisture in the adsorption layer (23) of the humidity control module (24) is released to the air, and the moisturized air is released as exhaust air (EA) to the outdoor space. As a result, the adsorption layer (23) of the humidity control module (24) is regenerated.

Figure 75B:
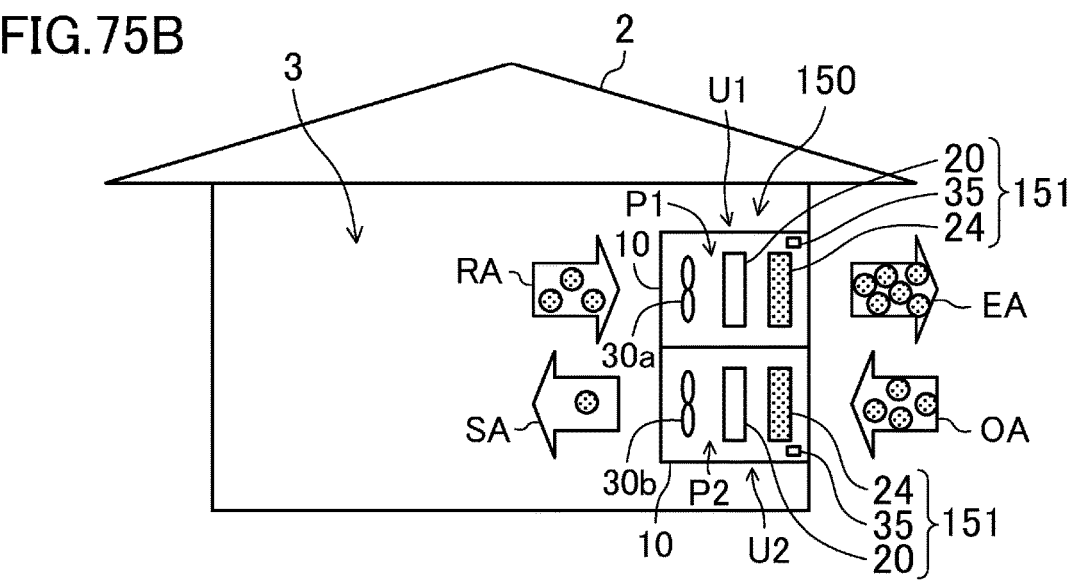

FIG. 75B illustrates a state where the second indoor unit (U2) is performing a cooling and moisture-absorbing operation and the first indoor unit (U1) is performing a heating and moisture-desorbing operation. In the second indoor unit (U2), the tensile force applied to the thermoelastic material (21) of the humidity control module (24) is removed. Thus, the humidity control module (24) of the second indoor unit (U1) absorbs heat, and the outdoor air (OA) flowing from the outdoor space into the indoor space (3) has its moisture adsorbed. In addition, in the second indoor unit (U2), the tensile force applied to the thermoelastic material (21c) of the cooling/heating module (20) is also removed. Thus, the air flowing from the outdoor space into the indoor space (3)

is cooled. As a result, the dehumidified and cooled air is supplied as supply air (SA) to the indoor space (3).

On the other hand, in the first indoor unit (U1), the fan (30) revolves in a direction in which the room air (RA) is exhausted to the outdoor space, while tensile force is applied at the same time to the thermoelastic material (21c) of the cooling/heating module (20) and to the thermoelastic material (21) of the humidity control module (24). Thus, the air flowing from the indoor space (3) to the outdoor space is heated by the cooling/heating module (20), and then passes through the humidity control module (24). Since the humidity control module (24) generates heat in the meantime, the moisture in the adsorption layer (23) of the humidity control module (24) is released to the air, and the moisturized air is released as exhaust air (EA) to the outdoor space. As a result, the adsorption layer (23) of the humidity control module (24) is regenerated.

As can be seen, this tenth embodiment allows for performing a dehumidifying and cooling mode of operation continuously by switching the modes of operation shown in FIGS. 75A and 75B alternately so that while one indoor unit (U1, U2) is dehumidifying and cooling the air and giving the air to the indoor space (3), the other indoor unit (U2, U1) heats the air and regenerates the adsorption layer (23).

In this embodiment, the humidity control module (24) and the cooling/heating module (20) are arranged in series together with respect to the air flow so that the outdoor air subjected to latent heat processing is further subjected to sensible heat processing and the resultant air is supplied to the indoor space. However, the humidity control module (24) and the cooling/heating module (20) may also be arranged in parallel with each other so that the outdoor air subjected to the latent heat processing and the outdoor air subjected to the sensible heat processing are supplied in mixture to the indoor space. This alternative configuration is also applicable to any of the variations to be described below.

——Variations of Tenth Embodiment——

(First Variation)

Figure 76:
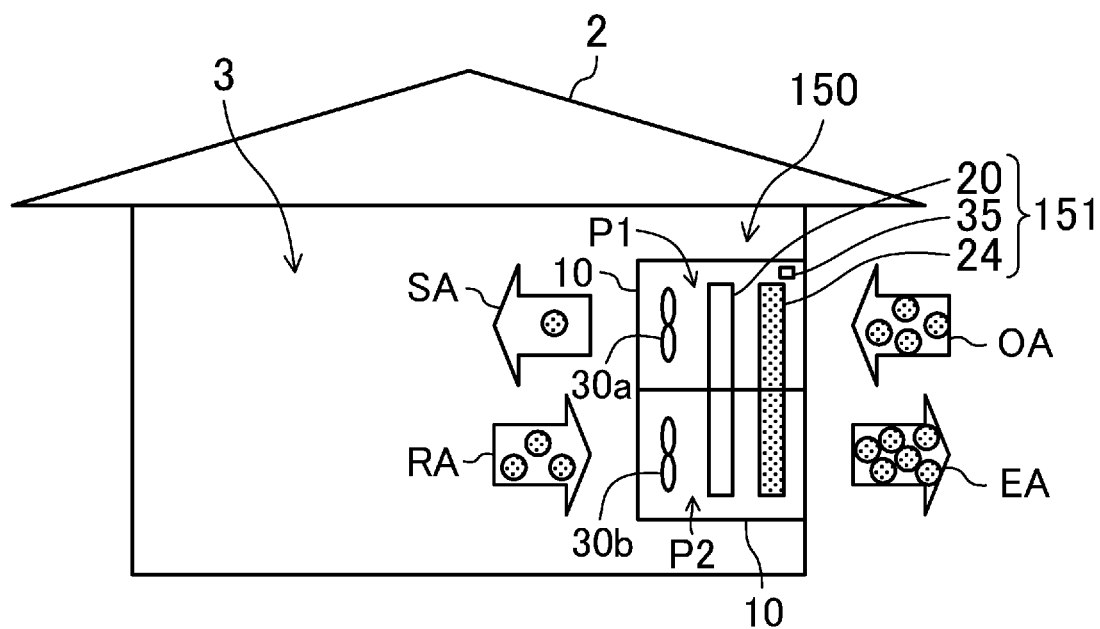
FIG. 76 illustrates generally a state where a humidity control device according to a first variation of the tenth embodiment and a sixth variation of the eleventh embodiment is installed indoors.

The first variation of the tenth embodiment illustrated in FIG. 76 is directed to an exemplary humidity controller (150) which uses a humidity control module (24) implemented as a rotor. This humidity controller (150) includes not only the humidity control module (24) implemented as a rotor but also a cooling/heating module (20) implemented as a rotor as well, and is configured to perform a dehumidifying and cooling mode of operation.

The casing (10) of this humidity controller (150) has an air supply passage (P1) and an air exhaust passage (P2). The air supply passage (P1) is provided with an air supply fan (30a), while the air exhaust passage (P2) is provided with an air exhaust fan (30b). The humidity control module (24) is configured as a disk, which is arranged to partially cover both of the air supply passage (P1) and air exhaust passage (P2) inside the casing (10). This humidity control module (24) is configured to rotate on an axis so as to allow a portion located in the air supply passage (P1) to move into the air exhaust passage (P2) and also allow a portion located in the air exhaust passage (P2) to move into the air supply passage (P1).

The cooling/heating module (20) is also configured as a disk, which is arranged to partially cover both of the air supply passage (P1) and air exhaust passage (P2) inside the casing (10). This cooling/heating module (20) is configured to rotate on an axis so as to allow a portion located in the air supply passage (P1) to move into the air exhaust passage (P2) and also allow a portion located in the air exhaust passage (P2) to move into the air supply passage (P1).

In the humidity controller (150) of this first variation, a cooling and moisture-absorbing operation is performed in the air supply passage (P1) and a heating and moisture-desorbing operation is performed in the air exhaust passage (P2). More particularly, no tensile force is applied to a portion of the humidity control module (24) which is located in the air supply passage (P1), and the thermoelastic material (21) absorbs heat, thereby cooling the adsorption layer (23) and adsorbing moisture in the outdoor air (OA) into the adsorption layer (23). Meanwhile, no tensile force is applied, either, to a portion of the cooling/heating module (20) which is located in the air supply passage (P1), and the thermoelastic material (21c) absorbs heat, thereby cooling the air. As a result, the dehumidified and cooled air is supplied as supply air (SA) to the indoor space (3).

On the other hand, tensile force is applied to a portion of the cooling/heating module (20) which is located in the air exhaust passage (P2), and the thermoelastic material (21c) dissipates heat and heats the room air (RA) flowing from the indoor space (3) to the outdoor space. Meanwhile, tensile force is also applied to a portion of the humidity control module (24) which is located in the air exhaust passage (P2), and the thermoelastic material (21) dissipates heat and heats the adsorption layer (23). Thus, the adsorption layer (23) is regenerated by releasing its moisture to the outdoor air (RA). As a result, the moisturized air is released as exhaust air (EA) to the outdoor space.

According to this variation, the cooling and moisture-absorbing operation and the heating and moisture-desorbing operation are performed with the humidity control module (24) and cooling/heating module (20) rotated either continuously or intermittently. This thus allows the humidity control module (24) to perform cooling and moisture-absorbing processing in the air supply passage (P1) while performing regeneration processing in the air exhaust passage (P2). Consequently, dehumidified and cooled air is supplied continuously to the indoor space (3).

(Second Variation)

Although the humidity controller (150) according to the tenth embodiment shown in FIG. 75 is a dehumidifier-cooler, the second variation of the tenth embodiment shown in FIG. 77 is configured as a humidifier-heater. In this variation, both of the first and second indoor units (U1, U2) are also arranged on the same wall surface on the paper (i.e., on the wall surface on the right hand side).

In this humidity controller (150), each of the first and second indoor units (U1, U2) also includes not only the humidity control module (24) described above but also a cooling/heating module (20) configured to cool and heat the air without providing any adsorption layer (23) for the humidity control module (24). This cooling/heating module (20) has the ability to heat the air when tensile force is applied thereto and to cool the air when tensile force is removed therefrom.

The first and second indoor units (U1, U2) have the same configuration as their counterparts of the tenth embodiment shown in FIG. 75.

Figure 77A:
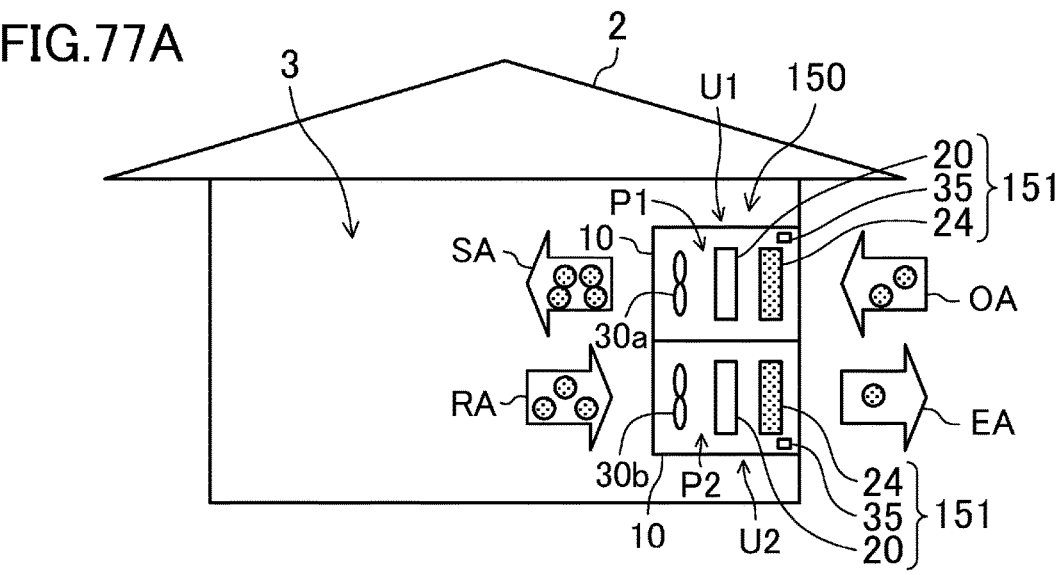
FIG. 77A illustrates a first operating state and FIG. 77B illustrates a second operating state.

FIG. 77A illustrates a state where the first indoor unit (U1) is performing a heating and moisture-desorbing operation and the second indoor unit (U2) is performing a cooling and moisture-absorbing operation. In the first indoor unit (U1), tensile force is applied to the thermoelastic material (21) of the humidity control module (24). Thus, the humidity control module (24) of the first indoor unit (U1) dissipates heat, and the outdoor air (OA) flowing from the outdoor space into the indoor space (3) is moisturized. In addition, in the first indoor unit (U1), tensile force is also applied to the cooling/heating module (20). Thus, the outdoor air (OA) flowing from the outdoor space into the indoor space (3) is heated. As a result, the humidified and heated air is supplied as supply air (SA) to the indoor space (3).

On the other hand, in the second indoor unit (U2), the fan (30) revolves in a direction in which the room air (RA) is exhausted to the outdoor space, while the tensile force applied to the thermoelastic material (21c) of the cooling/heating module (20) is removed, so is the tensile force applied to the thermoelastic material (21) of the humidity control module (24). Thus, the room air (RA) flowing from the indoor space (3) to the outdoor space is cooled by the cooling/heating module (20), and then passes through the humidity control module (24). Since the humidity control module (24) absorbs heat in the meantime, the moisture in the room air (RA) is adsorbed into the adsorption layer (23) of the humidity control module (24), and the air is released as exhaust air (EA) to the outdoor space.

Figure 77B:
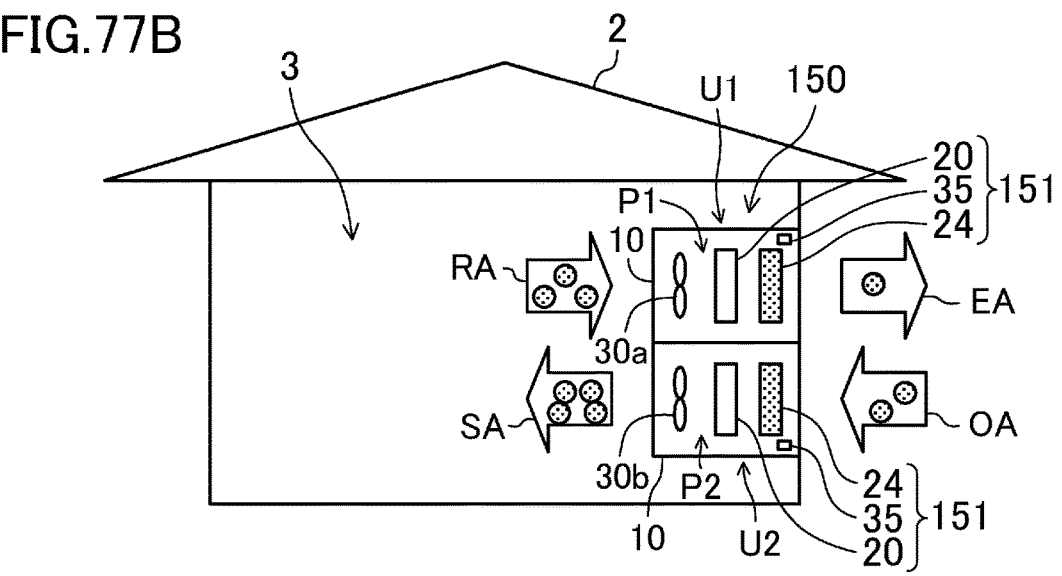

FIG. 77B illustrates a state where the second indoor unit (U2) is performing a heating and moisture-desorbing operation and the first indoor unit (U1) is performing a cooling and moisture-absorbing operation. In the second indoor unit (U2), tensile force is applied to the thermoelastic material (21) of the humidity control module (24). Thus, the humidity control module (24) of the second indoor unit (U1) generates heat, and the outdoor air (OA) flowing from the outdoor space into the indoor space (3) is moisturized. In addition, in the second indoor unit (U2), tensile force is also applied to the cooling/heating module (20). Thus, the outdoor air (OA) flowing from the outdoor space into the indoor space (3) is heated. As a result, the humidified and heated air is supplied as supply air (SA) to the indoor space (3).

On the other hand, in the first indoor unit (U1), the fan (30) revolves in a direction in which the room air (RA) is exhausted to the outdoor space, while the tensile force applied to the thermoelastic material (21c) of the cooling/heating module (20) is removed, so is the tensile force applied to the thermoelastic material (21) of the humidity control module (24). Thus, the room air (RA) flowing from the indoor space (3) to the outdoor space is cooled by the cooling/heating module (20), and then passes through the humidity control module (24). Since the humidity control module (24) absorbs heat in the meantime, the moisture in the room air (RA) is adsorbed into the adsorption layer (23) of the humidity control module (24), and the air is released as exhaust air (EA) to the outdoor space.

As can be seen, this second variation of the tenth embodiment allows for performing a humidifying and heating mode of operation continuously by switching the modes of operation shown in FIGS. 77A and 77B alternately so that while one indoor unit (U1, U2) is humidifying and heating the air and supplying the air to the indoor space (3), the other indoor unit (U2, U1) cools the air and adsorbs its moisture into the adsorption layer (23).

(Third Variation)

Figure 78:
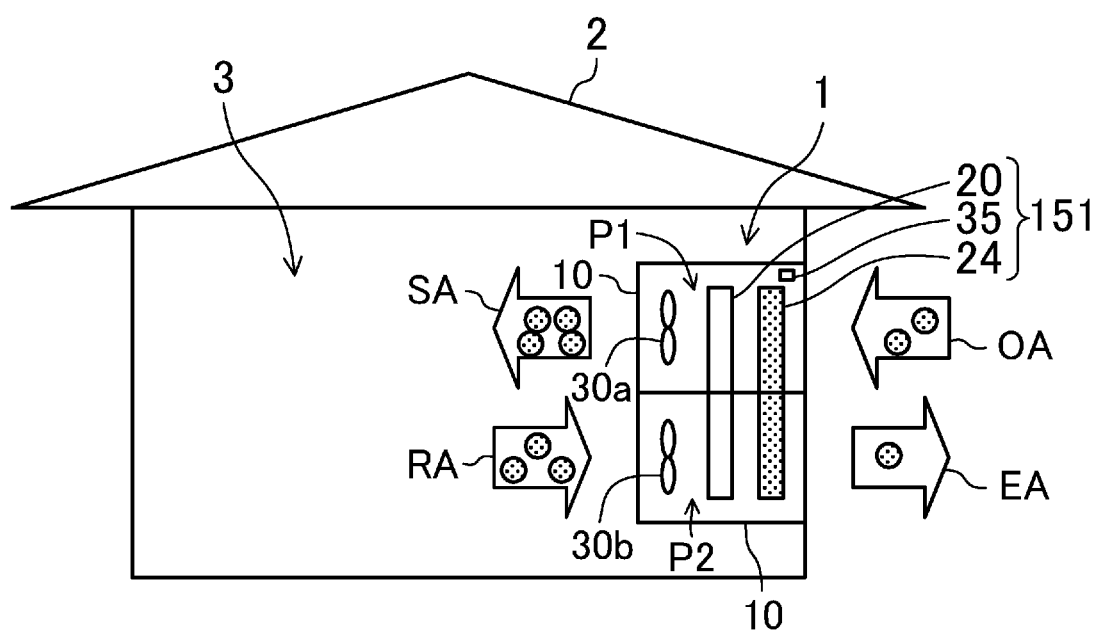
FIG. 78 illustrates generally a state where a humidity control device according to a third variation of the tenth embodiment and the sixth variation of the eleventh embodiment is installed indoors.

Although the humidity controller (150) according to the first variation shown in FIG. 76 is a dehumidifier-cooler, the third variation of the tenth embodiment shown in FIG. 78 is configured as a humidifier-heater. In this variation, not only a humidity control module (24) implemented as a rotor but also a cooling/heating module (20) implemented as a rotor are used as well.

The casing (10), humidity control module (24) and cooling/heating module (20) of this humidity controller (150) have the same configuration as their counterparts shown in FIG. 76.

More particularly, the casing (10) of this humidity controller (150) has an air supply passage (P1) and an air exhaust passage (P2). The air supply passage (P1) is provided with an air supply fan (30a), while the air exhaust passage (P2) is provided with an air exhaust fan (30b). The humidity control module (24) is configured as a disk, which is arranged to partially cover both of the air supply passage (P1) and air exhaust passage (P2) inside the casing (10). This humidity control module (24) is configured to rotate on an axis so as to allow a portion located in the air supply passage (P1) to move into the air exhaust passage (P2) and also allow a portion located in the air exhaust passage (P2) to move into the air supply passage (P1). The cooling/heating module (20) is also configured as a disk, which is arranged to partially cover both of the air supply passage (P1) and air exhaust passage (P2) inside the casing (10). This cooling/heating module (20) is configured to rotate on an axis so as to allow a portion located in the air supply passage (P1) to move into the air exhaust passage (P2) and also allow a portion located in the air exhaust passage (P2) to move into the air supply passage (P1).

In the humidity controller (150) of this third variation, a heating and moisture-desorbing operation is performed in the air supply passage (P1) and a cooling and moisture-absorbing operation is performed in the air exhaust passage (P2). More particularly, tensile force is applied to a portion of the humidity control module (24) which is located in the air supply passage (P1), and the thermoelastic material (21) generates heat, the adsorbent is heated, and the moisture adsorbed in the adsorbent is released to the air. Meanwhile, tensile force is applied to a portion of the cooling/heating module (20) which is located in the air supply passage (P1), and the thermoelastic material (21c) generates heat, thereby heating the air.

On the other hand, the tensile force applied to a portion of the cooling/heating module (20) which is located in the air exhaust passage (P2) is removed, and the thermoelastic material (21c) absorbs heat and the air flowing from the indoor space (3) to the outdoor space is cooled. Meanwhile, the tensile force applied to a portion of the humidity control module (24) which is located in the air exhaust passage (P2) is removed, and the thermoelastic material (21) absorbs heat and cools the adsorbent. Thus, moisture in the air is adsorbed into the adsorbent.

According to this third variation of the tenth embodiment, the heating and moisture-desorbing operation and the cooling and moisture-absorbing operation are performed with the humidity control module (24) rotated either continuously or intermittently. This thus allows the humidity control module (24) to perform the heating and moisture-desorbing processing in the air supply passage (P1) while moisturizing the air in the air exhaust passage (P2).

Consequently, the device is allowed to perform a humidifying and heating mode of operation so that heated and humidified air is supplied continuously to the indoor space (3).

«Eleventh Embodiment of This Invention»

An eleventh embodiment of the present invention will now be described.

A humidity controller (150) according to this eleventh embodiment is obtained by modifying the humidity controller (150) shown in FIGS. 57 and 68 so that the humidity controller (150) can switch modes of operation from a dehumidifying operation in which the air subjected to the moisture-absorbing processing by the humidity control module (24) is supplied to the indoor space (3) to a humidifying operation in which the air subjected to the moisture-desorbing processing by the humidity control module (24) is supplied to the indoor space (3), and vice versa.

For example, the humidity controller (150) shown in FIG. 57 may be configured to switch from the mode of operation of removing the tensile force applied to the thermoelastic material (21) of the humidity control module (24) as shown in FIG. 57A to the mode of operation of applying tensile force to the thermoelastic material (21) of the humidity control module (24) as shown in FIG. 68A, and vice versa, while supplying the air from the outdoor space into the indoor space (3). In addition, the humidity controller (150) shown in FIG. 57 may also be configured to switch from the mode of operation of applying tensile force to the humidity control module (24) as shown in FIG. 57B to the mode of operation of removing the tensile force applied to the humidity control module (24) as shown in FIG. 68B, and vice versa, while exhausting the air from the indoor space (3) to the outdoor space.

Such a configuration allows a humidity controller (150) including an indoor unit (U) with a single humidity control module (24) to switch modes of operation from dehumidifying the indoor space (3) intermittently to humidifying the indoor space (3) intermittently, and vice versa.

——Variations of Eleventh Embodiment——

(First Variation)

According to a first variation of the eleventh embodiment, by changing the state of application of the tensile force, the humidity controller (150) shown in FIGS. 62 and 69 is configured to switch from the operation mode shown in FIG. 62A to the one shown in FIG. 69A, and vice versa, and from the operation mode shown in FIG. 62B to the one shown in FIG. 69B, and vice versa. The basic configuration of this device is the same as the ones shown in FIGS. 62 and 69, and a detailed description thereof will be omitted herein.

While this humidity controller (150) is performing the mode of operation shown in FIGS. 62A and 62B, the tensile force applied to the humidity control module (24), through which the air supplied from the outdoor space to the indoor space (3) passes, is removed, and tensile force is applied to the humidity control module (24), through which the air to be exhausted from the indoor space (3) to the outdoor space passes. On the other hand, while this humidity controller (150) is performing the mode of operation shown in FIGS. 69A and 69B, tensile force is applied to the humidity control module (24), through which the air supplied from the outdoor space to the indoor space (3) passes, and the tensile force applied to the humidity control module (24), through which the air to be exhausted from the indoor space (3) to the outdoor space passes, is removed.

This configuration allows a humidity controller (150), including two indoor units (U1, U2) that are installed on two opposing wall surfaces of a room, to switch modes of operation from dehumidifying the indoor space (3) continuously to humidifying the indoor space (3) continuously, and vice versa.

(Second Variation)

According to a second variation of the eleventh embodiment, by changing the state of application of the tensile force, the humidity controller (150) shown in FIGS. 63 and 70 is configured to switch from the operation mode shown in FIG. 63A to the one shown in FIG. 70A, and vice versa, and from the operation mode shown in FIG. 63B to the one shown in FIG. 70B, and vice versa. The basic configuration of this device is the same as the ones shown in FIGS. 63 and 70, and a detailed description thereof will be omitted herein.

While this humidity controller (150) is performing the mode of operation shown in FIGS. 63A and 63B, the tensile force applied to the humidity control module (24), through which the air supplied from the outdoor space to the indoor space (3) passes, is removed, and tensile force is applied to the humidity control module (24), through which the air to be exhausted from the indoor space (3) to the outdoor space passes. On the other hand, while this humidity controller (150) is performing the mode of operation shown in FIGS. 70A and 70B, tensile force is applied to the humidity control module (24), through which the air supplied from the outdoor space to the indoor space (3) passes, and the tensile force applied to the humidity control module (24), through which the air to be exhausted from the indoor space (3) to the outdoor space passes, is removed.

This configuration allows a humidity controller (150), including two indoor units (U1, U2) that are installed on a single wall surface of a room, to switch modes of operation from dehumidifying the indoor space (3) continuously to humidifying the indoor space (3) continuously, and vice versa.

(Third Variation)

According to a third variation of the eleventh embodiment, by changing the state of application of the tensile force, the humidity controller (150) shown in FIGS. 64-66 and FIGS. 71-73 is configured to switch from the operation mode shown in FIG. 65 to the one shown in FIG. 72, and vice versa, and from the operation mode shown in FIG. 66 to the one shown in FIG. 73, and vice versa. The basic configuration of this device is the same as the ones shown in FIGS. 64-66 and FIGS. 71-73, and a detailed description thereof will be omitted herein.

While this humidity controller (150) is performing the mode of operation shown in FIGS. 65 and 66, the tensile force applied to the humidity control module (24), through which the air to be supplied from the outdoor space to the indoor space (3) passes, is removed, and tensile force is applied to the humidity control module (24), through which the air to be exhausted from the indoor space (3) to the outdoor space passes. On the other hand, while this humidity controller (150) is performing the mode of operation shown in FIGS. 72 and 73, tensile force is applied to the humidity control module (24), through which the air to be supplied from the outdoor space to the indoor space (3) passes, and the tensile force applied to the humidity control module (24), through which the air to be exhausted from the indoor space (3) to the outdoor space passes, is removed.

This configuration allows a humidity controller (150), which uses a unit with the ability to switch the air flow paths in the casing (10) including two humidity control modules (24), to switch modes of operation from dehumidifying the indoor space (3) continuously to humidifying the indoor space (3) continuously, and vice versa.

(Fourth Variation)

According to a fourth variation of the eleventh embodiment, by combining the humidity controllers (150) shown in FIGS. 67 and 74 into a single device and changing the state of application of the tensile force, the device is configured to switch from the operation mode shown in FIG. 67 to the one shown in FIG. 74, and vice versa. The basic configuration of the device is the same as the ones shown in FIGS. 67 and 74, and a detailed description thereof will be omitted herein.

While this humidity controller (150) is performing the mode of operation shown in FIG. 67, the tensile force applied to a portion of the humidity control module (24), through which the air supplied from the outdoor space to the indoor space (3) passes, is removed, and tensile force is applied to a portion of the humidity control module (24), through which the air to be exhausted from the indoor space (3) to the outdoor space passes. On the other hand, while this humidity controller (150) is performing the mode of operation shown in FIG. 74, tensile force is applied to a portion of the humidity control module (24), through which the air supplied from the outdoor space to the indoor space (3) passes, and the tensile force applied to a portion of the humidity control module (24), through which the air to be exhausted from the indoor space (3) to the outdoor space passes, is removed.

This configuration allows a humidity controller (150), including a humidity control module (24) implemented as a rotor, to switch modes of operation from dehumidifying the indoor space (3) continuously to humidifying the indoor space (3) continuously, and vice versa.

(Fifth Variation)

According to a fifth variation of the eleventh embodiment, by changing the state of application of the tensile force, the humidity controller (150) shown in FIGS. 75 and 76 is configured to switch from the operation mode shown in FIG. 75A to the one shown in FIG. 76A, and vice versa, and from the operation mode shown in FIG. 75B to the one shown in FIG. 77B, and vice versa. The basic configuration of this device is the same as the ones shown in FIGS. 75 and 77, and a detailed description thereof will be omitted herein.

While this humidity controller (150) is performing the mode of operation shown in FIGS. 75A and 75B, the tensile force applied to the humidity control module (24) and cooling/heating module (20), through which the air supplied from the outdoor space to the indoor space (3) passes, is removed, and tensile force is applied to the humidity control module (24) and cooling/heating module (20), through which the air to be exhausted from the indoor space (3) to the outdoor space passes. On the other hand, while this humidity controller (150) is performing the mode of operation shown in FIGS. 77A and 77B, tensile force is applied to the humidity control module (24) and cooling/heating module (20), through which the air supplied from the outdoor space to the indoor space (3) passes, and the tensile force applied to the humidity control module (24) and cooling/heating module (20), through which the air to be exhausted from the indoor space (3) to the outdoor space passes, is removed.

This configuration allows a humidity controller (150), in which a humidity control module (24) and a cooling/heating module (20) are provided for each of two indoor units (U1, U2), to switch modes of operation from dehumidifying and cooling the indoor space (3) continuously to humidifying and heating the indoor space (3) continuously, and vice versa.

(Sixth Variation)

According to a sixth variation of the eleventh embodiment, by combining the humidity controllers (150) shown in FIGS. 76 and 78 into a single device and changing the state of application of the tensile force, the device is configured to switch from the operation mode shown in FIG. 76 to the one shown in FIG. 78, and vice versa. The basic configuration of the device is the same as the ones shown in FIGS. 76 and 78, and a detailed description thereof will be omitted herein.

While this humidity controller (150) is performing the mode of operation shown in FIG. 76, the tensile force applied to a portion of the humidity control module (24) and cooling/heating module (20), through which the air supplied from the outdoor space to the indoor space (3) passes, is removed, and tensile force is applied to a portion of the humidity control module (24) and cooling/heating module (20), through which the air to be exhausted from the indoor space (3) to the outdoor space passes. On the other hand, while this humidity controller (150) is performing the mode of operation shown in FIG. 78, tensile force is applied to a portion of the humidity control module (24) and cooling/heating module (20), through which the air supplied from the outdoor space to the indoor space (3) passes, and the tensile force applied to a portion of the humidity control module (24) and cooling/heating module (20), through which the air to be exhausted from the indoor space (3) to the outdoor space passes, is removed.

This configuration allows a humidity controller (150), which includes a humidity control module (24) and cooling/heating module (20), each being implemented as a rotor, to switch modes of operation from dehumidifying and cooling the indoor space (3) continuously to humidifying and heating the indoor space (3) continuously, and vice versa.

The embodiments described above are merely preferred examples in nature, and are not intended to limit the scope of the present invention, applications thereof, or use thereof.

INDUSTRIAL APPLICABILITY

As can be seen from the foregoing description, the present invention is useful as an air conditioner configured to control the temperature of an indoor space.

DESCRIPTION OF REFERENCE CHARACTERS

1 Air Conditioner
20 Cooling/Heating Module
20a First Cooling/Heating Section
(First Cooling/Heating Module)
20b Second Cooling/Heating Section
(Second Cooling/Heating Module)
21 Thermoelastic Material
22 Actuator
35 Switching Control Section
P Air Passage
P1 Air Supply Passage
P2 Air Exhaust Passage

The invention claimed is:

1. An air conditioner comprising:
first and second cooling/heating modules each including
a thermoelastic member made of thermoelastic material,
a fixed member to which one end of the thermoelastic member is fixed, and
an actuator to which the other end of the thermoelastic member is fixed and which selectively displaces in a direction away from the fixed member and a direction toward the fixed member, the actuator being controlled to selectively apply or remove tension to/from the thermoelastic material;
a first air passage in which the first cooling/heating module is provided; and
a second air passage in which the second cooling/heating module is provided,
wherein the thermoelastic material is a wire made of a shape memory alloy, and wherein the actuator of the first cooling/heating module and the actuator of the second cooling/heating module simultaneously displace in opposite directions with respect to each other.

2. The air conditioner of claim 1, wherein
the air conditioner is configured to perform a cooling mode of operation in which air cooled by one of the first and second cooling/heating modules is supplied to an indoor space.

3. The air conditioner of claim 1, wherein
the air conditioner is configured to perform a heating mode of operation in which air heated by one of the first and second cooling/heating modules is supplied to an indoor space.

4. The air conditioner of claim 1, wherein
the air conditioner is configured to switch modes of operation from a cooling mode of operation in which air cooled by one of the first and second cooling/heating modules is supplied to an indoor space into a heating mode of operation in which air heated by the one of the first and second cooling/heating modules is supplied to the indoor space, and vice versa.

5. The air conditioner of claim 1, wherein
the air conditioner is configured to supply room air that has passed through one of the first and second cooling/heating modules to an indoor space.

6. The air conditioner of claim 1, wherein
the air conditioner is configured to supply outdoor air that has passed through one of the first and second cooling/heating modules to an indoor space.

7. The air conditioner of claim 1, wherein
the actuator is controlled to adjust the quantity of heat generated by the thermoelastic material by changing the magnitude of tension applied to the thermoelastic materials.

8. The air conditioner of claim 1, wherein the thermoelastic material is a Ti/Ni/Cu alloy.

* * * * *